United States Patent
Shinohara et al.

[11] Patent Number: 5,963,240
[45] Date of Patent: Oct. 5, 1999

[54] DEFLECTING MIRROR ADJUSTING DEVICE FOR AN IMAGE FORMING APPARATUS

[75] Inventors: Tadashi Shinohara, Tokyo; Nobuo Iwata, Sagamihara; Mitsugu Sugiyama, Yokohama; Toshiya Sato, Yokohama; Yutaka Shio, Yokohama; Tomonori Yabuta, Yokohama, all of Japan

[73] Assignee: Ricoh Company, Ltd., Tokyo, Japan

[21] Appl. No.: 08/794,588

[22] Filed: Feb. 3, 1997

[30] Foreign Application Priority Data

| | | | |
|---|---|---|---|
| Feb. 2, 1996 | [JP] | Japan | 8-017848 |
| Apr. 24, 1996 | [JP] | Japan | 8-102784 |
| Jul. 25, 1996 | [JP] | Japan | 8-196525 |
| Aug. 2, 1996 | [JP] | Japan | 8-204832 |

[51] Int. Cl.⁶ ............... B41J 2/385; B41J 2/47; G01D 15/14; G03G 15/01
[52] U.S. Cl. .................................. 347/116; 347/243
[58] Field of Search ............... 250/347; 356/139.07, 356/139.1; 358/481, 494; 359/214, 216, 198, 196, 223; 355/58, 68; 399/216, 201, 202; 347/230, 264, 116, 231, 259, 260, 261, 243

[56] References Cited

U.S. PATENT DOCUMENTS 4,800,414  1/1989  Takeda ........................ 355/58

*Primary Examiner*—N. Le
*Assistant Examiner*—L. Anderson
*Attorney, Agent, or Firm*—Oblon, Spivak, McClelland, Maier & Neustadt, P.C.

[57] ABSTRACT

A device for adjusting the position of a deflecting mirror included in an image forming apparatus, particularly one including a plurality of photoconductive elements, is disclosed. The device includes eccentric cams rotatable to adjust the position of the deflecting mirror.

28 Claims, 43 Drawing Sheets

DISLOCATION IN MAIN SCANNING DIRECTION

DISLOCATION IN SUBSCANNING DIRECTION

DISLOCATION DUE TO MAGNIFICATION IN MAIN SCANNING DIRECTION

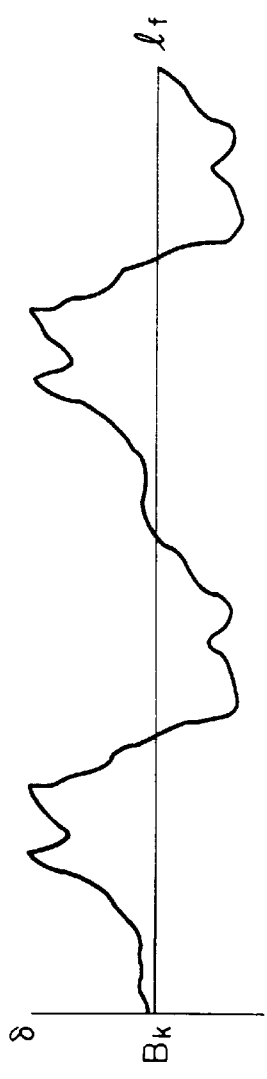
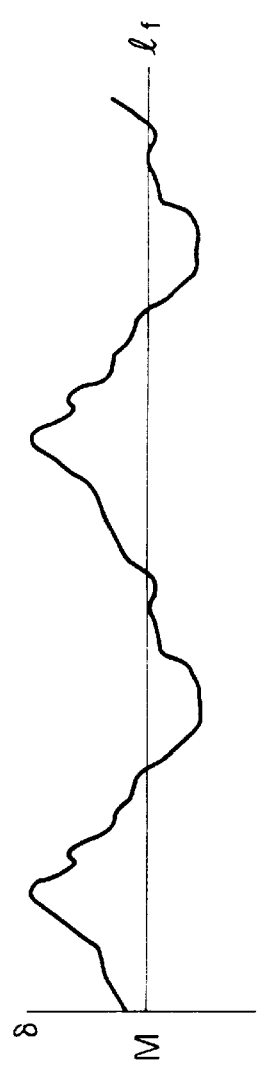
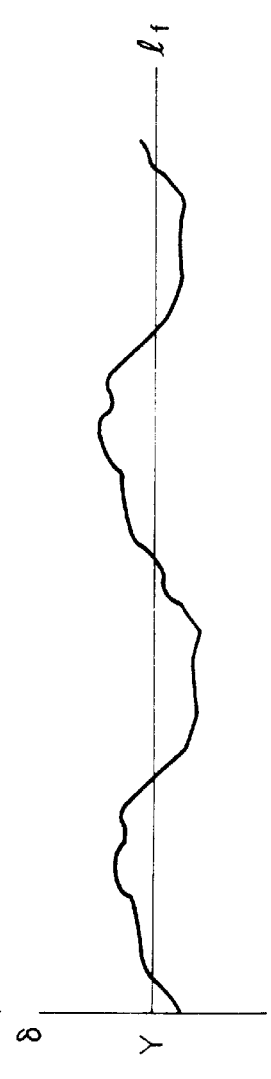
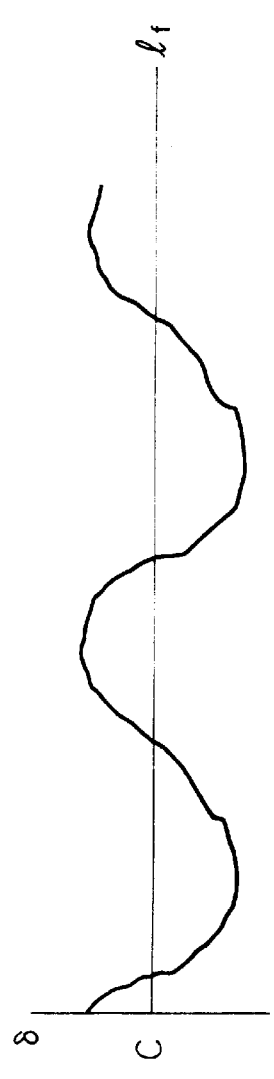
Fig. 6A PRIOR ART
Fig. 6B PRIOR ART
Fig. 6C PRIOR ART
Fig. 6D PRIOR ART d = 16mm

REGULAR MAIN SCANNING DIRECTION

⟵ MOVEMENT OF TRANSFER BELT

Fig. 40A
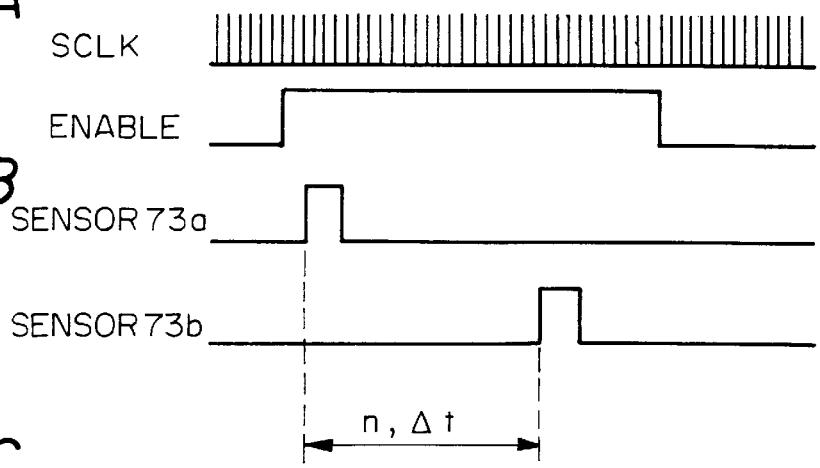
Fig. 40B
Fig. 40C
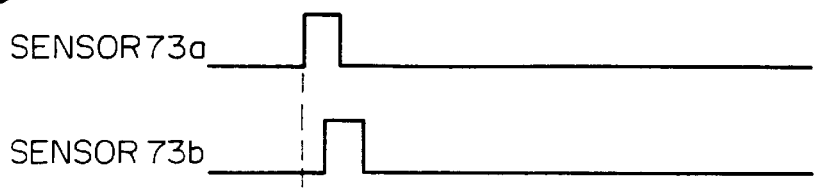
Fig. 40D
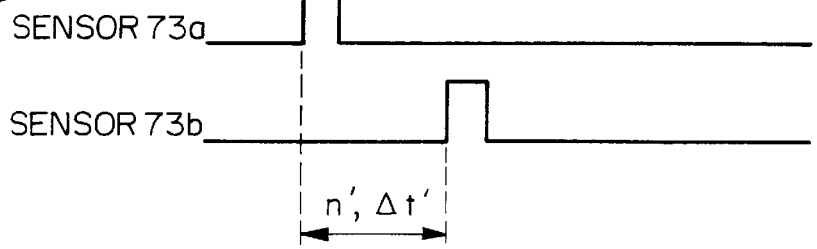
Fig. 40E
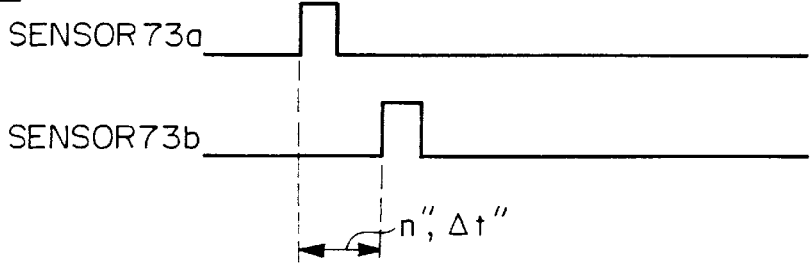
Fig. 40F
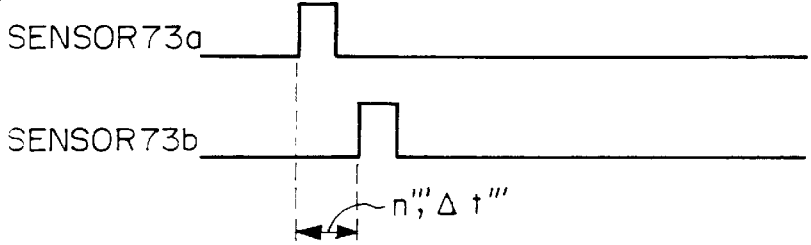

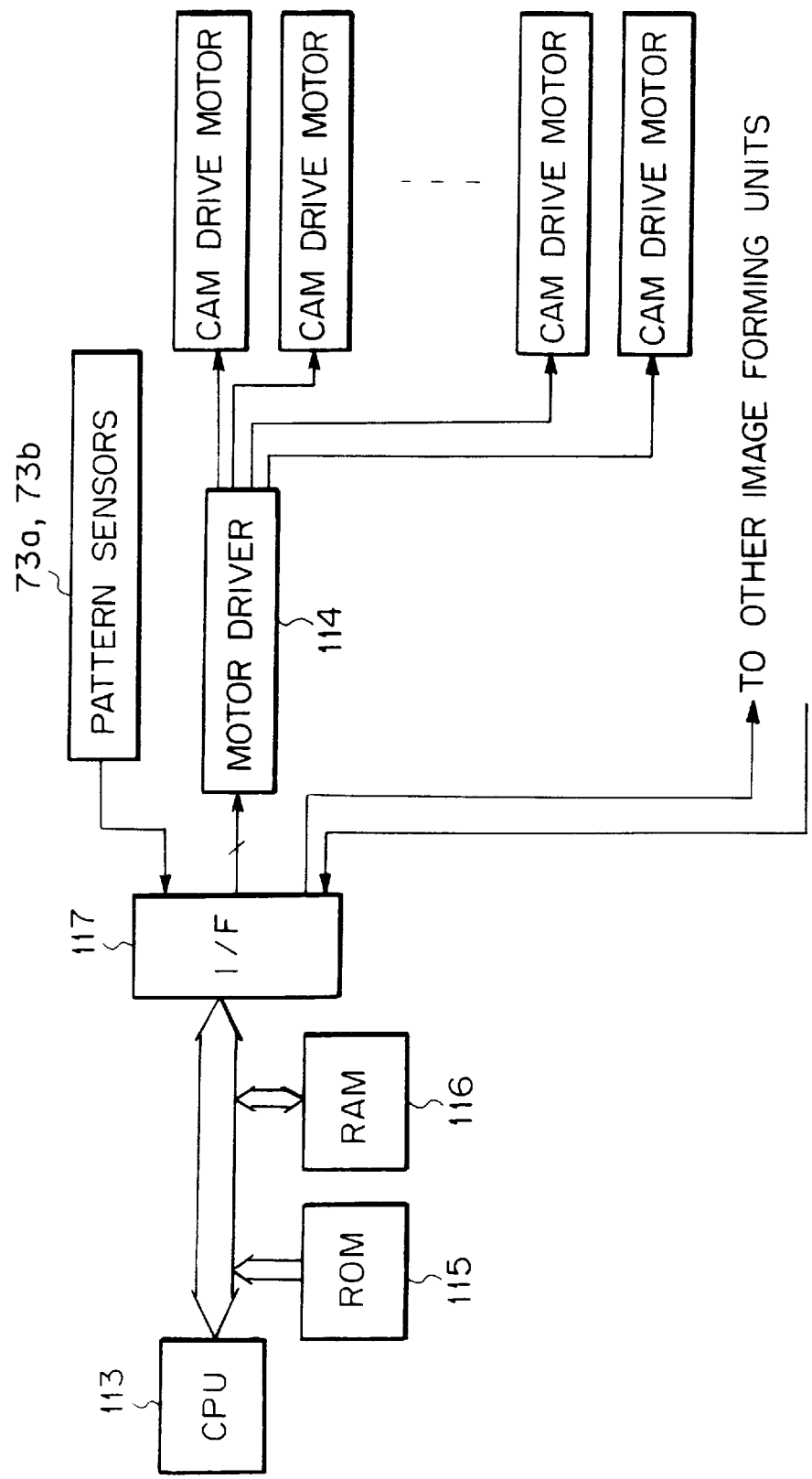

DEFLECTING MIRROR ADJUSTING DEVICE FOR AN IMAGE FORMING APPARATUS

BACKGROUND OF THE INVENTION

The present invention relates to a device for correcting the dislocation of a deflecting mirror included in a copier, printer, facsimile apparatus or similar image forming apparatus and, more particularly, to a deflecting mirror adjusting device advantageously applicable to a full-color image forming apparatus of the type including a plurality of image carriers implemented as photoconductive elements.

In an electrophotographic or an electrostatic image forming apparatus, errors in the dimensions of mechanisms or errors in drive cause a toner image to be formed on a photoconductive element, or image carrier, at a position deviated from an expected position, resulting in irregularity in image, distortion, and other defects. Particularly, in a color image forming apparatus which transfers images of different colors to a recording medium one above the other, the above errors bring the images out of register. The misregister or relative positional deviation between the images of different colors is conspicuous and lowers image quality noticeably. Especially, a full-color image forming apparatus of the type including a plurality of photoconductive elements involves many factors liable to cause misregister to occur. Countermeasures are most difficult to implement with this type of apparatus, as generally accepted.

Some different kinds of dislocation occur in the color image forming apparatus, as follows.
(1) Dislocation due to Shift
This dislocation is ascribable to errors in the positioning of an exposing section and photoconductive elements as well as in write timing. For example, scanning lines have their start points dislocated in the main scanning direction or are dislocated in the subscanning direction (direction of sheet feed). Further, the scanning lines are different in length due to magnification in the main scanning direction. Because this kind of dislocation is constant at any position on an image, it can be corrected if the write timing is adjusted color by color.
(2) Dislocation due to Skew
This dislocation is ascribable to errors in the parallelism of the exposing deice, photoconductive elements, transfer belt, and so forth. The scanning lines are written obliquely.
(3) Dislocation due to Curvature
This dislocation is ascribable to an error in the toroidal configuration of an f-θ lens. The resulting image has curvature.
(4) Dislocation due to Irregular Pitch
This dislocation is ascribable to an occurrence that irregularity in the rotation of the photoconductive elements or that of a conveyor belt causes the distance between the scanning lines to vary in the subscanning direction at the same period as the irregular rotation.
(5) Random Dislocation
This dislocation occurs abruptly without any period due to, e.g., unexpected vibration or the slippage of the transfer belt.

Generally, it is difficult to correct all of the above different kinds of dislocation with a single adjusting means. Therefore, applying a particular kind of adjusting means to each kind of dislocation is under study. As for the dislocation ascribable to skew and the dislocation ascribable to irregular pitch, it has been proposed to move a deflecting mirror at the time of image formation in order to set up an exposing position capable of cancelling the dislocation. However, the prerequisite with this kind of scheme is that the variation in dislocation be grasped beforehand, because the scheme is to correct the dislocation positively.

For the adjustment of the deflecting mirror, the mirror may be moved in the parallel direction or angularly moved. With any of the parallel movement and angular movement, it is possible to shift a focusing position on the photoconductive element. However, the angular movement is not practicable without resorting to an extremely fine resolution. Likewise, the parallel movement cannot set up a desired focusing position unless effected with extremely high accuracy.

An actuator for moving the deflecting mirror may be implemented by, e.g., a piezoelectric actuator or a drive mechanism which is disclosed in Japanese Patent Laid-Open Publication No. 7-248455 and varies the amount of feed of a screw. A piezoelectric actuator can move the mirror extremely delicately on several microns basis and can implement control with a frequency as high as several thousand hertz. However, this kind of scheme is susceptible to vibration and other disturbance because an arrangement must be so made as not to obstruct the movement control of a piezoelectric element. Moreover, because the piezoelectric element returns to its original position when a power source is turned off, its initial position must be set every time the power source is turned on. In addition, the piezoelectric actuator increases the cost. On the other hand, the screw drive scheme realizes relatively easy drive control because the displacement of the mirror is proportional to the rotation angle of the output shaft of a motor. However, the screw drive scheme also increases the cost because it needs a screw having a highly accurate pitch.

In any case, the resolution of an image to be formed on the photoconductive element depends on the accuracy of the actuator. In this respect, the configuration of the actuator is an important factor in the adjustment of the deflecting mirror. However, even if the mirror is accurately moved by the actuator, it is likely that the mirror is inclined (dislocation in the direction of normal) during movement. The inclination translates into a noticeable error in the focusing position on the photoconductive element.

It follows that accurate adjustment of movement and accurate adjustment of inclination are the important issues regarding the deflecting mirror.

SUMMARY OF THE INVENTION

It is therefore an object of the present invention to provide a deflecting mirror adjusting device for an image forming apparatus and capable of correcting the dislocation of toner images of different colors accurately to thereby implement high quality images, and capable of being repaired before image quality is deteriorated due to noticeable dislocation.

It is another object of the present invention to provide a deflecting mirror adjusting device for an image forming apparatus and capable of performing delicate and highly accurate movement control.

It is still another object of the present invention to provide a deflecting mirror adjusting device for an image forming apparatus and holds a position accurately and sparingly susceptible to vibration or similar disturbance.

It is a further object of the present invention to provide a simple and inexpensive deflecting mirror adjusting device for an image forming apparatus.

In accordance with the present invention, a device for adjusting the position of a deflecting mirror included in an exposing system of an image forming apparatus includes a support member supporting the deflecting mirror. An adjusting member contacts the deflecting mirror for varying the inclination of the deflecting mirror in the main scanning direction. A drive source drives the adjusting member. The adjusting member is implemented by an eccentric cam.

BRIEF DESCRIPTION OF THE DRAWINGS

The above and other objects, features and advantages of the present invention will become apparent from the following detailed description taken with the accompanying drawings in which:

FIGS. 6A–6D are graphs each showing the dislocation of a particular color;

FIGS. 40A–40F show the waveforms of output signals of the pattern sensors shown in FIG. 39;

FIG. 42 is a block diagram schematically showing a control system included in the third embodiment;

DESCRIPTION OF THE PREFERRED EMBODIMENTS

To better understand the present invention, the problems particular to the conventional technologies will be described more specifically.

Figure 1:
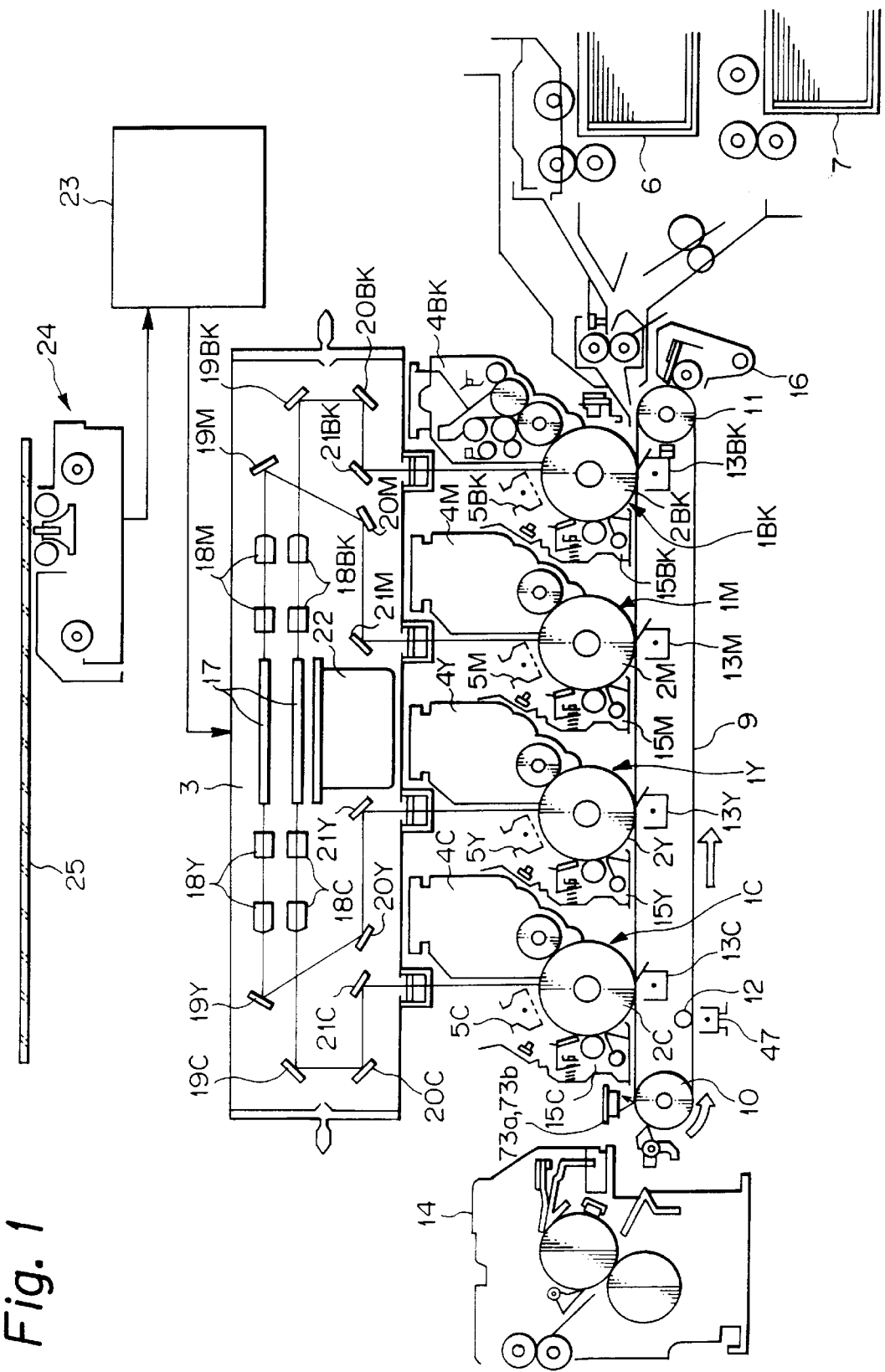
FIG. 1 is a section showing a specific construction of a color image forming apparatus including a plurality of photoconductive elements.

Referring to FIG. 1 of the drawings, a conventional full-color image forming apparatus is shown and includes a plurality of image forming sections 1BK, 1M, 1Y and 1C by way of example. Letters B, M, Y and C stand for black, magenta, yellow and cyan, respectively. The image forming sections 1BK–1C are sequentially arranged along a sheet transport path, and respectively form BK, M, Y and C images. While a sheet is transported along the sheet transport path, the BK, M, Y and C images are sequentially transferred to the sheet one above the other at the image forming sections 1BK–1C. As a result, a full-color image is completed on the sheet.

The image forming sections 1BK–1C respectively include image carriers 2BK, 2M, 2Y and 2C and developing devices 4BK, 4M, 4Y and 4C while sharing an exposing device 3. The image carriers 2BK–2C are implemented as photoconductive drums. The exposing device, or writing means, 3 exposes each of the drums 2BK–2C to an image of particular color. Specifically, while any one of the drums 2BK–2C is driven by a drive source, not shown, a main charger or charging means 5BK, 5M, 5Y or 5C charges the surface of the drum 2 uniformly. The exposing device 3 exposes the charged surface of the drum 2 to a pattern corresponding to an image of particular color, forming an electrostatic latent image on the drum 2. The developing device 4BK, 4M, 4Y or 4C develops the latent image with toner of the above color so as to form a corresponding toner image.

The sheet, or recording medium, is fed from any one of a plurality of sheet feeding devices 6 and 7 to a registration roller pair 8. The roller pair 8 drives the sheet toward a transfer belt or intermediate transfer body 9 at a preselected timing. The transfer belt 9 is passed over a drive roller 10 and driven rollers 11 and 12 and rotated by a drive source, not shown, via the drive roller 10. The sheet fed from the roller pair 8 is conveyed by the transfer belt 9 in rotation.

When the sheet being conveyed by the belt 9 arrives at any one of the image forming sections 1BK–1C, a transfer charger or transferring means 13BK, 13M, 13Y or 13C transfers the respective toner image formed on the drum 2BK, 2M, 2Y or 2C to the sheet. Consequently, the toner images of different colors are transferred to the sheet one above the other to complete a full-color image thereon. A fixing device 14 fixes the full-color image on the sheet. The sheet caring the fixed image is driven out of the apparatus.

A cleaning device 15BK, 15M, 15Y or 15C removes the toner remaining on the associated drum 2BK, 2M, 2Y or 2C after the image transfer. A cleaning device 16 cleans the transfer belt 9 after the conveyance of the sheet. The exposing device 3 includes four semiconductor lasers or light sources. Laser beams issuing from the four lasers are deflected by a polygonal scanner 17. The deflected beams are respectively routed through f-θ lenses 18BK, 18M, 18Y and 18C, deflecting mirrors 19BK, 19M, 19Y and 19C, mirrors 20BK, 20M, 20Y and 20C, and mirrors 21BK, 21M, 21Y and 21C, and then incident to the drums 2BK–2C. While the polygonal scanner 17 is rotated by a motor 22, the beams each repeatedly scans the associated drum 2BK, 2M, 2Y or 2C in the axial direction of the drum, i.e., in the main scanning direction.

Subscanning in the direction perpendicular to the above main scanning direction is implemented by the rotation of the drums 2BK–2C. An image processing section 23 sends image data of particular color to each of laser drivers respectively assigned to the four lasers. The laser drivers each drives the respective laser in accordance with the image data, so that the beam issuing from each laser varies in intensity in accordance with the image data. A document reading device 24 reads a document set on a glass platen 25 while separating it into a plurality of colors, e.g., red, green and blue, thereby outputting analog image data of the above colors. These image data are digitized by an analog-to-digital converter and then sent to the image processing section 23. The image processing section 23 performs preselected processing with the digital image data so as to transform them to digital image data of recording colors, e.g., BK, M, Y and C. The digital image data are each sent to the associated laser driver of the exposing device 3 at a preselected timing.

To bring the toner images of different colors into register, the times for the exposing device 3 to start exposing the consecutive drums 2BK–2C are selected such that the times when the sheet fed from the registration roller pair 8 reaches the consecutive image transfer positions and the times when the toner images formed on the drums 2BK–2C each reaches the respective image transfer position coincide.

The problem with the above color image forming apparatus is that the toner images of different colors are brought out of register on the sheet, i.e., the various kinds of dislocation (1)–(5) discussed earlier occur. The dislocation (1)–(4) will be described more specifically with reference to the drawings.

(1) Dislocation due to Shift

Figure 2A:
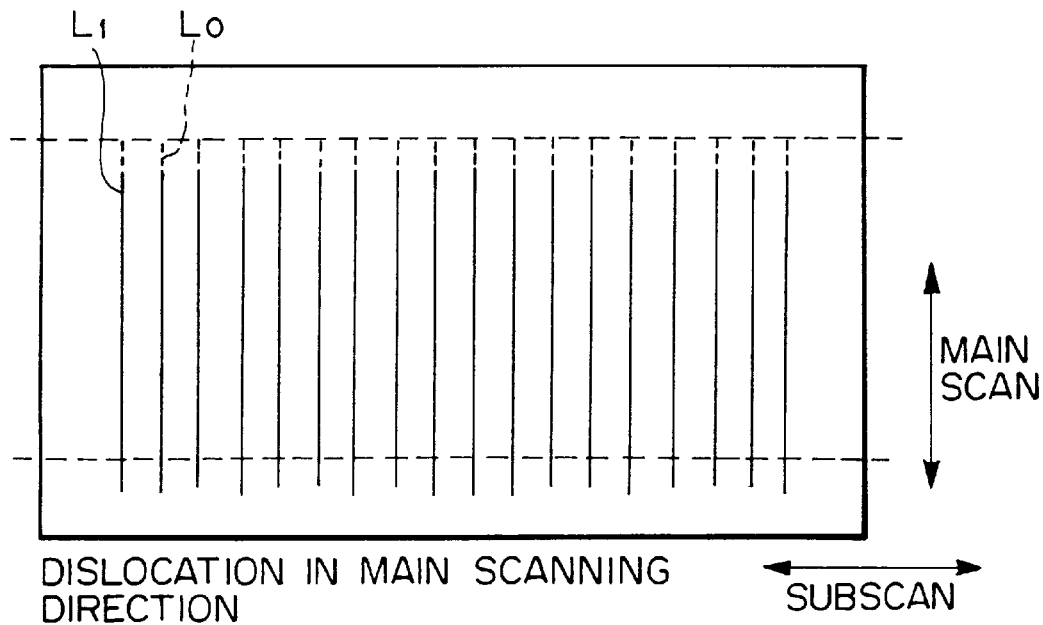
FIGS. 2A–2C each shows a specific image dislocated due to shift.
Figure 2B:
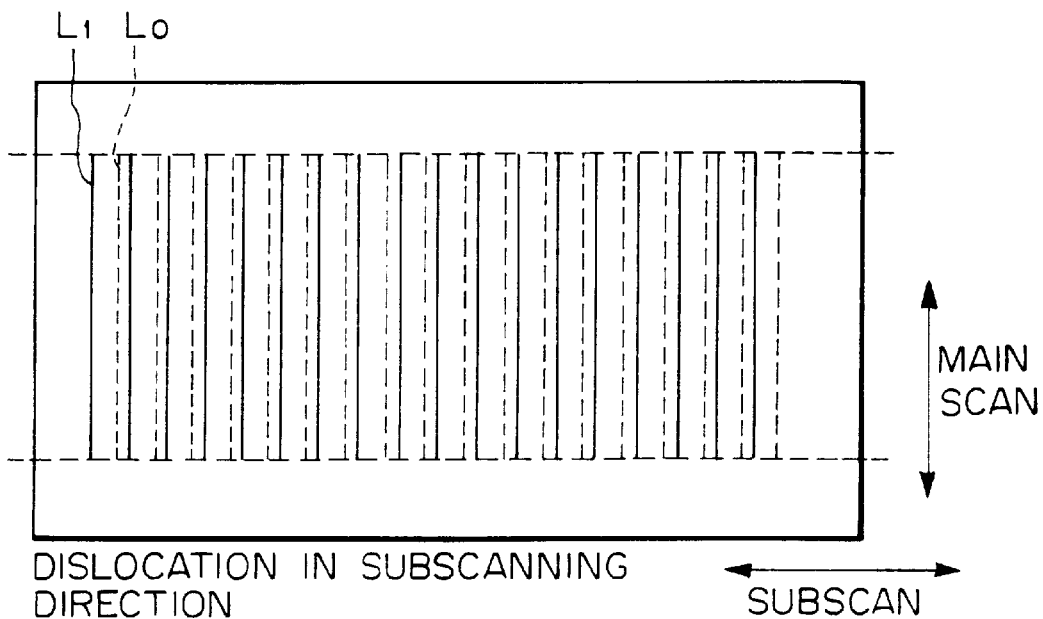
Figure 2C:
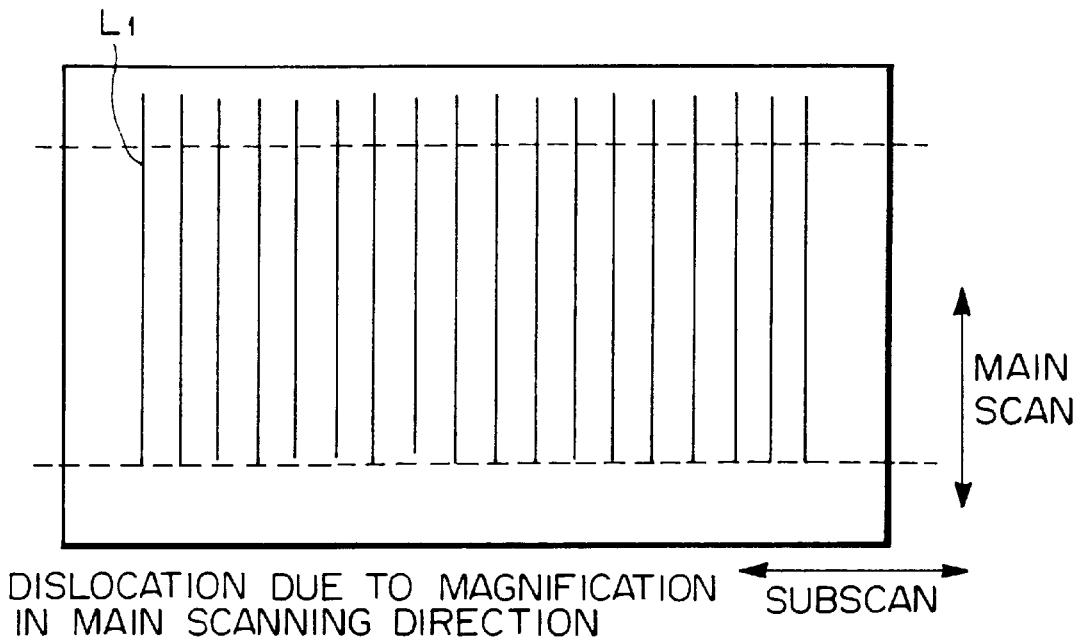

This kind of dislocation is ascribable to errors in, e.g., the positions of the exposing device 3 and drums 2BK–2C and the write timing of the exposing device 3. FIG. 2A shows a condition wherein the write start point of scanning lines is dislocated in the main scanning direction. FIG. 2B shows a condition wherein the scanning lines are dislocated in the subscanning direction (sheet transport direction). FIG. 2C shows a condition wherein the scanning lines are different in length. This kind of dislocation can be corrected if the time for writing the image of each color on the associated drum 2BK, 2M, 2Y or 2C is adjusted. In FIGS. 2A–2C, phantom lines $L_0$ indicate scanning lines expected to be written on the drums 2BK–2C while solid Lines $L_1$ indicate scanning lines actually written on the drums 2BK–2C. This also applies to FIGS. 3–5 which will be described.

(2) Dislocation due to Skew

Figure 3:
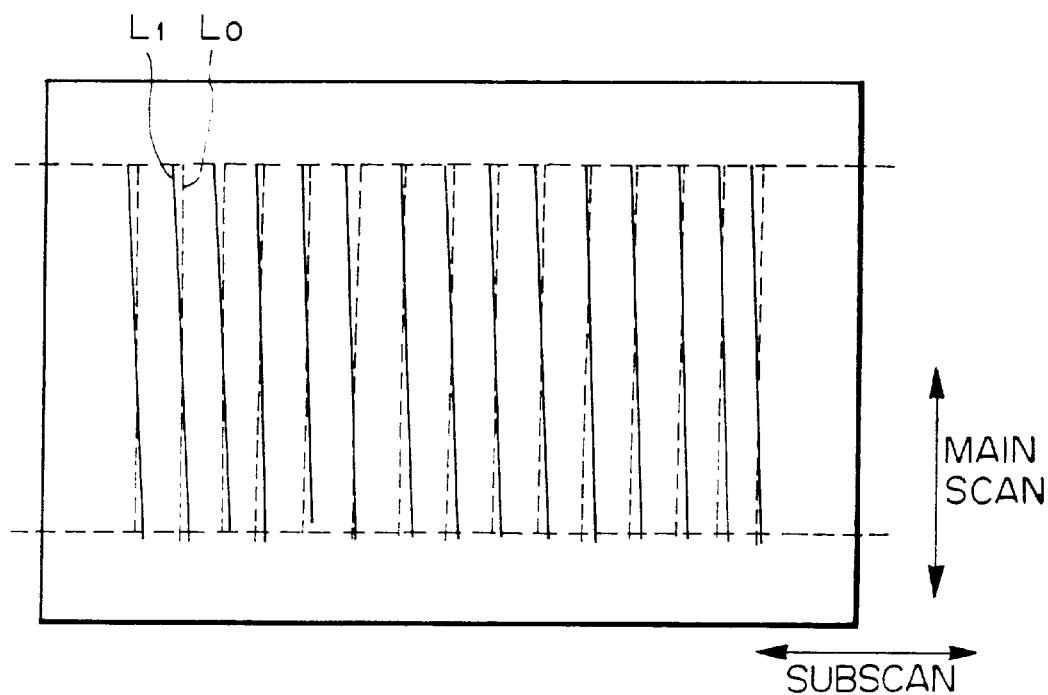
FIG. 3 shows a specific image dislocated due to skew.

This kind of dislocation is ascribable to errors in, e.g., the parallelism of the deflecting mirrors 19BK–19C, drums 2BK–2C, and transfer belt 9. FIG. 3 shows scanning lines inclined relative to expected scanning lines. To correct such dislocation, it has been customary for a serviceman to adjust the mirrors 19BK–19C and drums 2BK–2C by hand.

(3) Dislocation due to Curvature

Figure 4:
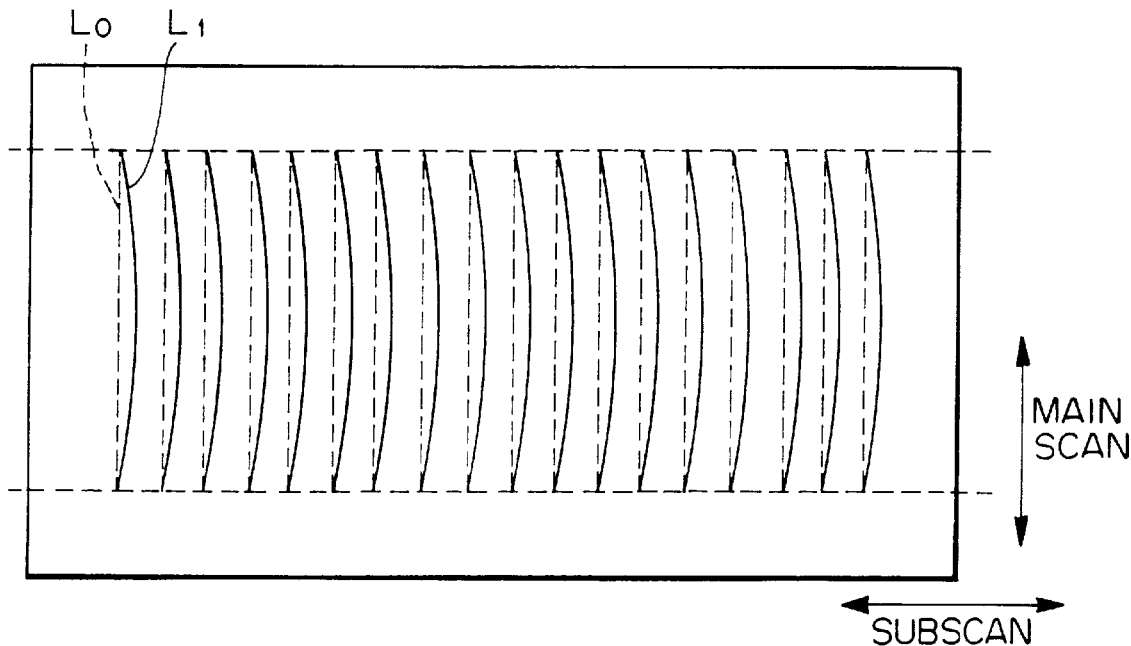
FIG. 4 shows a specific image dislocated due to curvature.

This kind of dislocation is ascribable to errors in the toroidal configurations of the f-θ lenses 18BK–18C. FIG. 4 shows a curved toner image resulting from the dislocation.

(4) Dislocation due to Irregular Pitch

Figure 5:
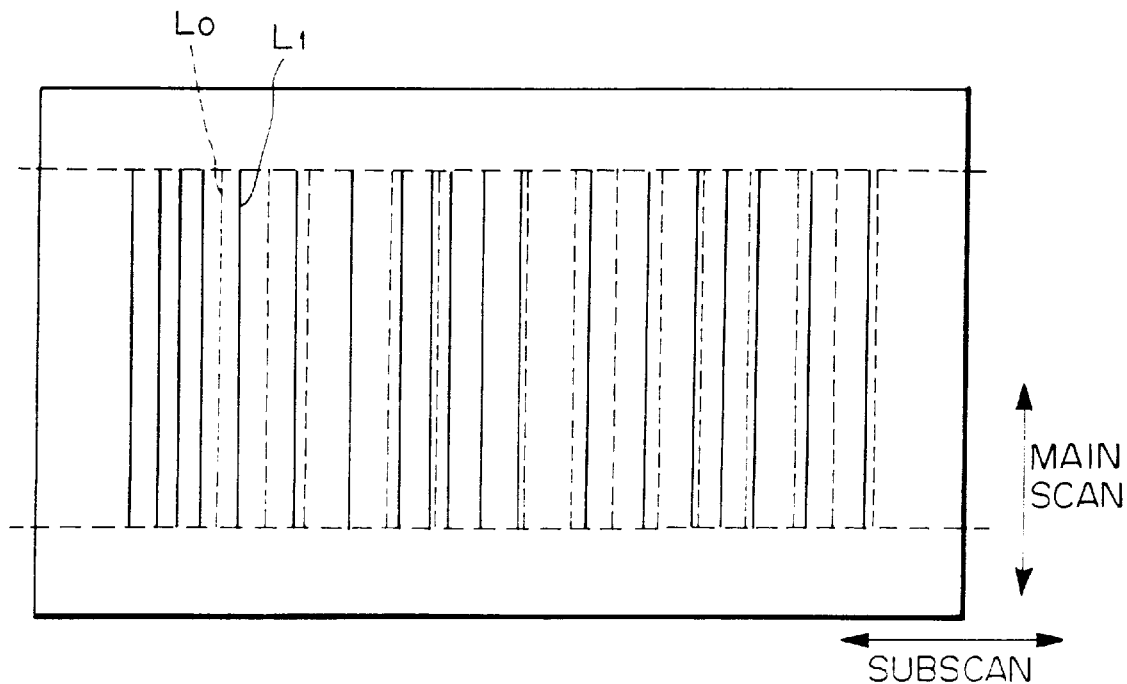
FIG. 5 shows a specific image dislocated due to irregular pitch.
Figure 7:
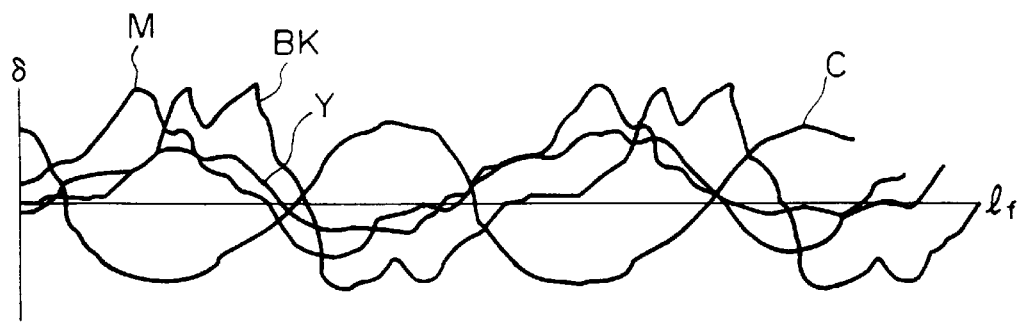
FIG. 7 is a graph showing the graphs of FIGS. 6A–6D superposed on each other.

This kind of dislocation is ascribable to irregularity in, e.g., the rotation of the drums 2BK–2C and that of the transfer belt 9. FIG. 5 shows irregularity in scanning pitch appearing in the subscanning direction at the same period as irregular rotation. FIGS. 6A–6D respectively demonstrate specific variations in the dislocation of the BK, M, Y and C images in the subscanning direction. As shown, the images of different colors are each dislocated at a particular period. When such images are transferred to the sheet one above the other, the colors are brought out of register in the subscanning direction, as shown in FIG. 7. To correct this kind of dislocation, the positions of the deflecting mirrors 19BK–19C may be adjusted at the time of image formation such that exposing positions cancelling the dislocation are set up.

Figure 8:
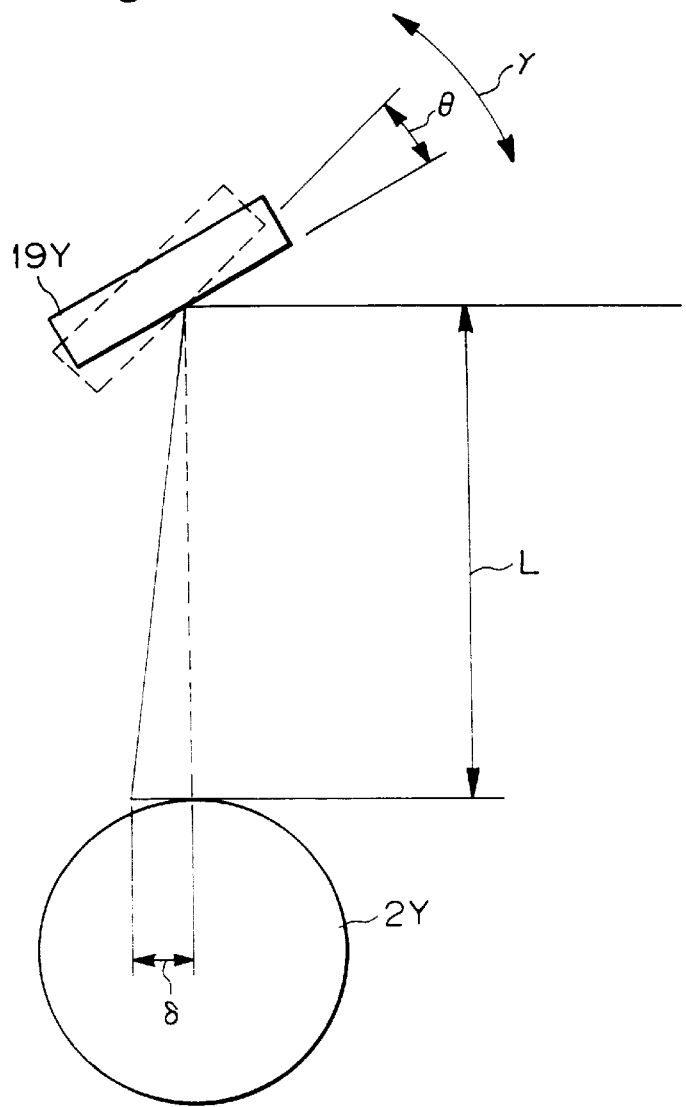
FIG. 8 is a view for describing an error in an optical path ascribable to the inclination of a deflecting mirror.

The dislocation ascribable to skew and the dislocation ascribable to irregular pitch can both be corrected if the deflecting mirrors 19BK–19C are shifted by either one of parallel movement and angular movement stated earlier. However, angular movement is not practicable without resorting to an extremely fine resolution. Assume that the mirror 19Y, for example, and the associated drum 2Y are spaced by a distance L of 100 mm, as shown in FIG. 8. Then, when the angle θ of the mirror 19Y is varied by 0.1° in a direction indicated by an arrow y, and if the angle θ is extremely small, the focusing position on the drum 2Y is displaced by an amount δ approximated by:

$$\delta = 2\theta L = 2 \times 0.1 \times \frac{\pi}{180} \times 100 \times 10^3 = 349 \ \mu m \qquad \text{Eq. (1)}$$

Because irregularity in pitch in the subscanning direction is generally +200 μm or so, even a 0.1° of deviation of the angle θ translates into a 349 μm of dislocation δ. Therefore, if the adjustment of angle is not highly accurate, the condition is extremely severe in the resolution aspect. This is also true with parallel movement.

Figure 9:
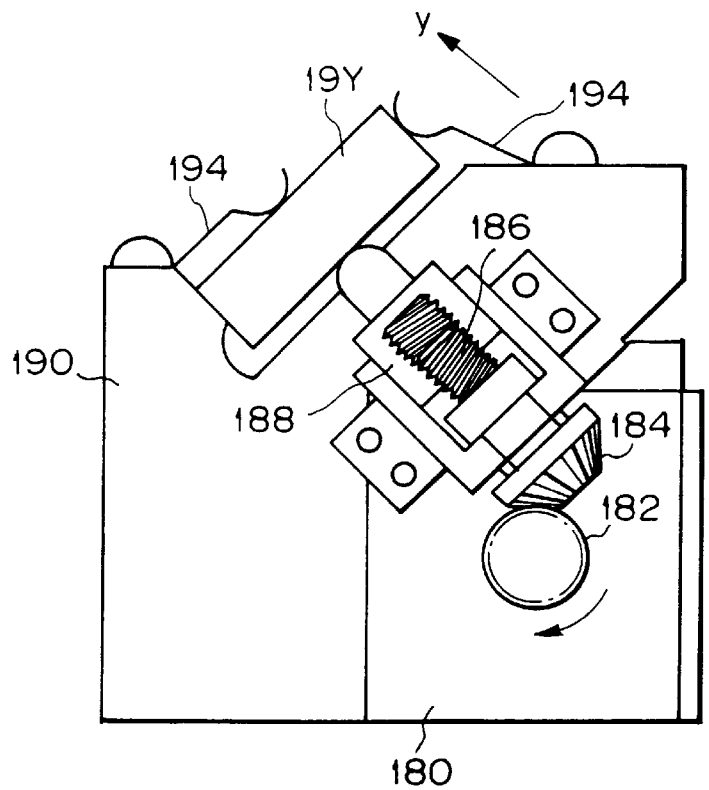
FIG. 9 shows a conventional deflecting mirror adjusting device using a screw.
Figure 10:
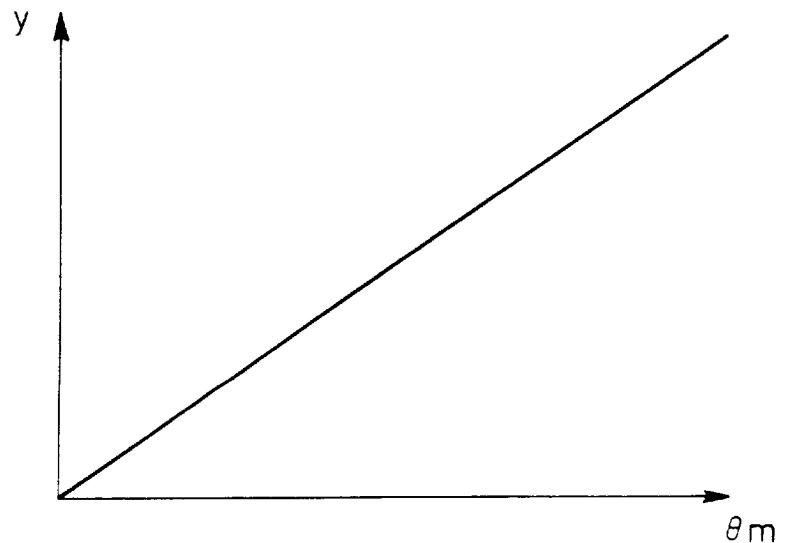
FIG. 10 is a graph showing a relation between the rotation angle of the output shaft of a motor and the displacement of the mirror particular to the device shown in FIG. 9.

FIG. 9 shows a conventional actuator for moving, e.g., the deflecting mirror 19Y and taught in Japanese Patent Laid-Open Publication No. 7-248455 mentioned earlier. As shown, the actuator includes a stepping motor 180. The rotation of the stepping motor 180 is transmitted to a screw 186 via a worm gear 182 and a helical gear 184. The worm gear 182 rotates in synchronism with the helical gear 184. As a result, a nut member 188 held in threaded engagement with the screw 186 is moved, causing the mirror 19Y supported by a support member 190 to move. The reference numeral 194 designates a leaf spring or presser. As shown in FIG. 10, in this kind of actuator, the displacement y of the mirror 19Y is proportional to the rotation angle $\theta_m$ of the output shaft of the motor 180. This allows the actuator to be controlled relatively easily. However, the screw 186 needs a highly accurate pitch, and therfore increases the cost of the actuator, as discussed earlier.

Preferred embodiments of the deflecting mirror adjusting device in accordance with the present invention and applied to a full-color electrophotographic apparatus by way of example will be described hereinafter. Because the electrophotographic device is identical in construction with the apparatus shown in FIG. 1, only an essential part thereof will be described in relation to the embodiments.

1st Embodiment

Figure 11:
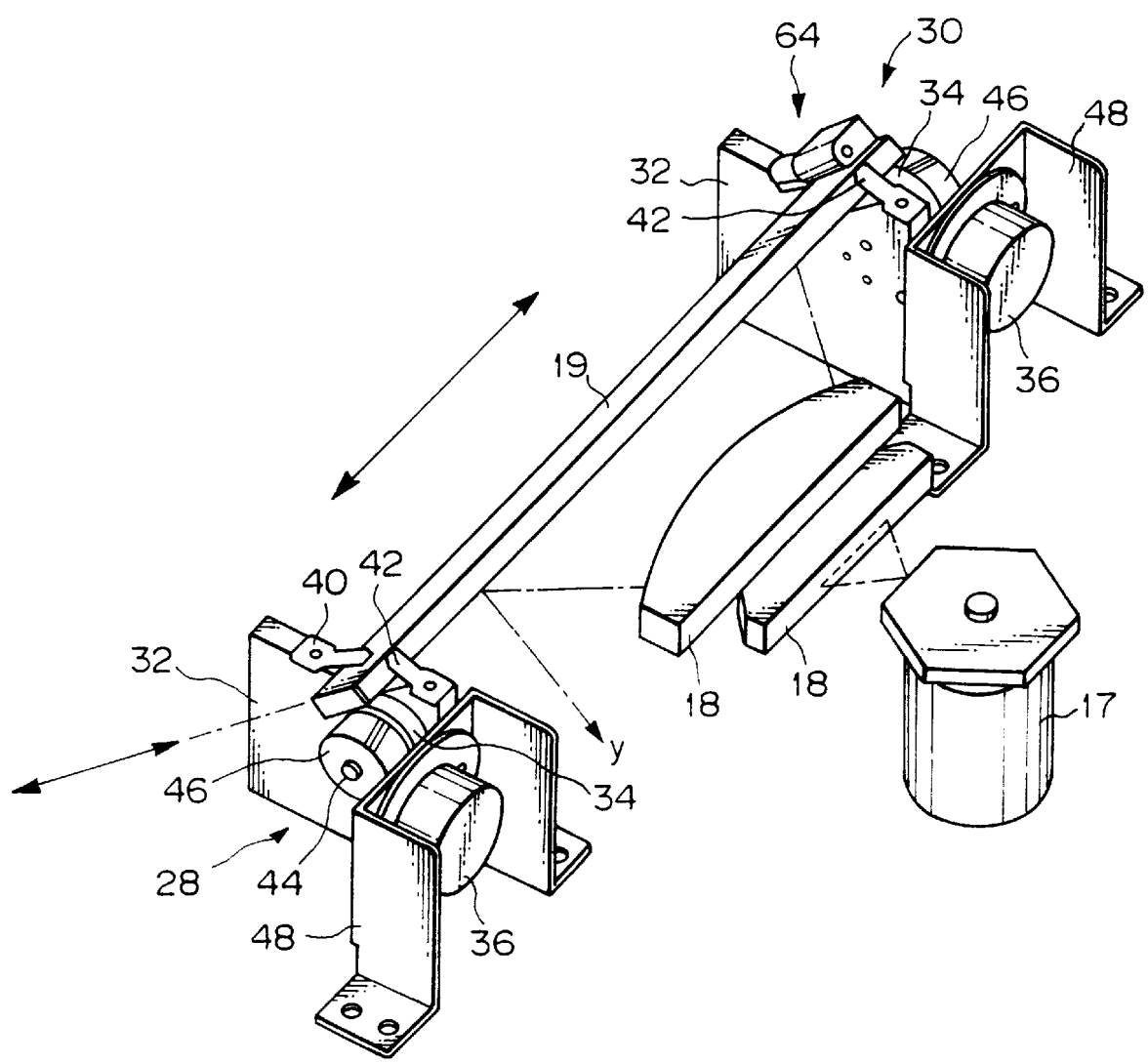
FIG. 11 is an external perspective view showing a first embodiment of the deflecting mirror adjusting device in accordance with the present invention.
Figure 12:
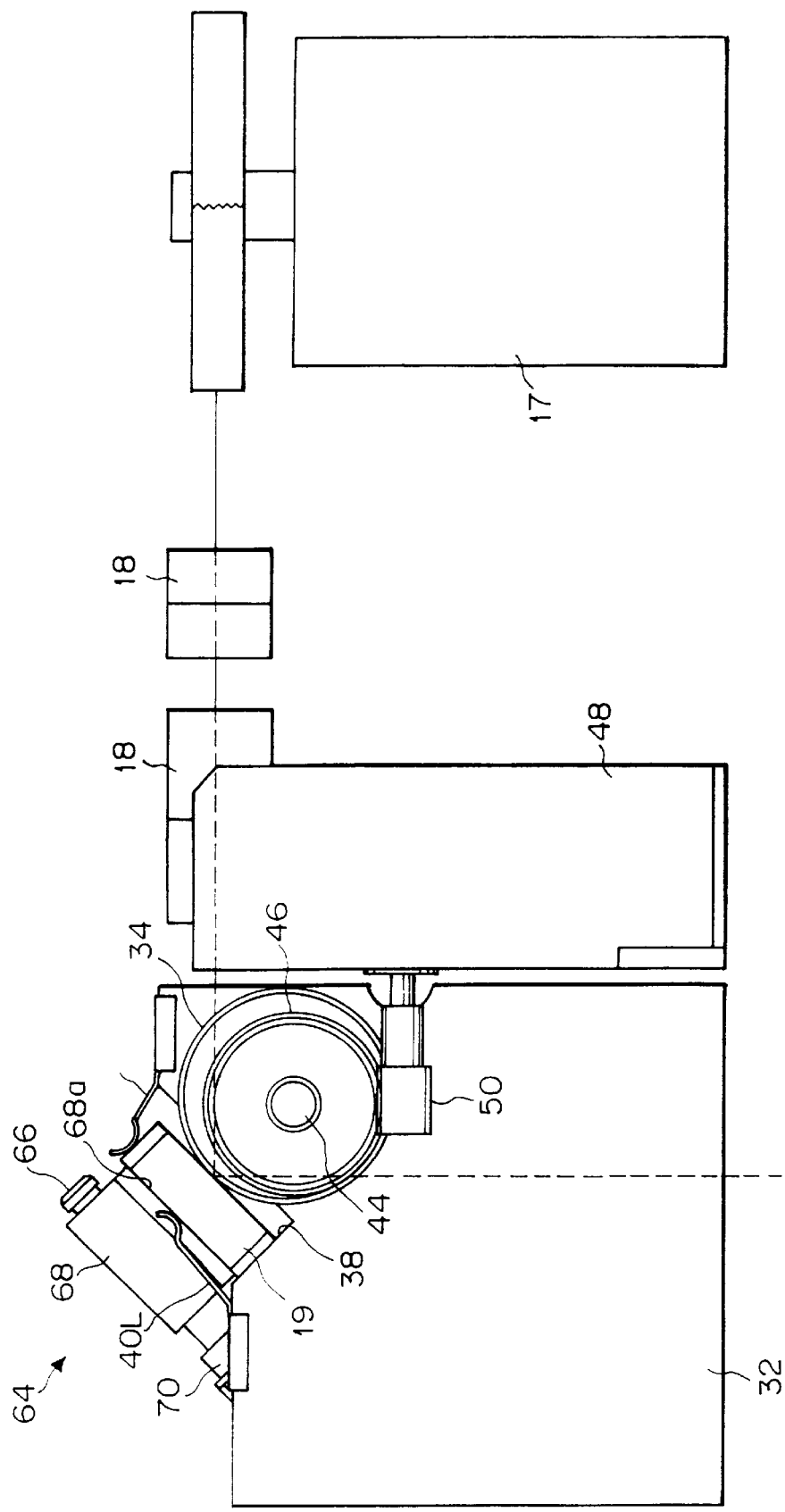
FIG. 12 is a side elevation of the first embodiment.
Figure 13:
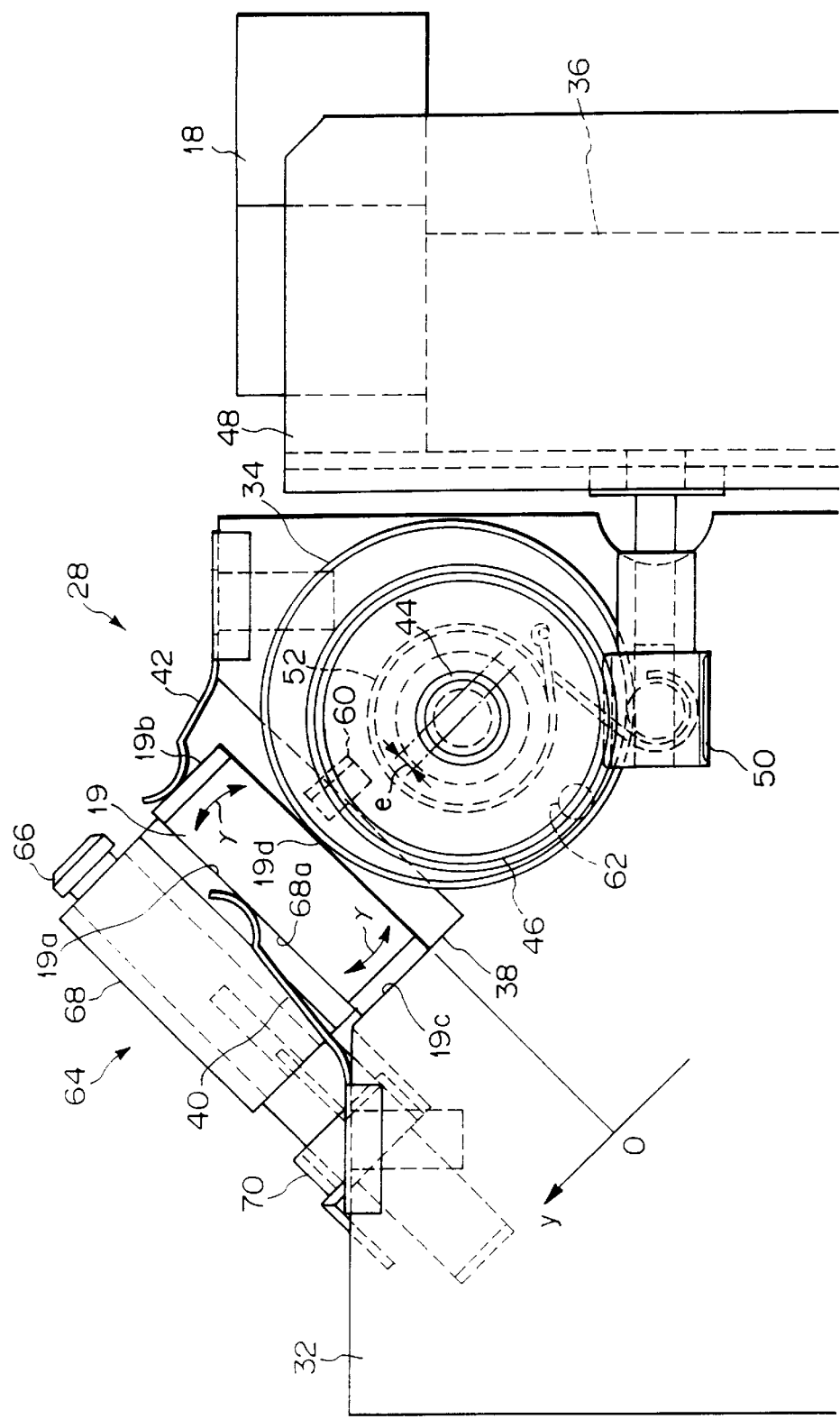
FIG. 13 is a fragmentary enlarged side elevation of the first embodiment.

As shown in FIGS. 11–13, the laser beam from any one of the lasers is reflected by the polygonal scanner 17 and then steered by the f-θ lens 18 and deflecting mirror 19 to be incident to the associated drum. The mirror 19 is supported by a first and a second mirror adjusting device 28 and 30 at opposite ends thereof. The mirror adjusting devices 28 and 30 are independent of each other.

The first mirror adjusting device 28 is generally made up of a side wall or support member 32, an eccentric cam or adjusting member 34, and a stepping motor or drive source 36. As shown in FIG. 13, the side wall 32 is formed with a generally L-shaped notch for receiving one end of the mirror 19. Two leaf springs 40 and 42 are affixed to the side wall 32 in order to press the rear 19a and the side 19b of the mirror 19, respectively. The leaf springs 40 and 42 each has a bent free end. The leaf spring 40 resiliently contact the rear 19a of the mirror 19 and cooperates with the eccentric cam 34 to hold the mirror 19. The eccentric cam 34 and a helical gear 46 are mounted on a cam shaft 44 which is mounted on the side wall 32. The cam 34 and gear 46 are rotatable in synchronism with each other. The stepping motor 36 is supported by a motor bracket 48 mounted on an optics base. A worm gear 50 is directly connected to the output shaft of the motor 36 and held in mesh with the helical gear 46. In this condition, the cam 34 is rotated by the motor 36 with a certain speed reduction ratio. The mirror 19 is positioned by the leaf springs 40 and 42, the notch 38 of the side wall 32, and the eccentric cam 34, i.e., at four points in total; the notch 38 supports the side 19c while the cam 34 supports the front 19d.

The second mirror adjusting device 30 is identical in configuration with the first mirror adjusting device 28 except for a part thereof which will be described later.

As shown in FIG. 13, when the eccentric cam 34 is rotated, the circumference of the cam 34 moves and shifts (adjusts) the mirror 19 in a direction indicated by an arrow y. Although this kind of drive transmission scheme is only illustrative, it is a conventional delicate positioning means because a great speed reduction ratio is available with the worm gear 50 and helical gear 46 and because the helical gear 46 does not rotate when an unexpected force acts thereon. For example, assume that the number of teeth $z_2$ of the helical gear 46 is forty, the number of threads $Z_1$ of the worm gear 50 is one, that the step angle θm of the motor 36 is 15°, and that the eccentricity e of the cam 34 is 1 mm. Then, a mean resolution $y_u$ is expressed as:

$$y_u = 2e \frac{z_1}{1/2 z_2} \frac{\theta_m}{360} \simeq 4.2 \times 10^{-3} \ (\text{mm}) = 4.2 \ (\mu m) \qquad \text{Eq. (2)}$$

In a drive transmission system, backlash between gears obstructs accurate adjustment. In light of this, in the illustrative embodiment, a torsion coil spring 52 is anchored to the eccentric cam 34 and side wall 32 at opposite ends thereof. This causes a torque to act on the cam 34 in one direction and thereby maintains the tooth surface of the helical gear 46 in contact with that of the worm gear 50. In this condition, even the reversible rotation of the cam 34 does not produce any play between the gears, so that adjustment errors ascribable to backlash are obviated. This is another conventional means for accurate adjustment.

The rotation angle of the eccentric cam 34 and the displacement of the mirror 19 are not linearly related to each other. That is, the displacement of the mirror 19 relative to the rotation of the cam 34, i.e., Δy/Δθ varies. It follows that to implement a desired displacement y, means for determining or recognizing the initial position of the cam 19 is needed. A mechanism and means for setting the initial position of the cam 19 will be described hereinafter.

Figure 14:
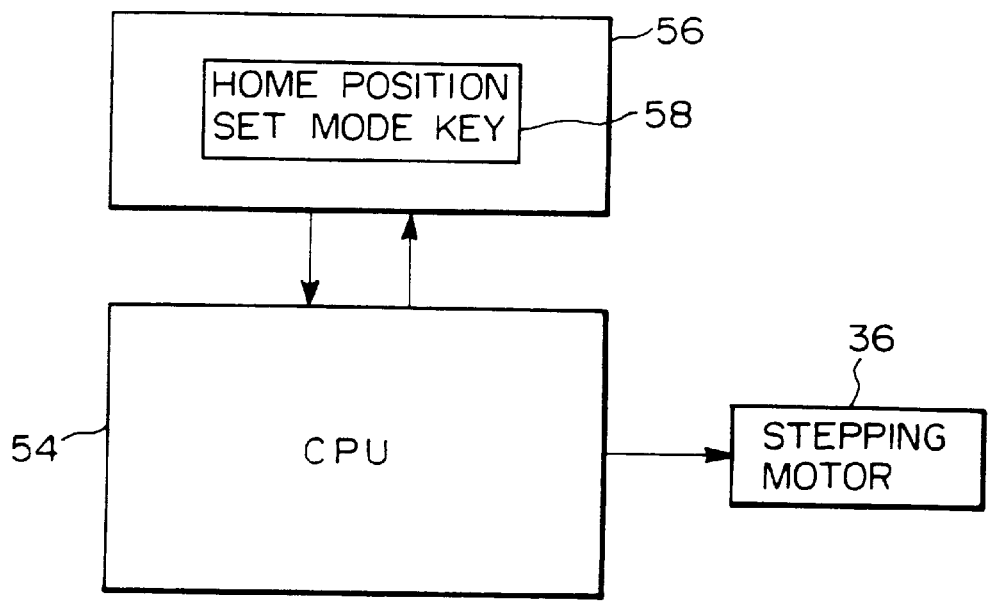
FIG. 14 is a block diagram schematically showing control means included in the first embodiment.

As shown in FIG. 14, the illustrative embodiment includes a CPU (Central Processing Unit) or control means 54. The CPU 54 controls the stepping motor 36 in response to an adjust signal input on an operation panel 56. A home position set mode key 58 is provided on the operation panel 56 in order to allow the home position of the eccentric cam 34 to be set. As shown in FIG. 13, a positioning pawl 60 is provided on the cam 34 while a positioning pin 62 is provided on the side wall 32.

When the home position set mode key 58 is pressed, the CPU 54 outputs pulses the number of which is greater than one causing the pawl 60 and pin 62 to abut against each other. As a result, even after the cam 34 has rotated to bring the pawl 60 into abutment against the pin 62, it rotated continuously. Then, the rated torque of the motor 36 exceeds the drive torque of the cam 34, causing the motor 36 to lose synchronism. Once the motor 36 loses synchronism, the pawl 60 and pin 62 are held in abutment. Therefore, when the CPU 54 stops outputting the pulses, the pawl 60 and pin 62 remain in abutment. Subsequently, the CPU 54 outputs a number of pulses for returning the cam 34 from such a position to its initial position. As a result, the cam 34 is rotated in the reverse direction until it arrives at its initial position or home position. This allows the home position to be accurately set without resorting to a position sensor or similar special implementation.

The accuracy of adjustment available with the above mechanism depends on the degree of true circularity, neglecting the play of the cam 34 and cam shaft 44. However, the highly accurate cam 34 is less expensive than a highly accurate screw. In addition, because the cam 34 does not need a member corresponding to the nut member of the screw scheme, it reduces the number of puts and therefore the cost.

Figure 15:
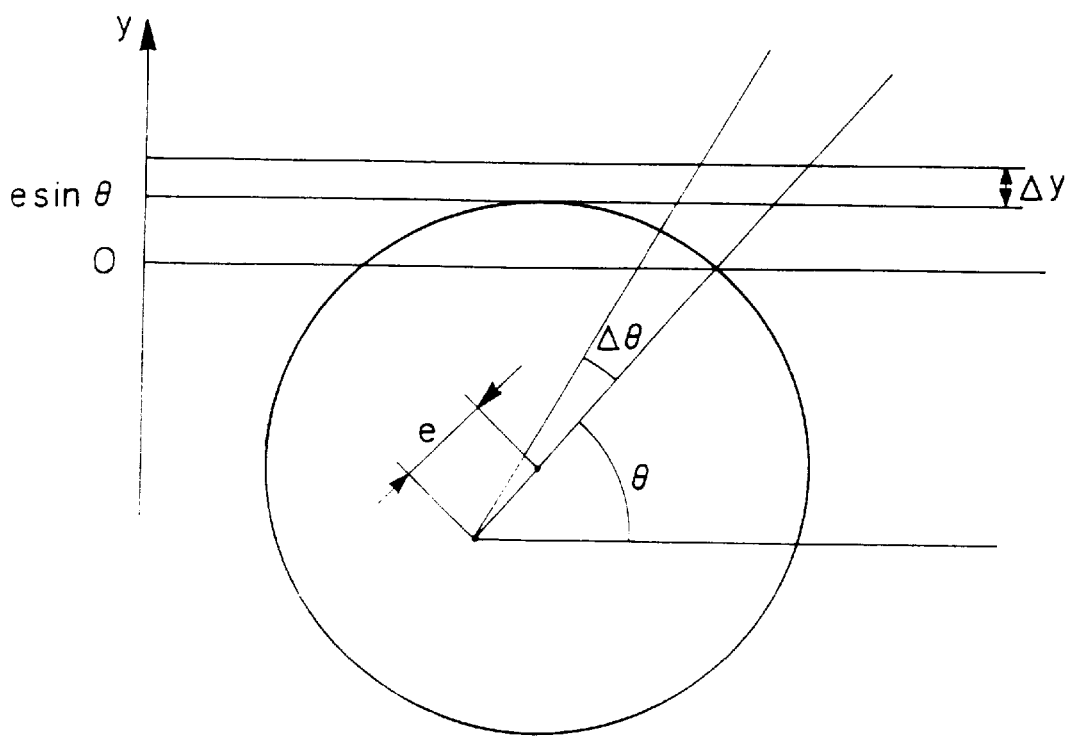
FIG. 15 shows a specific condition in which a deflecting mirror in the first embodiment has its home position set at a position of θ=0°.

As shown in FIG. 15, assume that the home position of the deflecting mirror 19 is selected to be a position where $\theta=0°$ holds. Then, the relation between the rotation angle $\theta$ of the cam 34 and the displacement y of the mirror 19 is expressed as:

$$y=e \sin \theta, \Delta y=e\{\sin(\theta+\Delta\theta)-\sin \theta\} \qquad \text{Eq. (3)}$$

where $\theta$ denotes the rotation angle of the cam 34 from the home position, e denotes the eccentricity of the cam 34, $\Delta y$ denotes the displacement of the mirror 19 resulting from a change in the angle of the cam 34 from the angle $\theta$ position by $\Delta\theta$, and $\Delta\theta$ is a variation in the angle of the cam 34.

Figure 16A:
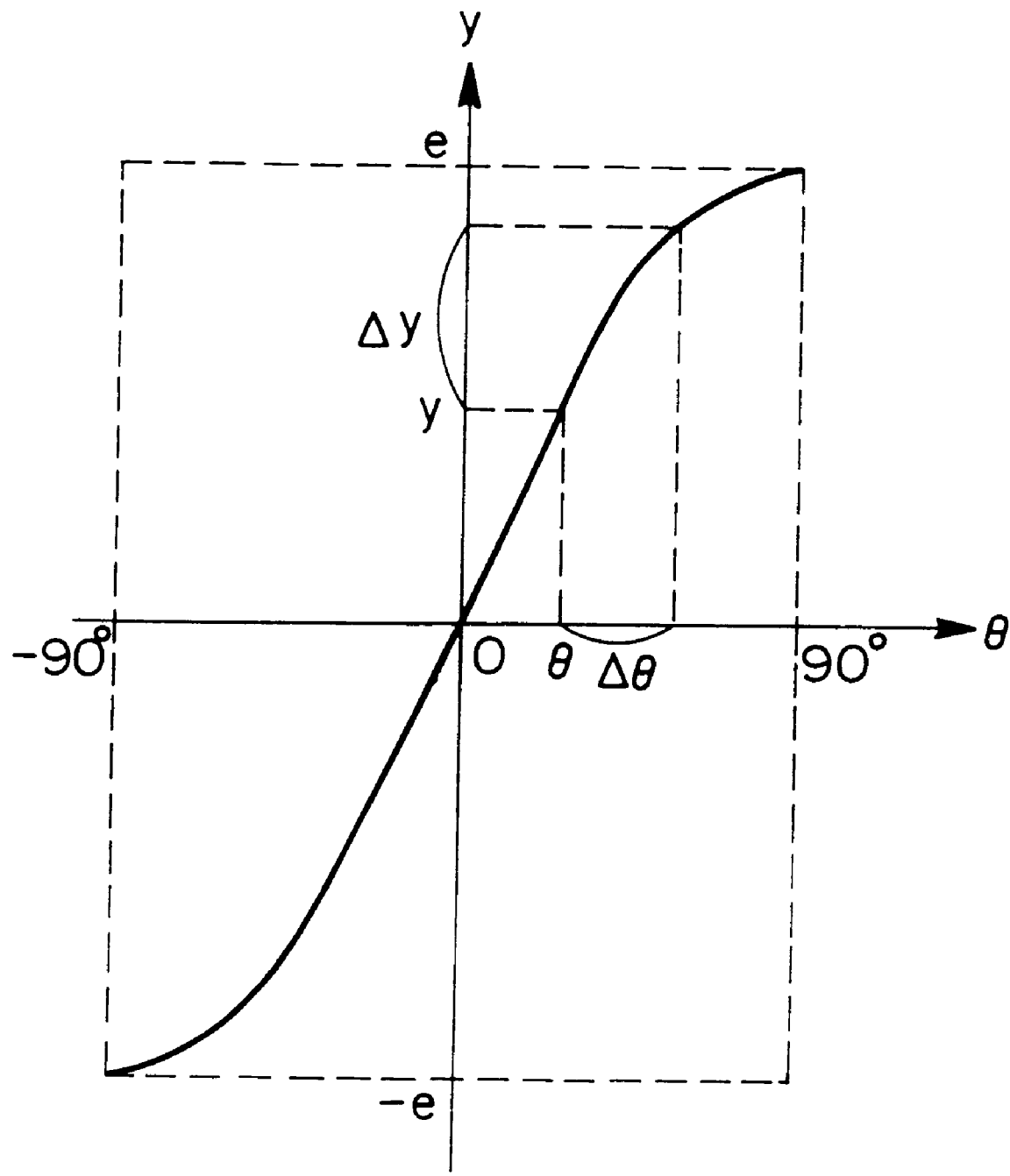
FIGS. 16A and 16B are graphs showing a relation between the rotation angle of an eccentric cam included in the first embodiment and the displacement of the mirror.
Figure 16B:
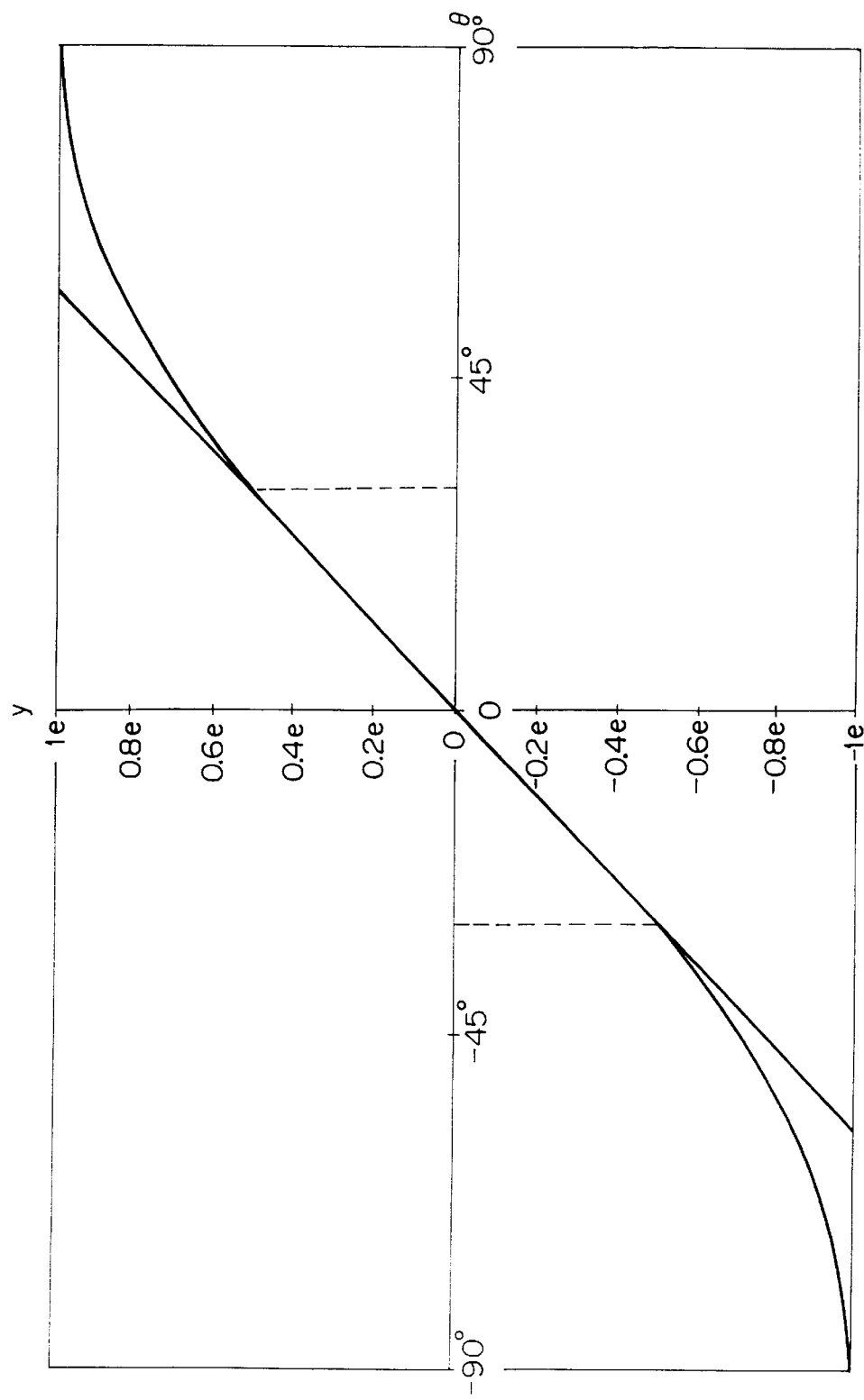

FIGS. 16A and 16B are graphs representative of the above Eq. (3); the ordinate and abscissa indicate y and $\theta$, respectively. Each graph has a range defined by $-90°\leq\theta\leq90°$ and $-e\leq y\leq e$. As shown, y and $\theta$ are substantially linearly related to each other around the home position, but not linearly related at positions remote from the home position. For the movement control, a limited range around the home position may be considered as a movement control stroke, and the relation between y and $\theta$ may be regarded to be linear. Although this kind of scheme eliminates the need for special computation, it limits the stroke available for control to a noticeable degree. Then, it is likely that the displacement is not sufficient if the individual part contributing to the positioning of the mirror 19 has rough dimensional accuracy. Further, should the displacement be increased to guarantee the stroke, the resolution of control would be reduced and would obstruct delicate adjustment.

In light of the above, on receiving the adjust signal, the CPU 54 performs an equation:

$$\Delta\theta=\sin^{-1}(\sin \theta+\Delta y/e)-\theta \qquad \text{Eq. (4)}$$

The CPU 54 sends to the motor 36 a number of steps or pulses produced by the above Eq. (4). As a result, a desired displacement y of the mirror 19 is achievable without regard to the position of the cam 34. In addition, this kind of control allows the control stroke of the cam 34 to be used up to $-90°\leq\theta\leq90°$. Therefore, the inclination of the mirror 19 can be adjusted with high resolution and high accuracy and over a great stroke.

The inclination of the mirror 19 in the main scanning direction is successfully adjusted by the above mechanism. As for the irregular pitch of the scanning lines in the subscanning direction, it is necessary to cause the mirror 19 to perform parallel movement. For the parallel movement of the mirror 19, a drive mechanism for displacing the opposite ends of the mirror 19 is essential. For this purpose, the embodiment includes the first and second mirror adjusting devices 28 and 30. In the event of image formation, the adjusting devices 28 and 30 cause the mirror 19 to move independently of each other, but by the same displacement.

Figure 17:
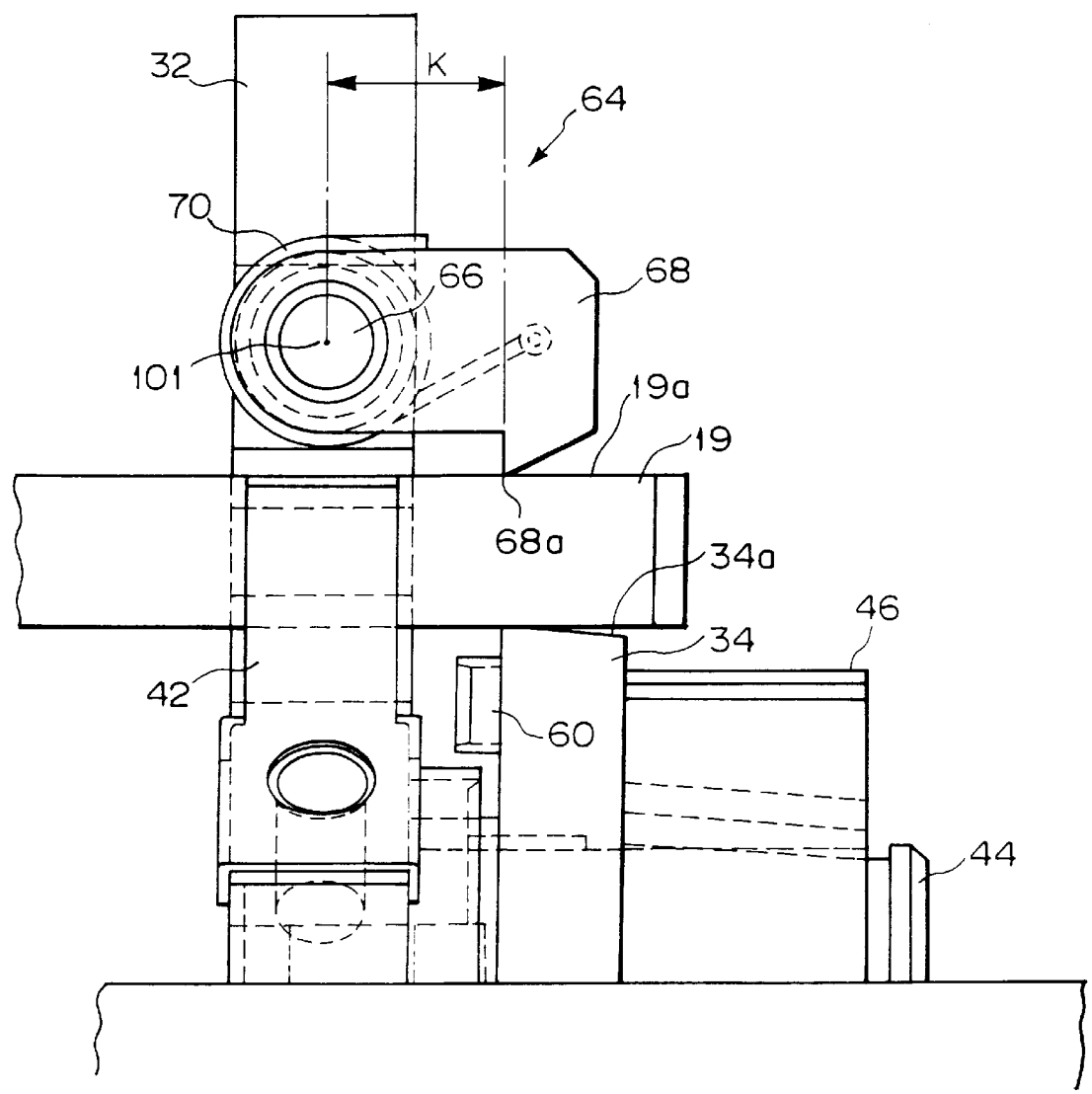
FIG. 17 shows an inclination holding mechanism included in the first embodiment.
Figure 18:
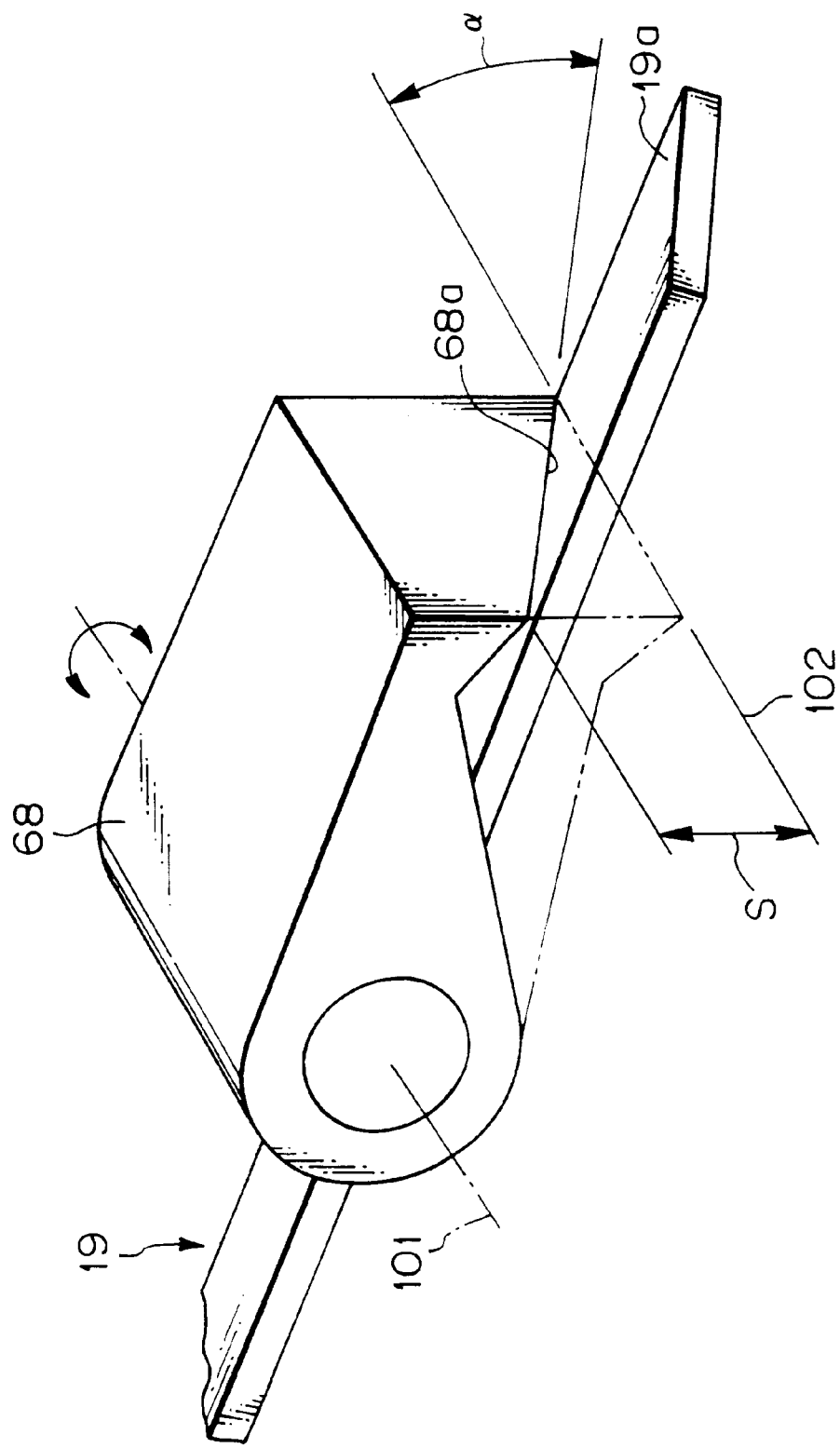
FIG. 18 is an external perspective view of a presser member included in the first embodiment.

To maintain the parallelism of the mirror 19, a mechanism for preventing the mirror 19 from moving angularly in a direction y shown in FIG. 13 is necessary. Any angular displacement in the direction y would lead to an error in optical path, obstructing accurate adjustment. It is extremely difficult to correct the optical path by changing the inclination of the mirror 19, as stated previously with reference to FIG. 8. As shown in FIG. 11, in the embodiment, the second adjusting device 30 has an inclination holding mechanism 64 in place of the leaf spring 40. As shown in FIG. 17, the inclination holding mechanism 64 has a shaft 66, a presser member 68, and a torsion coil spring or biasing means 70. The shaft 66 is mounted on the side wall 32 of the adjusting device 30, and extends in the subscanning direction. The presser member 68 includes a wedge-like sharp end and makes point-to-point of line-to-line contact with the rear 19a of the mirror 19 at a position where the member 68 faces the cam 34. The torsion coil spring 70 is anchored to the side wall 32 and presser member 68 at both ends thereof. The spring 70 biases the presser member 68 such that a ridge 68a included in the member 68 constantly contacts the rear 19a of the mirror 19. The ridge 68a is parallel to the shaft 66 in order to prevent the inclination of the mirror 19 from varying when the presser member 68 moves angularly due to the displacement of the mirror 19.

The mechanism 64 having the above arrangement maintains the contacting portions of the presser member 68 and mirror 19 constant. Therefore, the positional accuracy of the contacting portions do not effect the parallelism of the mirror 19. In addition, the stroke of the presser member 68 is small enough to minimize the influence of play.

An error in the parallelism between the ridge 68a and the shaft 66 results in an error in the writing position which may be determined, as follows. FIGS. 18 and 19A–19C each shows, in an exaggerated scale, a case wherein an error exists in the parallelism between the ridge 68a and the shaft 66.

Figure 19A:
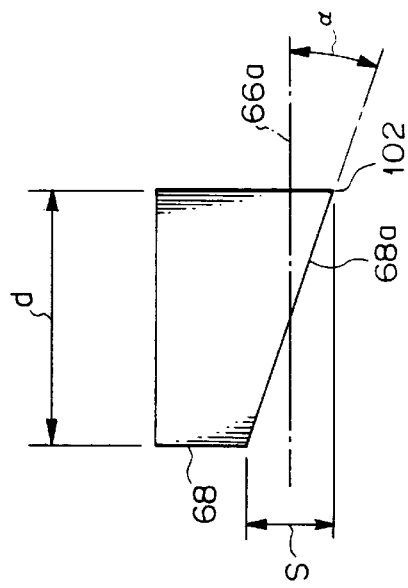
FIGS. 19A–19C are views for describing errors in the parallelism between the presser member of FIG. 18 and a support shaft.
Figure 19B:
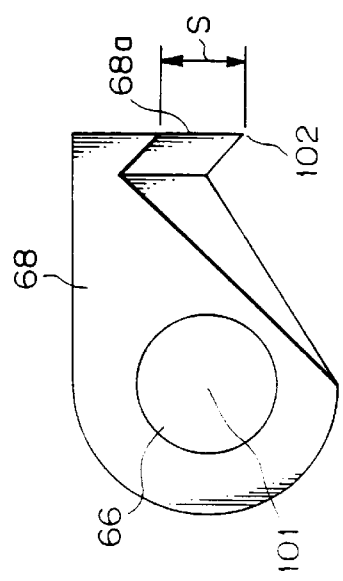

FIGS. 19A and 19B show a case wherein an error $\alpha$ exists in the angle between the ridge 68a and the axis 66a of the shaft 66. In this case, the initial error $\alpha$ is produced by:

$$\alpha=\tan^{-1}(S/d) \qquad \text{Eq. (5)}$$

where S denotes parallelism, and d denotes the width of the presser member 68.

Figure 19C:
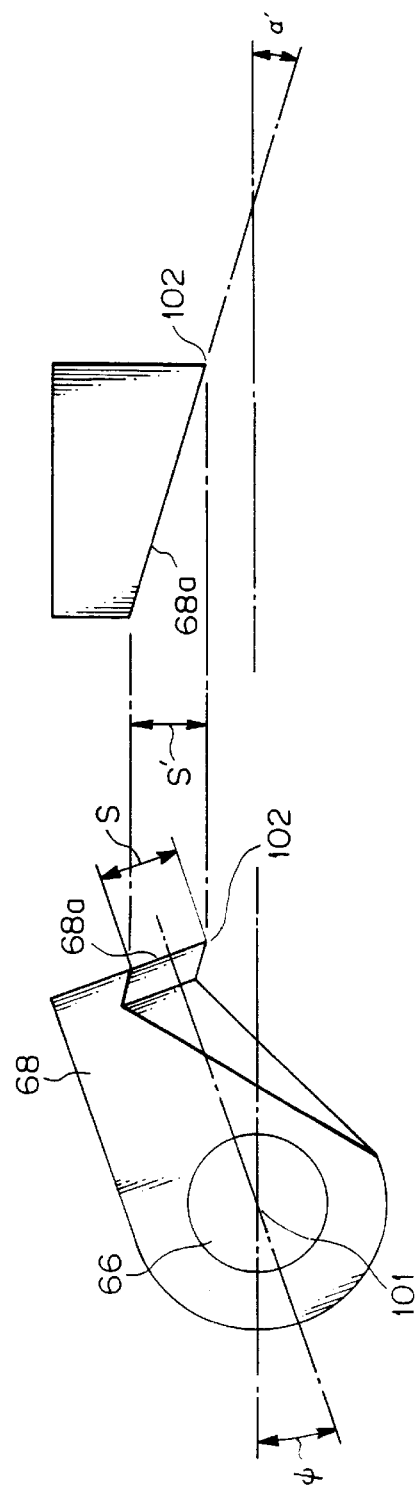

As shown in FIG. 19C, an error $\alpha'$ at a certain position of rotation is expressed as:

$$\alpha'=\tan^{-1}(S'/d)=\tan^{-1}(S \cos \phi/d) \qquad \text{Eq. (6)}$$

where φ denotes the rotation angle of the presser member 68.

Therefore, a variation in inclination is produced by:

$$|\alpha'-\alpha|=|\tan^{-1}(S\cos\phi/d)-\tan^{-1}S/d| \qquad \text{Eq. (7)}$$

For example, assuming that S is 0.1 mm, that d is 15 mm, and that φ is 10°, then:

$$|\alpha'-\alpha|=5.81\times 10^{-3}$$

In FIG. 8, assume that the optical path between the mirror 19Y and the drum 2Y has a length L of 100 mm. Then, because θ corresponds to the above error α', the write error δ is derived from δ≈2θL, as:

$$\delta = 2\times 100\times 10^3 \times 5.81\times 10^{-3}\times\pi/180 = 20\ \mu m$$

The mirror 19Y can therefore be moved in the parallel direction with sufficient accuracy.

As the Eq. (7) indicates, as the rotation angle φ decreases, the influence of the error in the parallelism between the ridge 66a and the shaft 66 on the variation in the inclination of the mirror 19 during movement decreases. It follows that to reduce the angle φ while guaranteeing the amount of adjustment, the angle φ is selected as follows:

$$\phi = \tan^{-1}(e/K) \qquad \text{Eq. (8)}$$

where e denotes the eccentricity of the cam 34 (±mm), and K denotes the distance between a fulcrum 101 corresponding to the center of the shaft 68 and a point of action 102 where the presser member 68 acts on the mirror 19 (FIG. 17).

Figure 20:
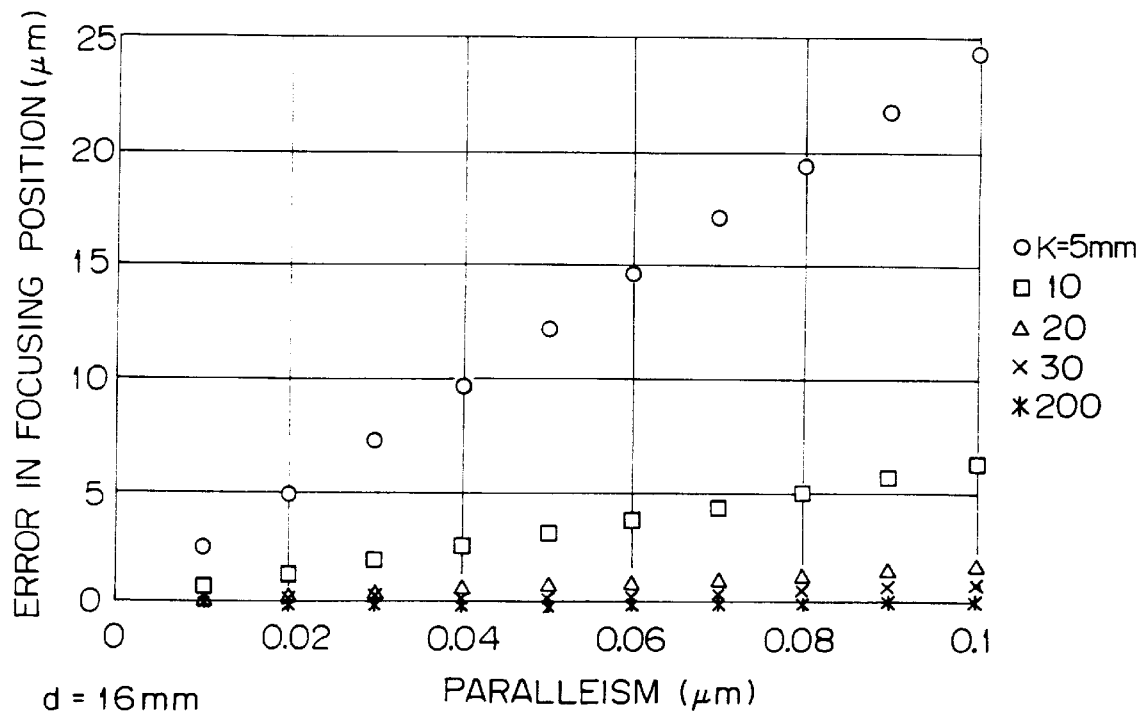
FIG. 20 shows the result of simulation relating to a relation between an error in the parallelism between lines respectively corresponding to a fulcrum and a point of action and an error in focusing position.

For example, if e is 1 mm and K is 200 mm, the angle φ is as small as about 0.3°. FIG. 20 shows the result of simulation in which errors in focusing position ascribable to errors in parallelism are plotted with K used as a parameter. As shown, the influence of the error in parallelism on the variation in inclination sharply decreases with an increase in the distance K between the fulcrum 101 and the point of action 102. When an error of 25 μm or less in focusing position is desired as an allowable standard, the minimum value of K should preferably be 5 mm.

Figure 21A:
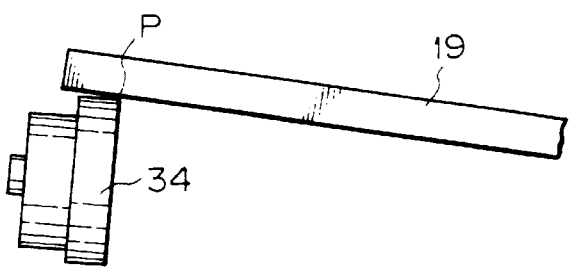
FIGS. 21A and 21B show bow a point where the mirror and eccentric cam contact in the main scanning direction moves.
Figure 21B:
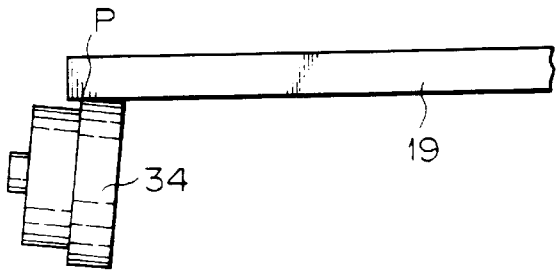

As shown in FIGS. 21A and 21B, assume that the point of contact P between the cam 34 and the mirror 19 is displaced in the main scanning direction due to the inclination of the mirror 19. Then, an error occurs in the control over the movement of the mirror 19. To eliminate this problem, as shown in FIG. 17, the cam 34 has a tapered contact surface 34a. This successfully prevents the contact point P from moving in the main scanning direction and thereby obviates errors ascribable to the movement of the point P.

Figure 22:
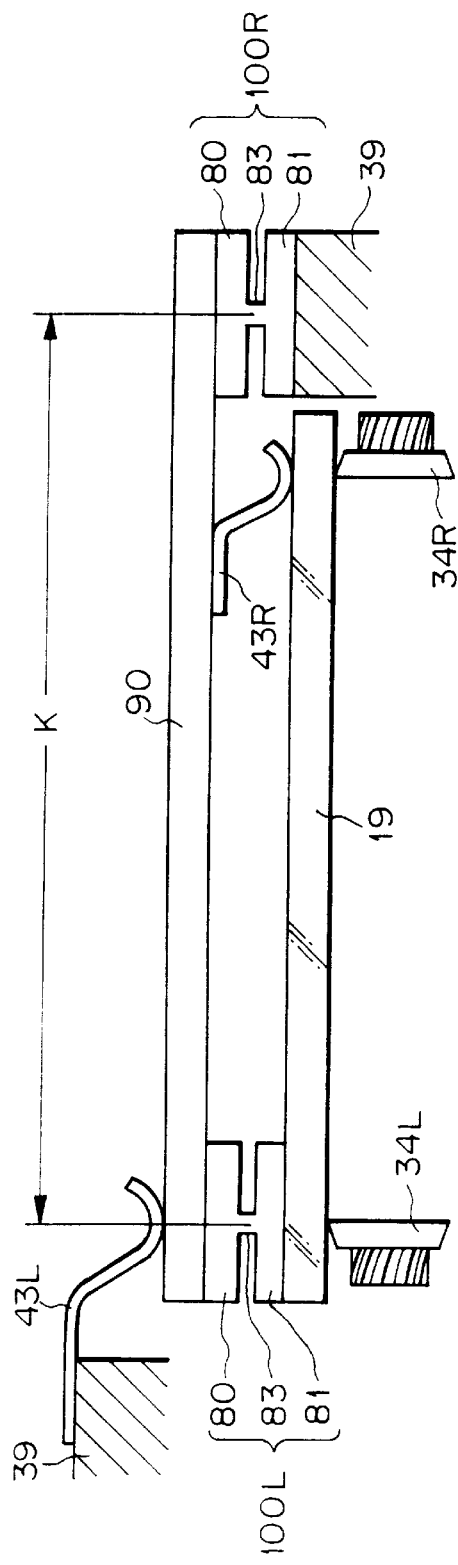
FIG. 22 is a fragmentary view showing a modification of the first embodiment.
Figure 23:
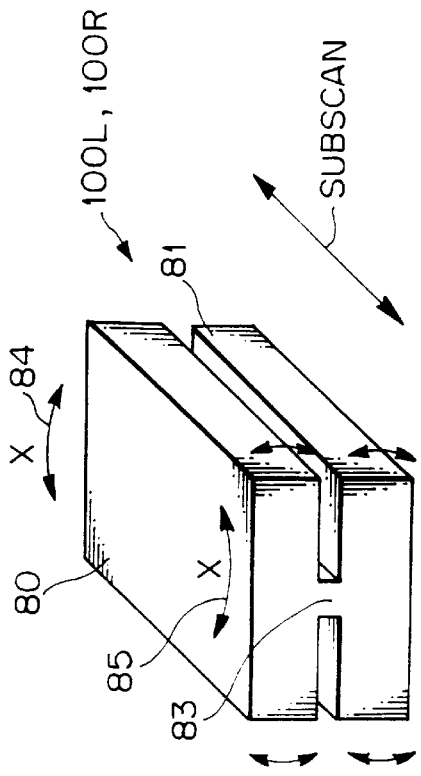
FIG. 23 is an external perspective view of an elastic H-shaped block included in the modification.

Referring to FIGS. 22 and 23, a modification of the illustrative embodiment will be described. The modification to be described is similar to the embodiment except for the following. As shown, the presser member 68, FIG. 11, is replaced with an arrangement including an elastic H-shaped block 100R, a rigid elongate arm 90 having a rectangular cross section, and a leaf spring 43R. The leaf spring 40, FIG. 11, is replaced with an arrangement including a second elastic H-shaped block 100L, a second leaf spring 43L, and a pan of the arm 90. The mirror 19 is guided in a predetermined direction of normal by the notch 38, FIG. 13, although not shown in FIG. 22. The leaf springs 43R and 43L each has a curved free end contacting the respective object.

The elastic blocks 100L and 100R may have the same configuration and size and may be formed of the same material. As shown in FIG. 23, the blocks 100L and 100R each appears as if two rectangular plates 80 and 81 were connected together face-to-face by a rotatable shaft 83. Each block 100L or 100R is formed of rubber, synthetic resin or similar elastic material. For example, the plates 80 and 81 and shaft 83 are implemented as a single molding. The plates 80 and 83 are rotatable relative to each other about the shaft 83, but sparingly deformable in the other directions. Specifically, the plates 80 and 83 do not deform in a curved configuration represented by arrows 84 and 85. The curved configuration would cause the mirror 19 to deform in an undesirable manner. While the blocks 100R and 100L meet the above demand with case, the size of the plates 81 and 82 and that of the shaft 83 may be suitably selected in order to further enhance such an effect.

In FIG. 22, the block 100R has the top of the plate 80 affixed to the bottom of the arm 90 with the axial direction of the shaft 83 coinciding with the subscanning direction on the mirror 19 (perpendicularly to the sheet surface of FIG. 22). The bottom of the plate 81 of the block 100R is affixed to the top of an apparatus body or stationary member 39. Further, the base end of the leaf spring 43R is affixed to the bottom of the arm 90 while the free end of the same is held in pressing contact with a portion of the rear of the mirror 19 facing the cam 34R. In this configuration, the block 100R, arm 90 and leaf spring 43 constitute a support member supporting one end of the mirror 19.

Likewise, the block 100L has the top of the plate 80 affixed to the bottom of the arm 90 with the axial direction of the shaft 83 coinciding with the subscanning direction on the mirror 19 (perpendicularly to the sheet surface of FIG. 22). The bottom of the block 100L is affixed to a part of the rear of the mirror 19 facing the cam 34L. Therefore, the block 100L, arm 90 and leaf spring 43L constitute a support member supporting the other end of the mirror 19.

In the above modification, assume that the cam 34L, for example, is rotated in order to correct skew with the cam 34R held stationary. Then, one end of the mirror 19 moves with the shaft 83 of the block 100R and the shaft 83 of the block 100L serving as a fulcrum and a point of action, respectively. When only the cam 34R is rotated for the same purpose, the other end of the mirror 19 moves with the shaft 83 of the block 100L and the shaft 93 of the block 100R serving as a fulcrum and a point of action, respectively.

Figure 24:
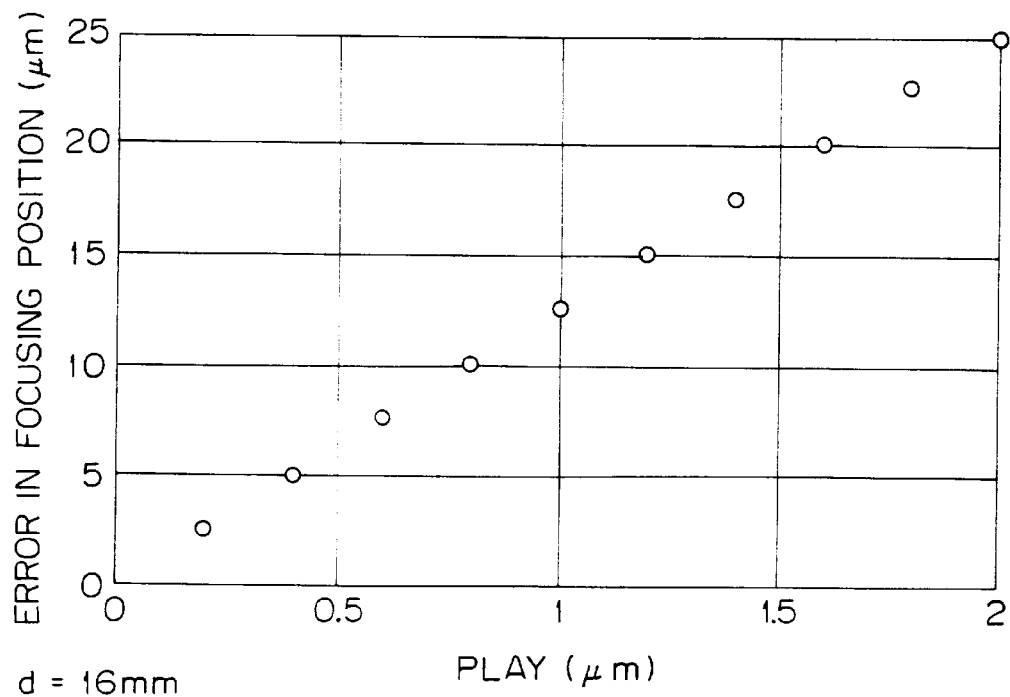
FIG. 24 shows the result of simulation relating to a relation between play around a support shaft and an error in focusing position.

While the shaft 66 of the first embodiment is mechanically coupled, the shaft 83 is formed integrally with the plates 80 and 91 and therefore free from play. For comparison, FIG. 24 shows the result of simulation in which errors in the focusing position and ascribable to play occurred around the shaft 66 are plotted. As shown, play of 2 μm around the shaft 66 results in an error of 25 μm in focusing position. This, coupled with the error in parallelism (K=5 mm), makes the error in focusing position as great as 50 μm exceeding the allowable limit. Therefore, in the first embodiment, the play around the shaft 66 must be severely restricted. For example, if K is 10 mm, play of about 1.5 μm seems to reduce the error in focusing position below 25 μm inclusive.

The two shafts 83 each selectively serves as a fulcrum or a point of action, depending on the situation. Assuming that the distance between the fulcrum and the point of action is K, as in the first embodiment, then K can be far greater than in the first embodiment. In the actual apparatus, it is possible to select K of 200 mm in accordance with the length of the mirror 19. In such a case, the maximum rotation angle φ for guaranteeing the actually needed displacement should only be 0.3°. In this condition, assuming that the length d of the shaft 83 in the subscanning direction is 16 mm, then the error in focusing position is substantially zero, as shown in FIG. 20. This, coupled with the fact that the shaft is free from play, substantially eliminates the error in focusing position.

Figure 25:
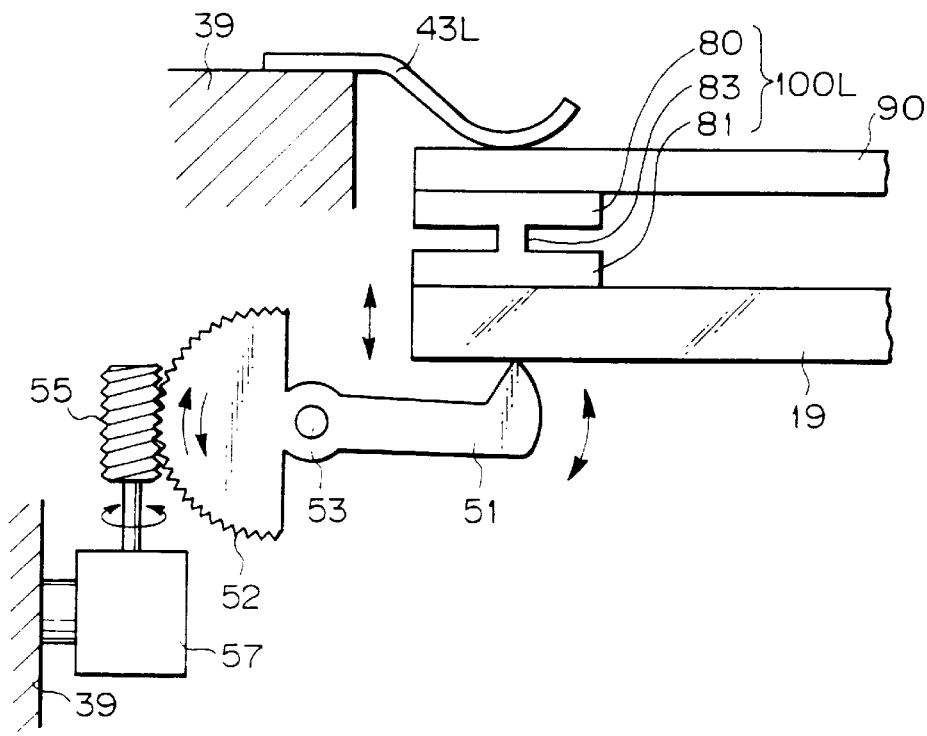
FIG. 25 is a view showing a support mechanism using a lever.

FIG. 25 shows an arrangement which may be substituted for each of the cams 34L and 34R included in the first embodiment and its modification. As shown, an arm 51 formed integrally with a segment gear 52 is rotatably supported by a shaft 53. The segment gear 52 is held in mesh with a worm 55 which is driven by a reversible stepping motor 57. Alternatively, use may be made of a piezoelectric element or a screw mechanism (worm gear 182, bevel gear 184, screw 186 and nut member 188 shown in FIG. 9) which is a conventional actuator. Among them, the eccentric cam mechanism including the cams 34, as described in relation to, e.g., the first embodiment, is advantageous over the others in that it can support the mirror 19 stably and can give different displacements surely and rapidly with a simple configuration.

As stated above, the first embodiment achieves various unprecedented advantages as enumerated below.

(1) Adjusting members are implemented as eccentric cams which simplify the construction, compared to screws, levers or the like. Moreover, highly accurate stepless adjustment and low production cost are achievable.

(2) The rotation angle of each eccentric cam is controlled on the basis of particular computation. Therefore, a deflecting mirror can be adjusted with accuracy even at rotation angles remote from a home position, so that a displacement (adjustment) control range is broadened.

(3) Adjusting devices in the form of cam actuators are located at both ends of the deflecting mirror and operated independently of each other. Therefore, the mirror can be corrected as to both the inclination and the parallel movement.

(4) An inclination holding mechanism is located at one end of the deflecting mirror in order to regulate a variation in inclination in the event of parallel movement of the mirror. This enhances accurate adjustment.

(5) The surface of each eccentric cam contacting the mirror is tapered. This prevents the point of contact of the mirror and cam in the main scanning direction from varying. This also enhances accurate adjustment.

(6) Assuming the the mirror is 16 mm wide, then an error in focusing position can be reduced to about 25 $\mu$m acceptable in practice, neglecting the errors of rotatable shafts.

(7) The mirror can be stably supported, and different displacements can be given surely and rapidly by a simple configuration.

2nd Embodiment

This embodiment, like the first embodiment, is applied to the full-color electrophotographic apparatus shown in FIG. 1 and operated in the previously described manner. This embodiment is similar to the first embodiment except for the following. In the illustrative embodiment, assume that the process linear velocity V is 180 mm/sec, that the resolution in the subscanning direction is 1,200 dpi (dots per inch), and that a sheet of format A4 (297 mm) is fed longitudinally. While this embodiment, like the first embodiment, uses the stepping motors 36 in order to drive the deflecting mirror 19, the mirror 19 may be positioned on the basis of the output of a rotary encoder mounted on a DC motor, if desired.

Figure 26:
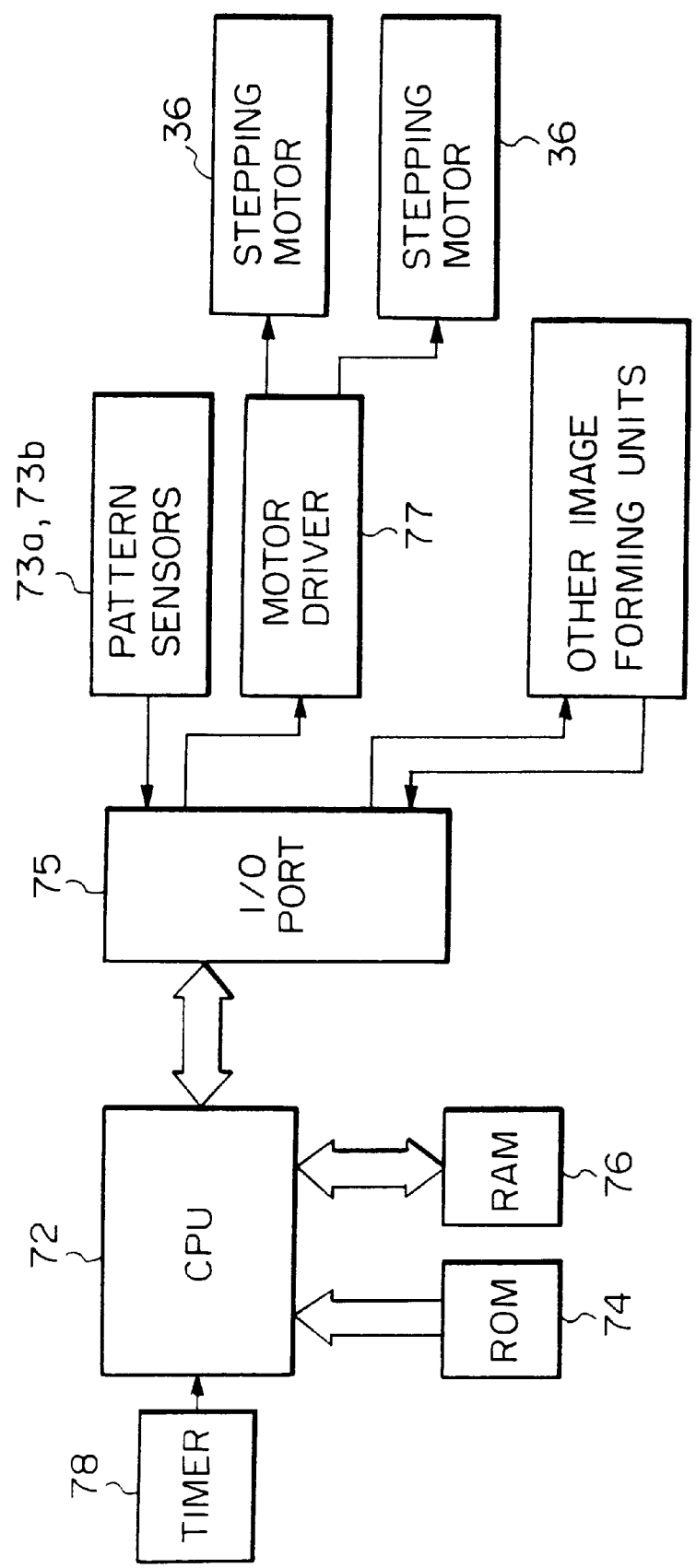
FIG. 26 is a block diagram schematically showing control means included in a second embodiment of the present invention.

As shown in FIG. 26, the illustrative embodiment includes a CPU or control means 72. Various devices are connected to an I/O (Input/Output) port 75. The CPU 72 causes an image to be formed by controlling such devices in accordance with a program stored in a ROM (Read Only Memory) 74. At the same time, the CPU 72 writes and reads various data out of a RAM (Random Access Memory) 76. The two stepping motors 36 for driving the mirror 19 are connected to the I/O port 75 via a motor driver 77. A timer or timer means 78 sends an interrupt signal to the CPU 72.

Figure 27:
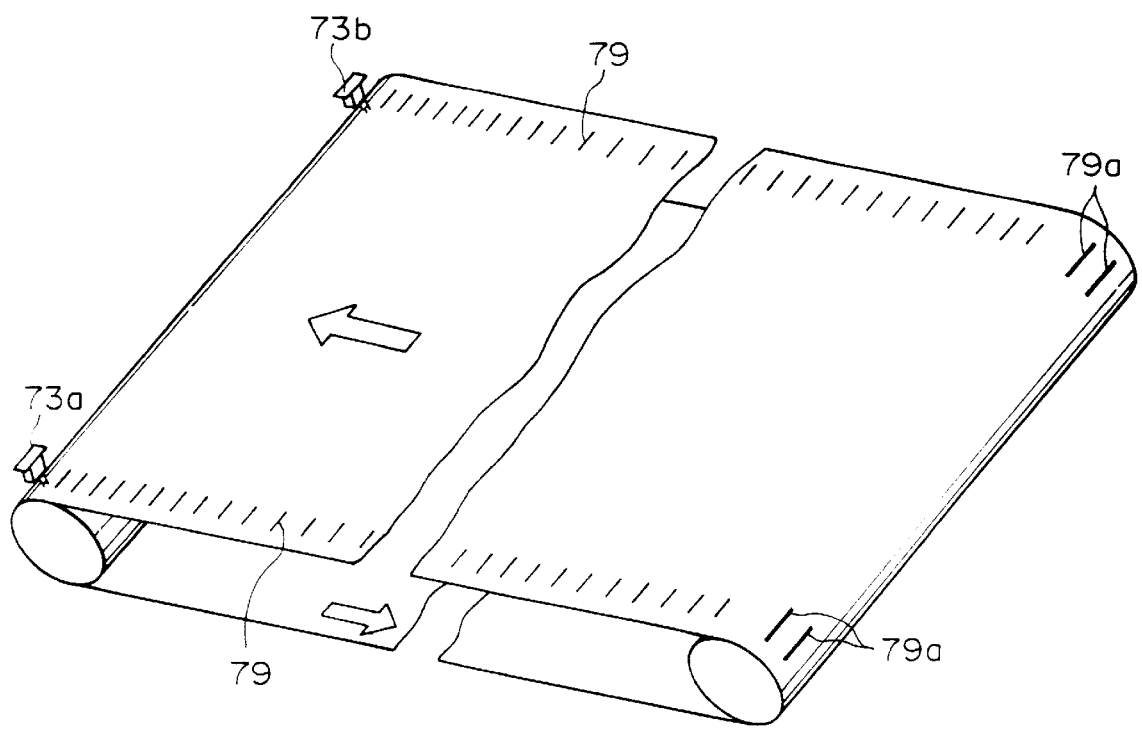
FIG. 27 is an external perspective view showing a relation between patterns for measurement formed an a transfer belt included in the second embodiment and pattern sensors.

In this embodiment, a laser scanner serving as the exposing device 3 functions as means for forming on both edges of the transfer belt 9 in the main scanning direction, patterns for measuring a positional deviation between different colors. Specifically, as shown in FIG. 27, patterns 79 for measurement are optically written to both edges of the transfer belt 9 by a laser beam such that each fifty consecutive lines have the same pitch. The patterns are developed by the developing device 4. Two pattern sensors or pattern sensing means 73a and 73b adjoin both edges of the belt 9 in order to sense a deviation between different colors at least in the subscanning direction. As shown in FIG. 26, the outputs of the pattern sensors 73a and 73b are also fed to the CPU 72.

The distance $\Delta$d and the time lag $\Delta$t between the lines of each pattern 79 are respectively 1.59 $\mu$m and 5.88 ms, taking account of the linear velocity and resolution. In practice, however, it is likely that an image skews or the drum 2 and belt 9 rotate irregularly due to an error in the parallelism of the mirror 19, drum 2, etc., resulting in an irregular pitch. As a result, although the patterns may be written at the time intervals $\Delta$t, the outputs of the pattern sensors 73a and 73b sometimes fail to appear at the intervals $\Delta$t.

How the embodiment controls the mirror 19 on the basis of the outputs of the pattern sensors 73a and 73b will be described. While the following description concentrates on a single color, the same procedure will also be executed with other colors, although not shown or described specifically. The independent drive of the right and left ends of the mirror 19 is the same as in the first embodiment, and will not be described in order to avoid redundancy.

Figure 28:
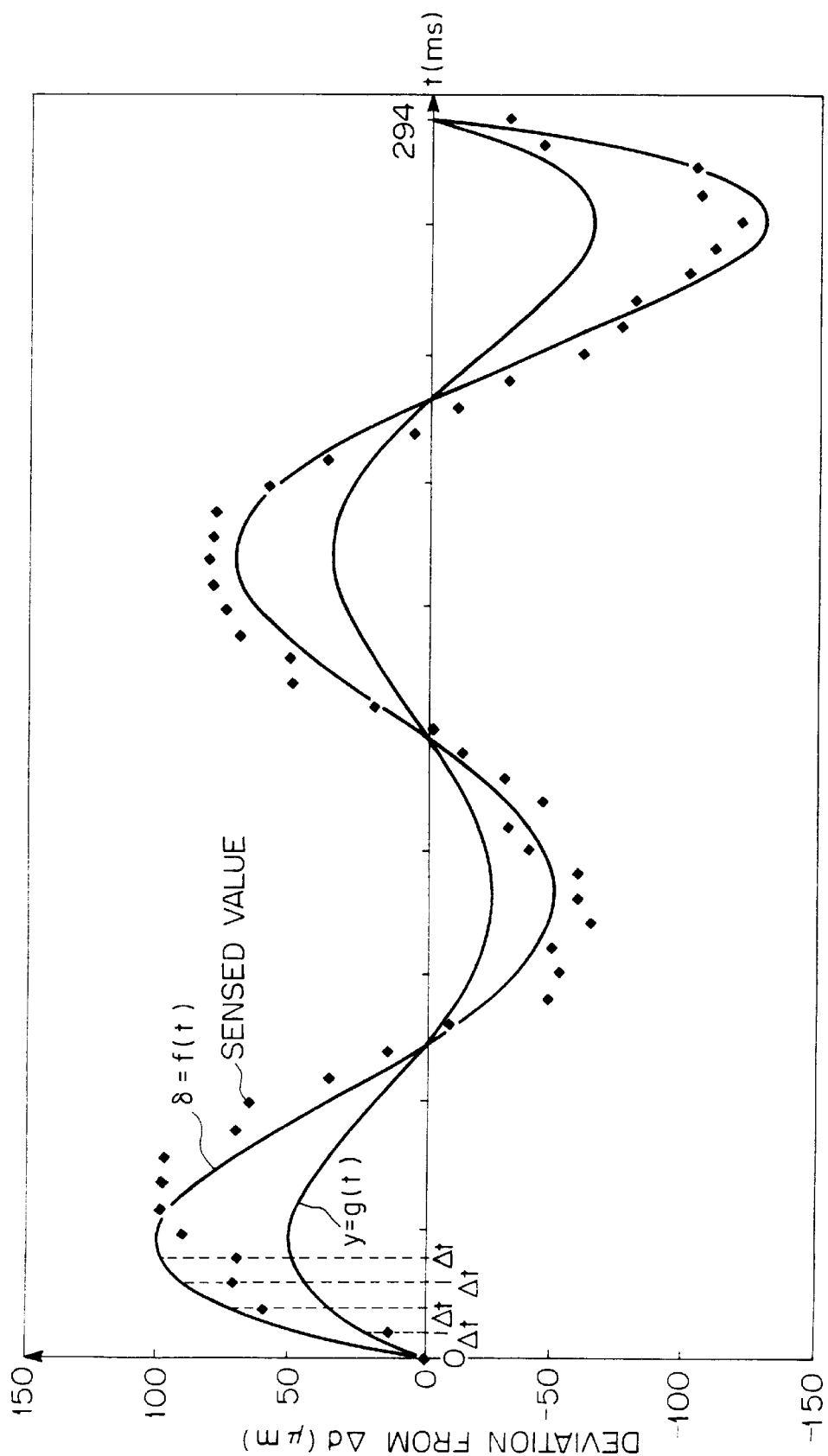
FIG. 28 is a graph showing a relation between data measured by the pattern sensors and an approximate curve thereof.

As shown in FIG. 27, the transfer belt 9 runs in a direction indicated by arrows. The patterns 79 formed on the belt 9 are brought to the positions where the pattern sensors 73a and 73b are located. FIG. 28 plots the result of line-by-line detection and the distance $\Delta$d. As FIG. 28 indicates, the outputs of the pattern sensors 73a and 73b include errors. It follows that the positional deviation on an image cannot be minimized if the sensor outputs are directly used as data for determining the amount of control over each eccentric cam 34. To reduce the influence of errors in the outputs of the pattern sensors 73a and 73b, the embodiment produces a curve approximated to the sixth degree item by use of the minimum square method.

Figure 29:
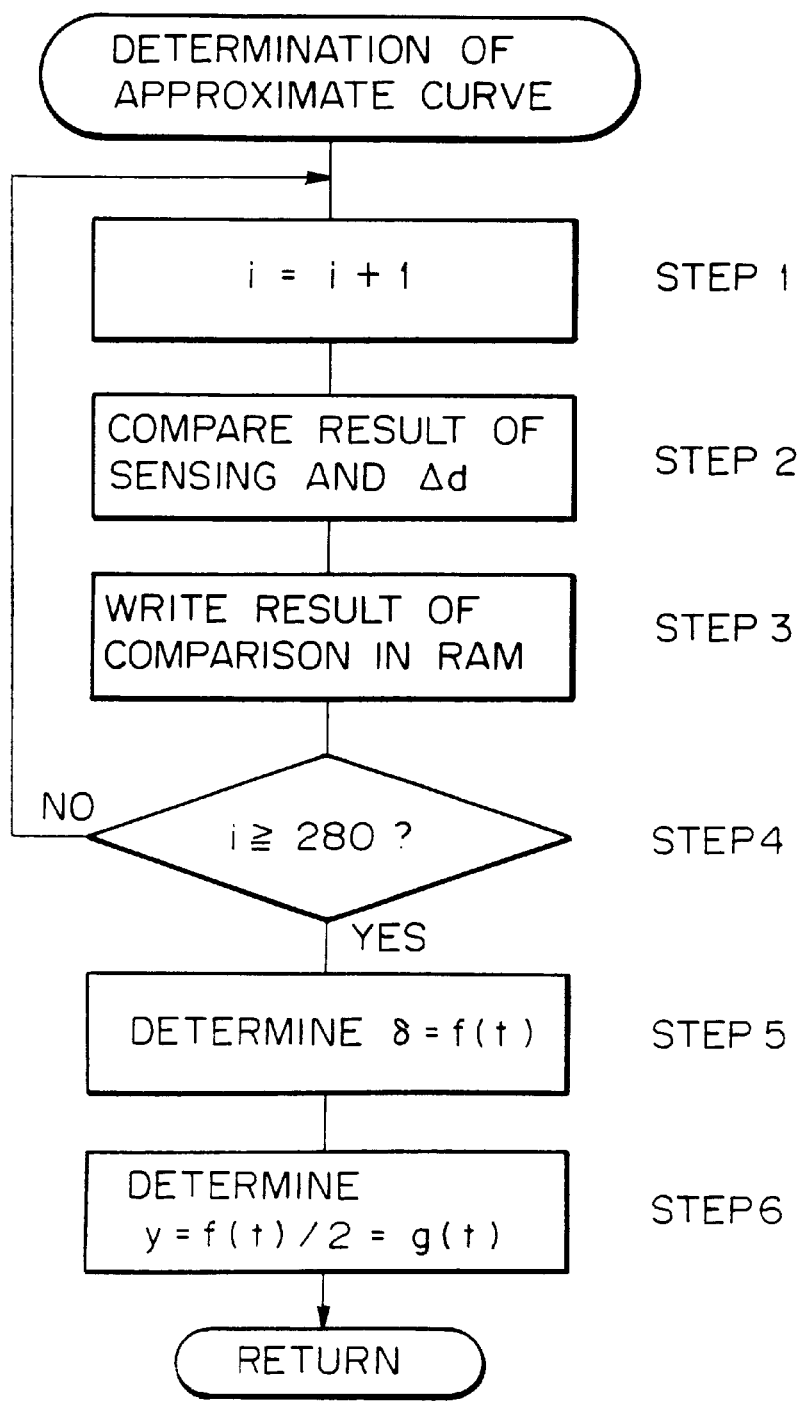
FIG. 29 is a flowchart demonstrating a specific routine for determining the approximate curve.

Reference will be made to FIG. 29 for describing a method of determining an approximate curve. Because i has been reset to zero by a main routine, not shown, the CPU 72 increments i (Step 1). Then, the CPU 72 compares (i.e. produces differences between) the outputs of the pattern sensors 73a and 73b and the distance $\Delta$d (Step 2), and then writes the result of comparison in the RAM 76 (Step 3). Subsequently, the CPU 72 determines whether or not i has reached or exceeded "280". This stems from the fact that as to the longitudinal feed of an A4 sheet, 280 patterns each consisting of fifty lines are formed. If the answer of the Step 4 is negative (NO), the program returns to the Step 1. If the answer of the Step 4 is positive (YES), the CPU 72 produces an approximate curve $\delta$=f(t) based on the data output at every time intervals Δt. Because the embodiment approximates up to the sixth degree item, $$f(t)=2*10^{-12}t^6-10^{-9}t^5-2*10^{-7}t^4+0.0003t^3-0.0741t^2+4.947t$$

is derived from the data shown in FIG. 28. While FIG. 28 shows the curve over only a single period, the patterns 79 on the belt 9 are repeatedly deviated at such a period (Step 5).

Figure 30:
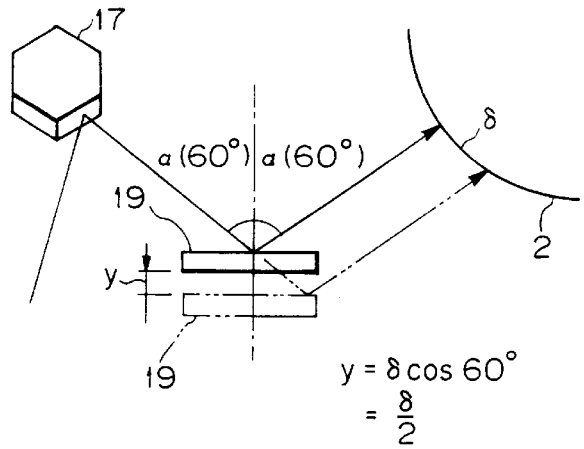
FIG. 30 shows an optical path along which a laser beam propagates.

However, as shown in FIG. 30, the laser beam is incident to the mirror 19 at in angle of 60°. Therefore, to cancel the deviation on the belt 9, it is necessary to move the mirror 19 by δ/2. As a result, as shown in FIG. 28, y=g(t) holds where $$g(t)=8*10^{-13}t^6-6*10^{-10}t^5-9*10^{-8}t^4+0.002t^3-0.037t^2+2.473t \qquad \text{(Step 6)}$$

While the illustrative embodiment produces the approximate curve with all the sensor outputs, approximation may be effected on a section basis or on the basis of data around a result to which attention is paid. In such a case, the data will be dealt with as discrete data.

Figure 31:
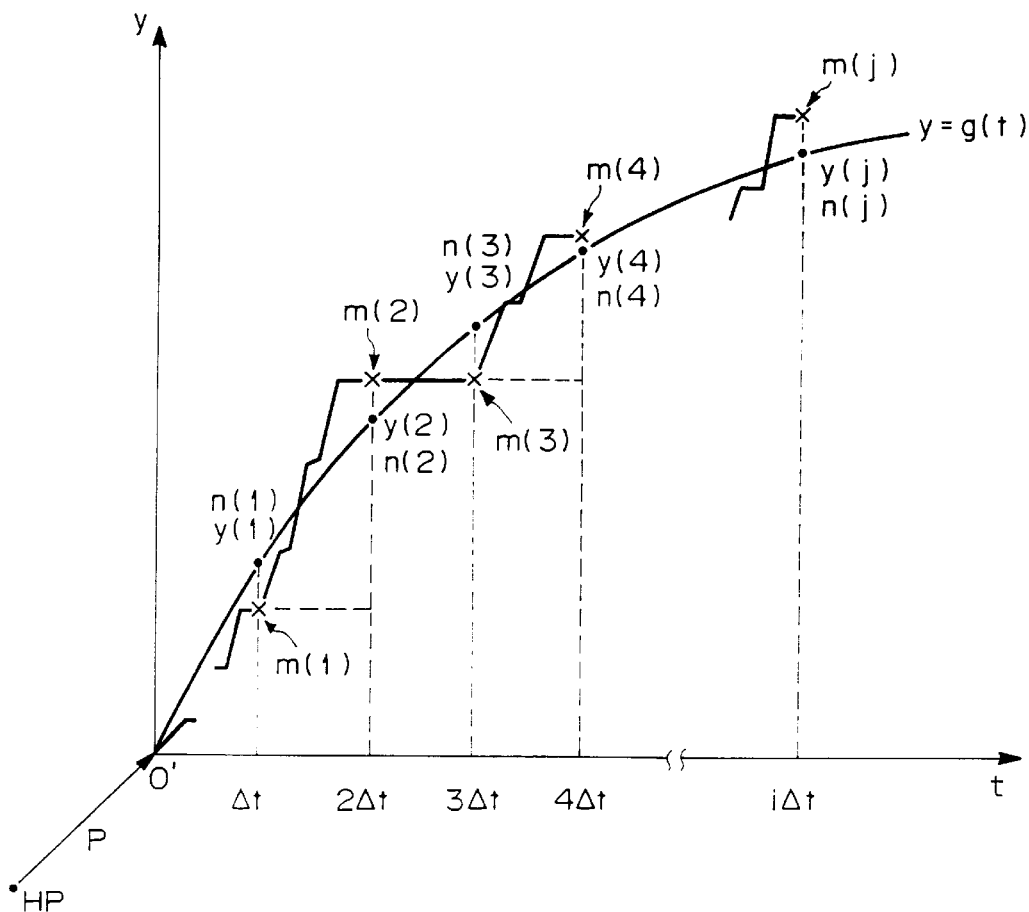
FIG. 31 shows a curve y=g(t) in an enlarged scale.

FIG. 31 shows y=g(t) of FIG. 28 in a enlarged scale. Assume that the cam 34 starts moving from a position remote from its home position (HP) by an angle $θ_p$ (corresponding to P drive pulses), and that the origin where the cam 34 starts moving is O'. How the amount of control is determined will be described with reference to FIG. 32.

The CPU 72 receives from the timer 78 an interrupt signal indicative of Δt (=5.88 ms) determined by a main routine, not shown, beforehand. In response, the CPU 72 executes the routine shown in FIG. 32. As shown, the CPU 72 increments j which has been reset to zero by the main routine (Step 11). Because t=j*Δt holds in y=g(t), the CPU 72 determines the consecutive discrete data y=(j) (Step 12). The CPU 72 produces, based on n=h(j) and y(j), an amount n(j) indicative of the number of motor drive pulses to which y(j) corresponds. Because the speed reduction ratio is 40 and because the unit step angle of the motor 36 is 15°, use is made of the following equation:

$$h(j)=(180/0.375π)* \sin^{-1}\{\sin (0.375π/180)*P+y(i)/e\}-P \qquad \text{Eq. (8)}$$

where e is 1 (Step 13). Because n(j) has a fraction below the decimal point, it is rounded to the nearest integer, and the resulting value is selected to be, m(j) (Step 14).

Subsequently, the CPU 72 determines the number of pulses Δn(j) corresponding to the distance between the lines of the patterns 79, i.e., the amount of control for moving the belt 9 during Δt (Step 15):

$$Δn(j)=m(j)-m(j-1) \qquad \text{Eq. (9)}$$

The CPU 72 writes the determined Δn(j) in the RAM 76 (Step 16). Because the embodiment executes the correction every fifty lines, the correction is executed 280 times over the length of a sheet of format A4 and fed longitudinally. Therefore, the CPU 72 determines whether or not i has reached or exceeded 280 (Step 17). If the answer of the step S17 is NO, the program returns to the Step 1. If the answer of the step S17 is YES, the program returns to the main routine.

In this manner, the number of pulses corresponding to the amount of control produced from the approximate curve h(j) is rounded to the nearest integer. In addition, as the Eqs. (8) and (9) indicate, the amount of control is determined in consideration of the absolute number of pulses as counted from the origin where the movement starts. Therefore, the control can follow the approximate curve y(j) within one-half of the displacement (=resolution) of the mirror 19, and errors below the decimal point do not accumulate.

Figure 33:
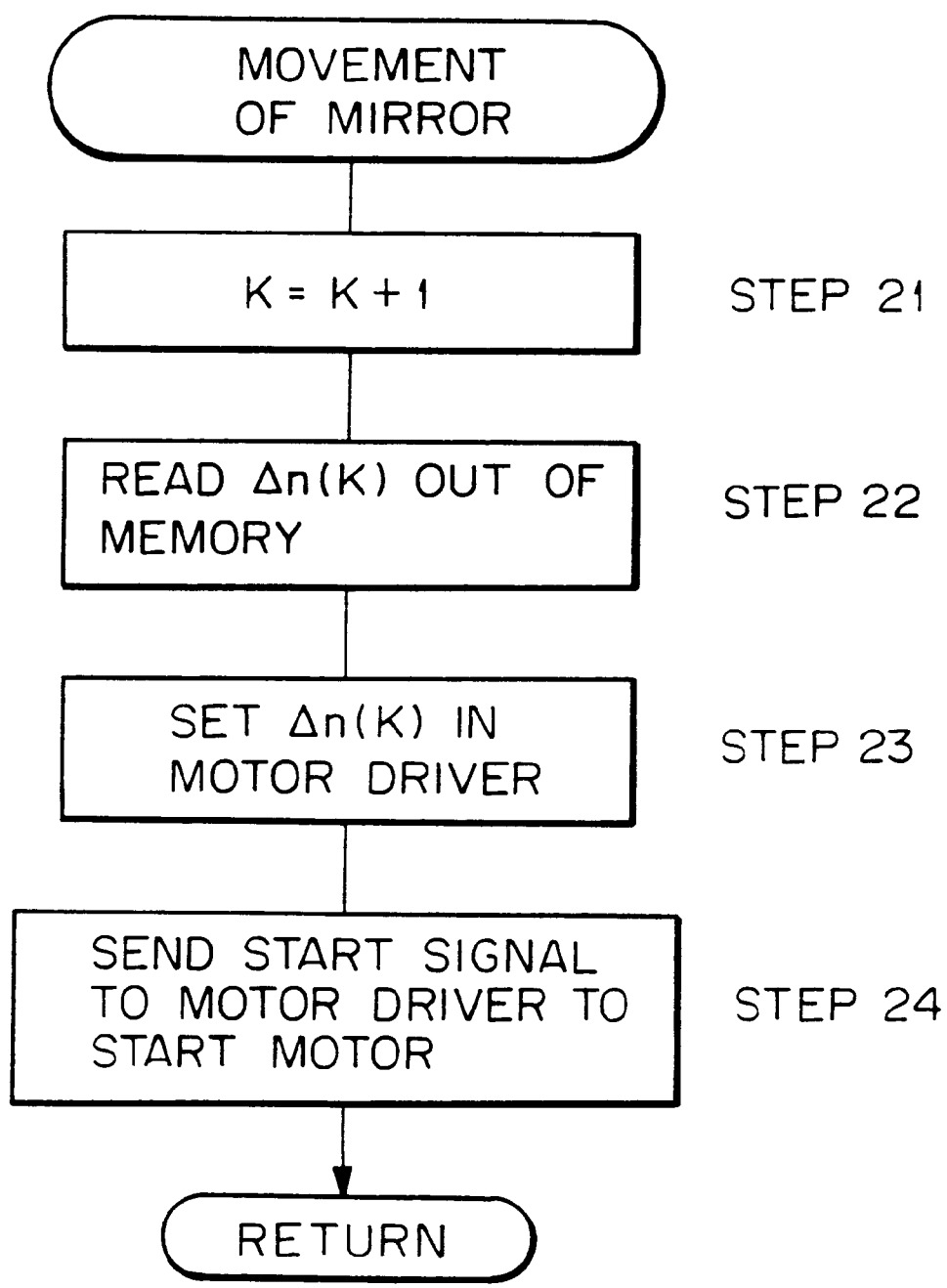
FIG. 33 is flowchart showing a specific routine for moving a deflecting mirror and available with the second embodiment.

FIG. 33 demonstrates a specific routine for actually moving the mirror 19. Because k has been reset to zero by the main routine, the CPU 72 increments k (Step 21), reads Δn(k) out of the RAM 76 (Step 22), sets Δn(k) in the motor driver 77 (Step 23), sends a start signal to the motor driver 77 (Step 24), and then returns.

The value Δt is determined by the sum of a period of time necessary for determining an amount of control based on the result of detection, a period of time necessary for the interchange of data with a memory, a period of time necessary for setting the amount of control in the motor driver 77, and a period of time necessary for the motor 36 to complete its movement. It follows that the control can follow the approximate curve y(t) more faithfully as Δt decreases, further reducing the dislocation.

Figure 32:
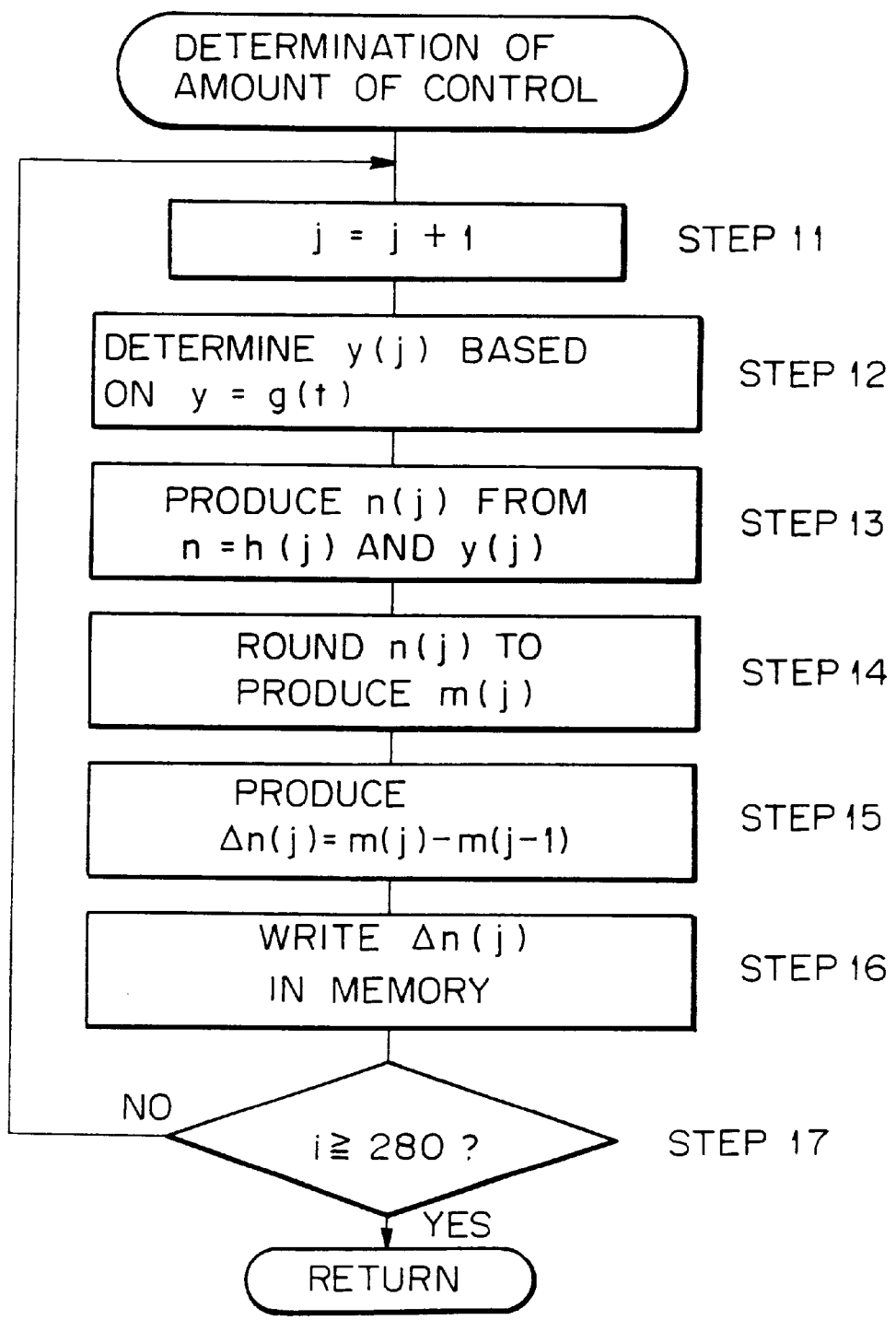
FIG. 32 is a flowchart demonstrating a specific routine for determining an amount of control and particular to the second embodiment.

In the illustrative embodiment, the CPU 72 stores Δn(j) determined by the procedure of FIG. 32 in the RAM 76 (Step 16). When the mirror should be moved by the procedure of FIG. 33 at the time of image formation, the CPU 72 reads Δn(j) out of the RAM 76 (Step 22) and then causes the mirror 19 to be moved. This successfully reduces a time loss ascribable to computation and therefore reduces Δt, compared to the case wherein the mirror 19 is moved by sequential computation.

Figure 34:
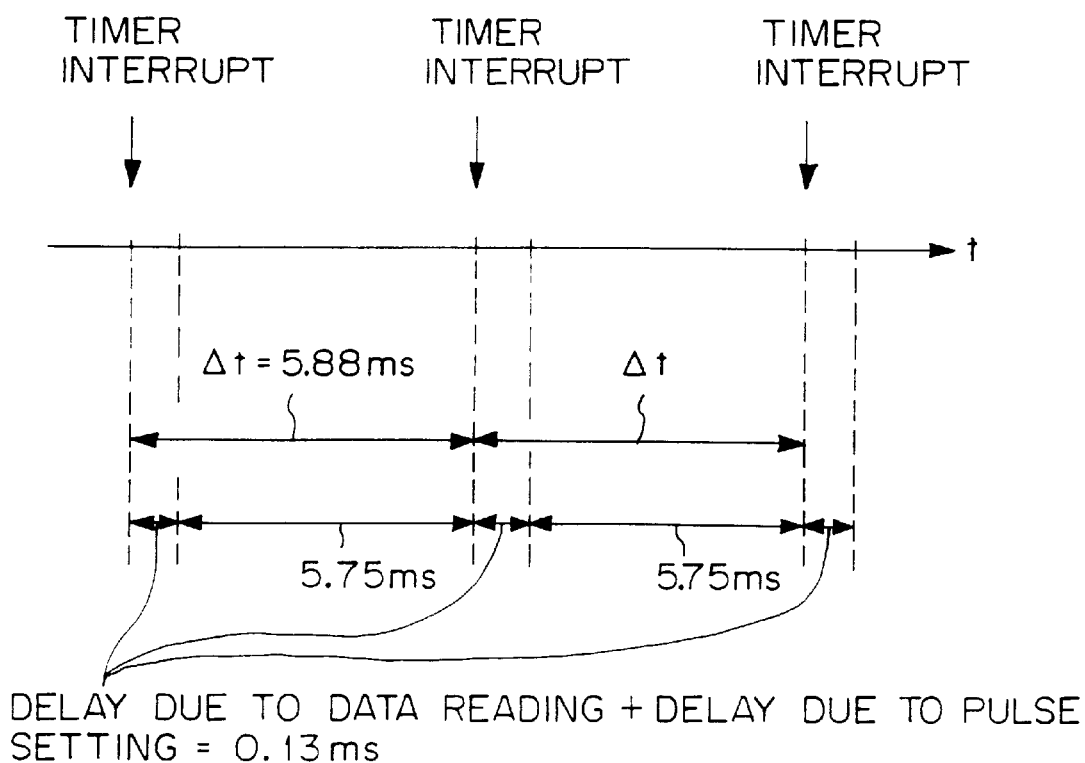
FIG. 34 is a graph showing a relation between a period of time for setting number of pulses and the duration of movement.
Figure 35:
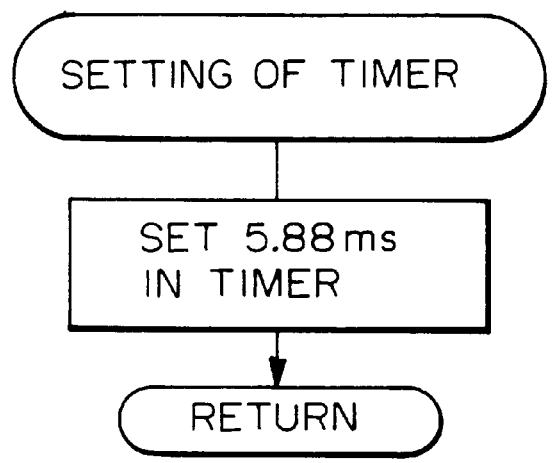
FIG. 35 is a flowchart showing a specific timer set routine.

FIG. 34 shows a relation between the setting of the number of pulses for movement and the duration of movement on a time axis. FIG. 35 shows a specific procedure for setting the timer 78. As shown, the timer 78 is set to Δt (=5.88 ms), i.e., it sends an interrupt signal to the CPU 72 every Δt, causing it to execute the control amount determining procedure. However, the sum of the mean delay due to the reading of the data out of the memory and the mean delay due to the setting of the number of pulses in the motor driver 77 is 0.13 ms in this embodiment. Therefore, pulses must be set such that the movement completes before a period of time produced by subtracting the delay from Δt expires.

As stated above, by determining Δt in consideration of the time loss, it is possible to allow the control to follow the approximate curve faithfully, and therefore to reduce the dislocation.

Figure 36:
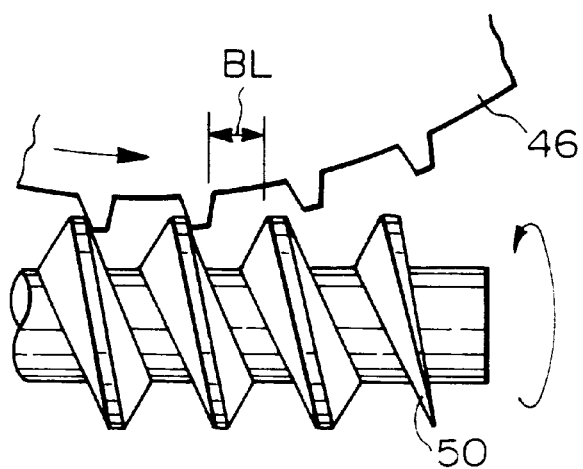
FIG. 36 shows backlash between a worm gear and a helical gear included in the second embodiment.

In the embodiment, the portion for driving the cam 34 includes the helical gear 46 and worm gear 50. This, however, brings about backlash BL (FIG. 36) when the cam 34 is to be moved in the opposite direction to the last movement (i-1). The backlash BL lowers the ability of the control to follow the approximate curve. In light of this, the embodiment removes the backlash. It is to be noted that the pitch of the worm gear 50 corresponds to two drive pulses for driving the stepping motor 36.

Figure 37:
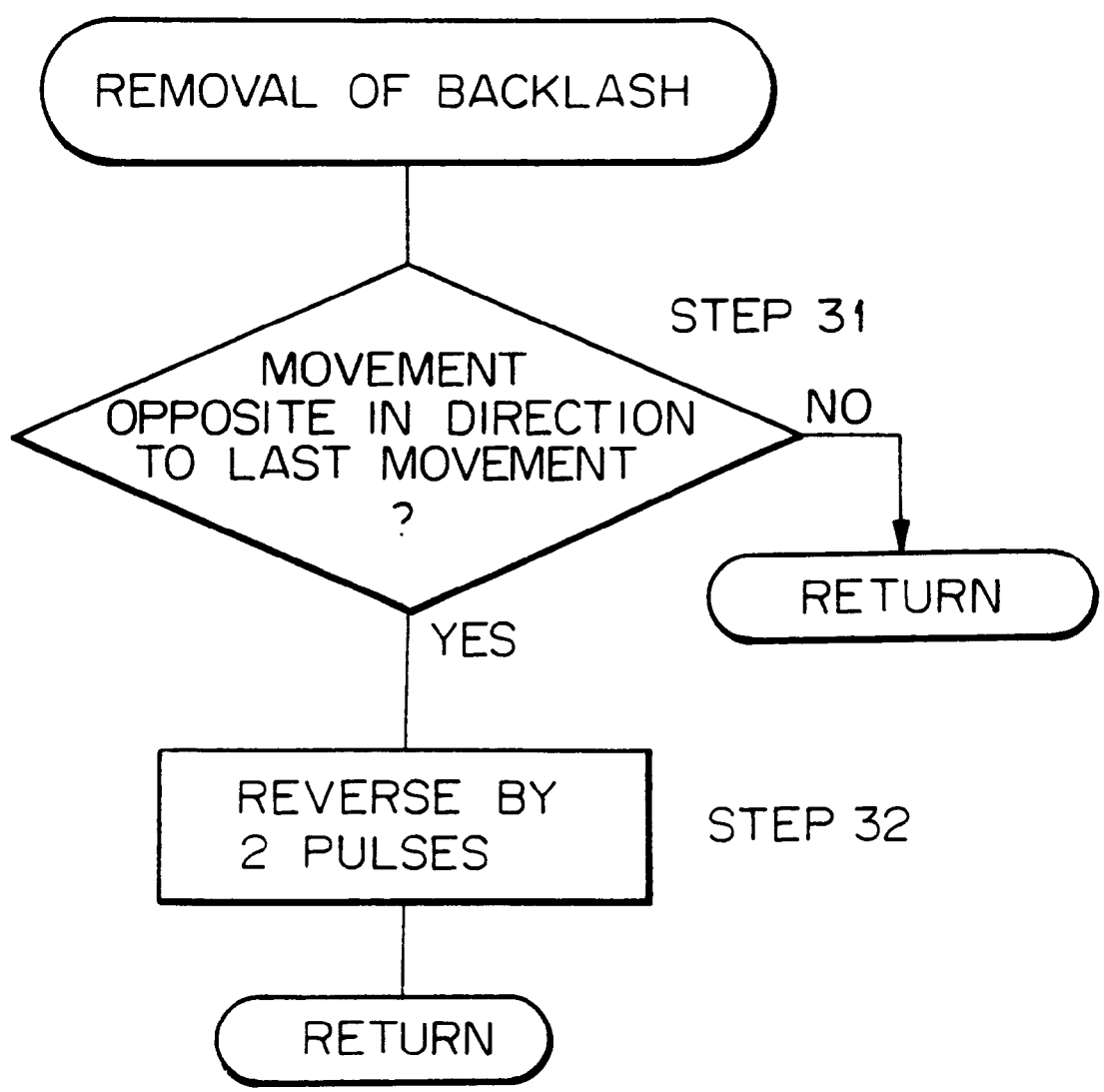
FIG. 37 is a flowchart demonstrating a specific backlash remove routine.
Figure 38:
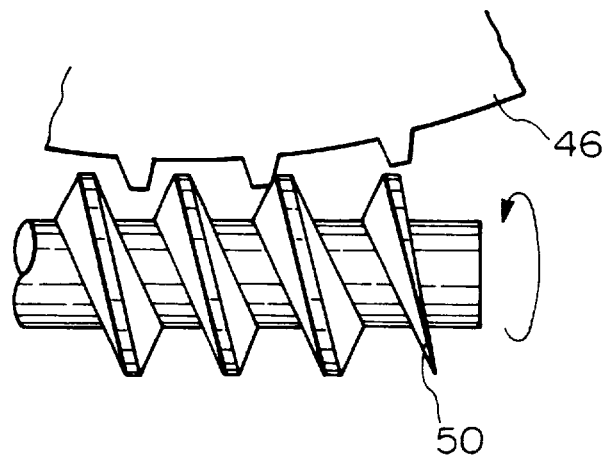
FIG. 38 shows a condition wherein the backlash has been removed.

FIG. 37 shows a specific procedure for removing the above backlash. As shown, the CPU 72 determines whether or not the direction of movement to occur is opposite to the direction of the last movement (Step 31). If the answer of the Step 31 is NO, the CPU 72 returns; if otherwise, the CPU 72 causes reverse movement by two pulses (Step 32), and the returns to the main routine. FIG. 38 shows a condition wherein the backlash BL has been removed by such a procedure.

As stated above, the second embodiment has the following advantages.

(1) With adequate approximation, it is possible to reduce the influence of errors in pattern measurement, and therefore to reduce dislocation.

(2) A difference between an ideal value of movement and the actual value of movement does not exceed one-half of the displacement of a deflecting mirror corresponding to a single rotation information pulse. The control therefore follows the ideal value of movement faithfully and reduces dislocation.

(3) An interval-by-interval amount of control is determined on the basis of information representative of the last rotation position and information representative of an absolute rotation position from a movement start position. Therefore, errors ascribable to rounding do not accumulate. The control therefore follows the ideal value of movement faithfully and reduces dislocation.

(4) An interval-by-interval amount of control is computed beforehand and stored in preselected storing means, and read out at the time of movement of the deflecting mirror, as needed. This eliminates a time loss ascribable to computation and thereby reduces the time interval. The control therefore follows the ideal value of movement faithfully and reduces dislocation.

(5) The movement of an eccentric cam completes within a period of time which is a difference between the sum of various delays and a preselected time interval. The control therefore follows the ideal value of movement faithfully and reduces dislocation.

(6) At the time of rotation opposite in direction to the last rotation, backlash is removed. The control therefore follows the ideal value of movement faithfully and reduces dislocation.

3rd Embodiment

This embodiment, like the first and second embodiments, is applied to the full-color electrophotographic apparatus shown in FIG. 1 and operated in the previously described manner. Also, the adjusting device is essentially similar in construction to the adjusting devices of the previous embodiments. In the illustrative embodiment, assume that the process linear velocity is V mm/sec, that the resolution in the subscanning direction is r dpi in the main and subscanning directions, and that a stepping motor is used as a drive source for the mirror 19.

The embodiment also forms the patterns 79, FIG. 27, on the transfer belt 9, detects the patterns 79, and controls the position of the mirror 19 on the basis of the result of detection for thereby correcting the dislocation of the toner images of different colors. While the following description concentrates on the correction of dislocation of a toner image of one color ascribable to skew, the correction is, of course, executed with the other colors also.

Figure 39:
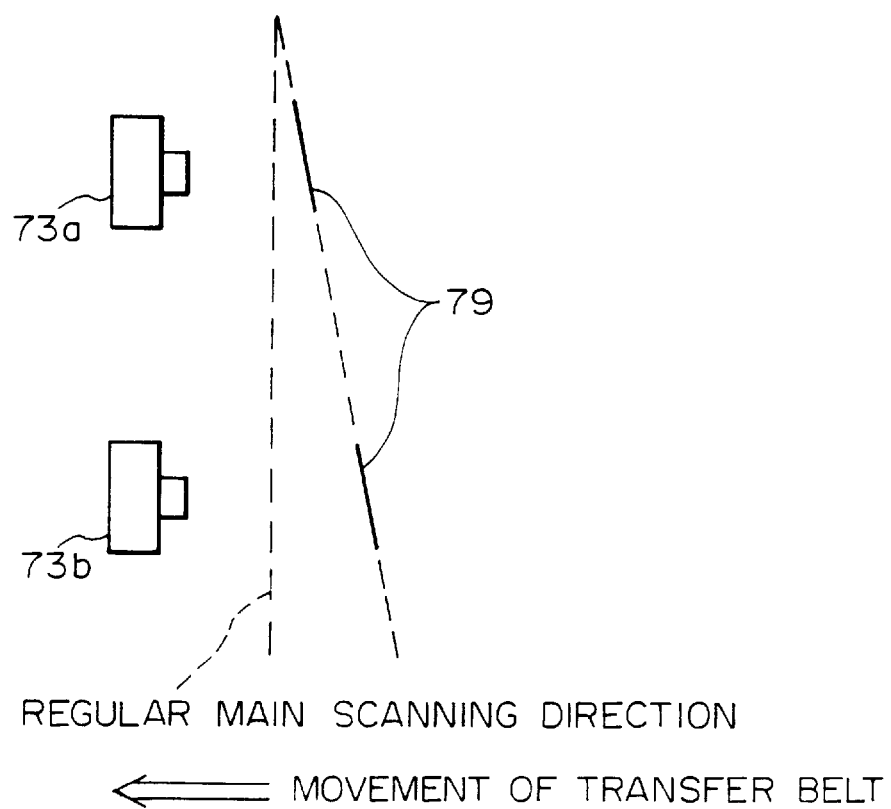
FIG. 39 shows a pattern formed on a transfer belt and pattern sensors representative of a third embodiment of the present invention.
Figure 41:
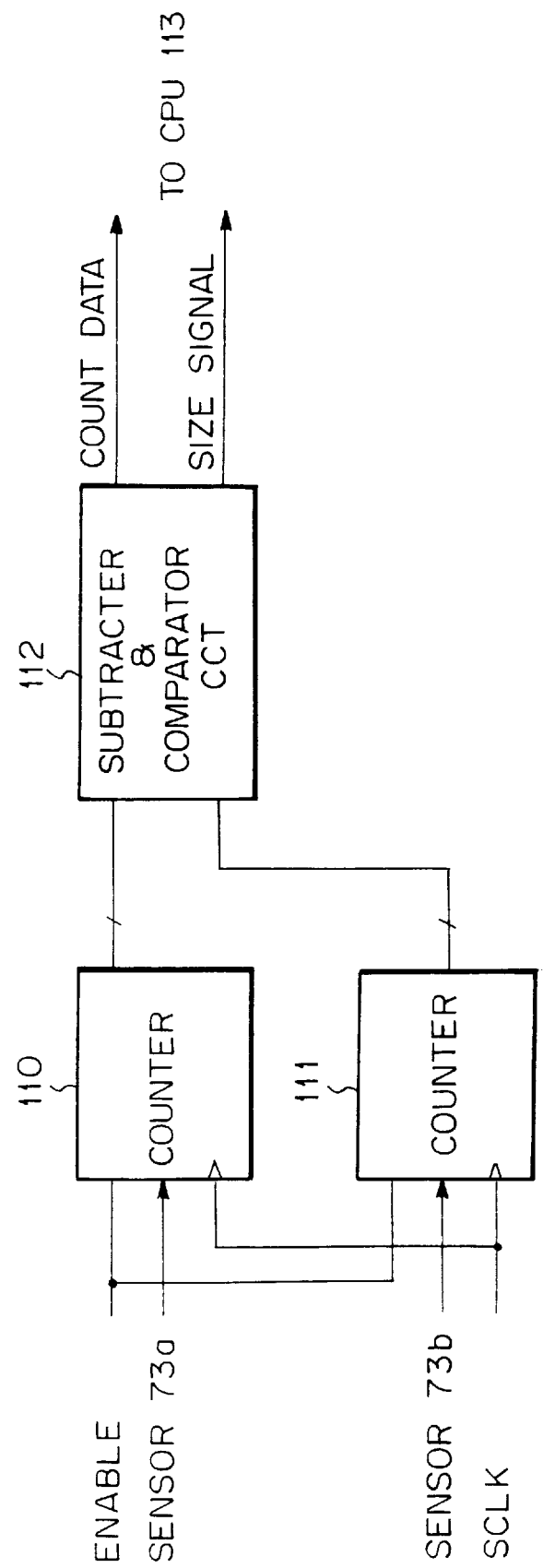
FIG. 41 is a block diagram schematically showing means for determining a time lag between the output signals of the pattern sensors included in the third embodiment.

FIG. 39 shows in an enlarged scale a portion for sensing the patterns 79 formed on the transfer belt 9. As shown, when skew occurs, the patterns 79 on the belt 9 incline relative to the regular main scanning direction. FIGS. 40A–40F show the output signals of the pattern sensors 73a and 73b reading the patterns 79 while the belt 9 is in rotation. FIG. 41 shows means for determining a time lag between the output signals of the sensors 73a and 73b. In the illustrative embodiment, a system clock SCLK is implemented by a pulse signal having a frequency f (MHz) and a period T (sec).

As shown in FIGS. 40A–40F and 41, a counter 110 counts the pulses of the system clock SCLK from the time when a count enable signal ENABLE output from a CPU 113 (FIG. 42) goes high to the time when output signal of the sensor 73a goes high. Likewise, a counter 111 counts the pulses of the system clock SCLK from the time when the signal ENABLE goes high to the time when the output signal of the sensor 73b goes high. A subtracter and comparator circuit 112 compares the contents of the counters 110 and 111 and sends their difference and sizes to the CPU 113.

FIG. 42 shows a control system included in the illustrative embodiment. Again, the two adjusting devices each causes the individual stepping motor 36 to rotate the associated eccentric dam 34 at a preselected speed reduction ratio via the worm gear 50 and helical gear 46. As a result, the mirror 19 is moved in the direction y, FIG. 11, perpendicular to its reflection surface. This is also true with the other three mirrors 19.

The stepping motor 36 is driven by a motor driver 114. The CPU 113, a ROM 115 and a RAM 116 constitute a microcomputer. The CPU 113 operates on the basis of a program and fixed dam stored in the ROM 115. The CPU 113 receives via an interface (I/F) 117 the output signals of the pattern sensors 73a and 73b as well as the outputs of other sensors included in the apparatus. The CPU 113 controls the motor driver 113 and various image forming units built in the apparatus via the I/F 117 in accordance with the above output signals.

Figure 43A:
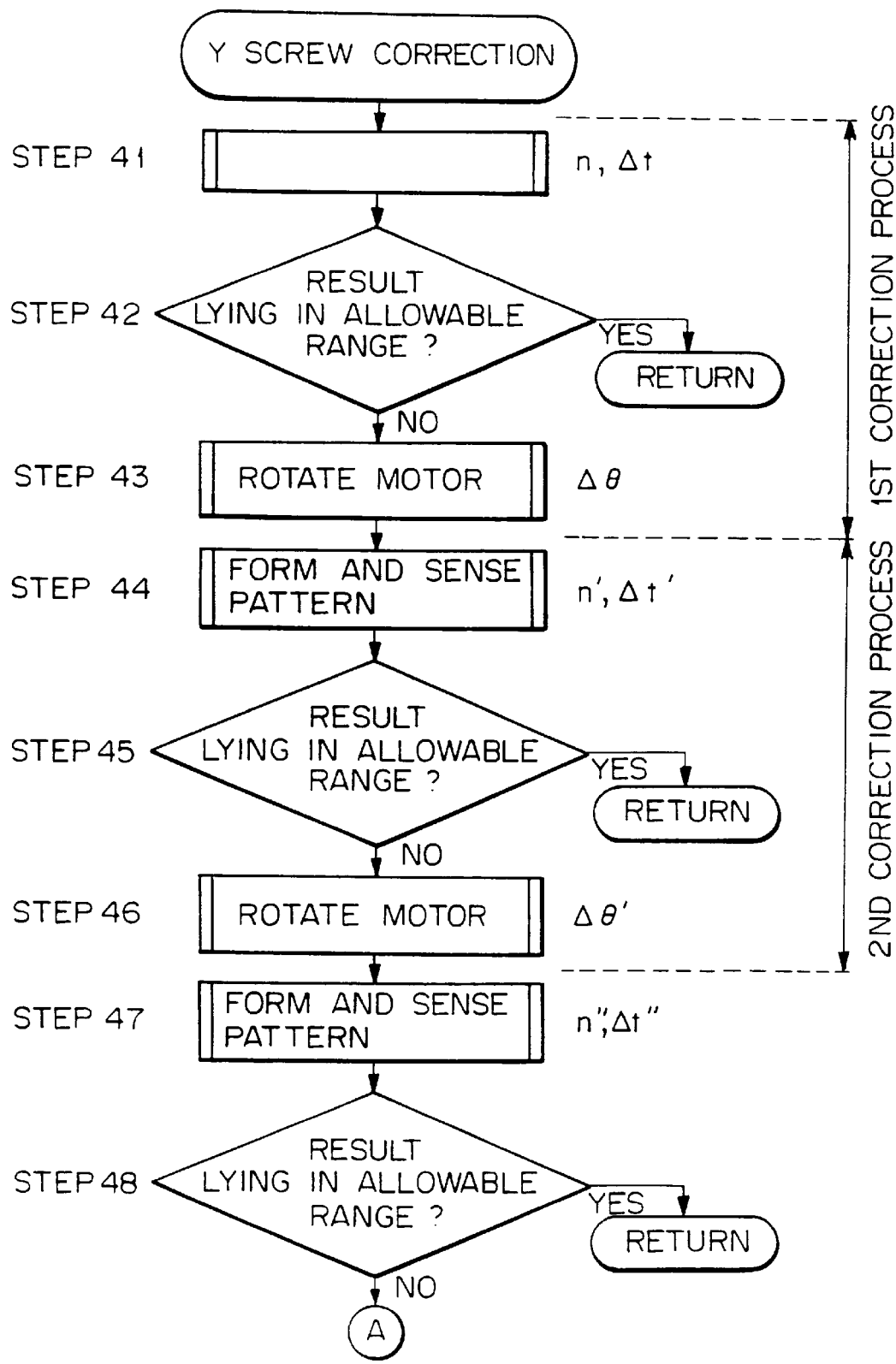
FIGS. 43A and 43B are flowcharts representative of a specific routine for correcting dislocation ascribable to Y (yellow) skew and available with the third embodiment.
Figure 43B:
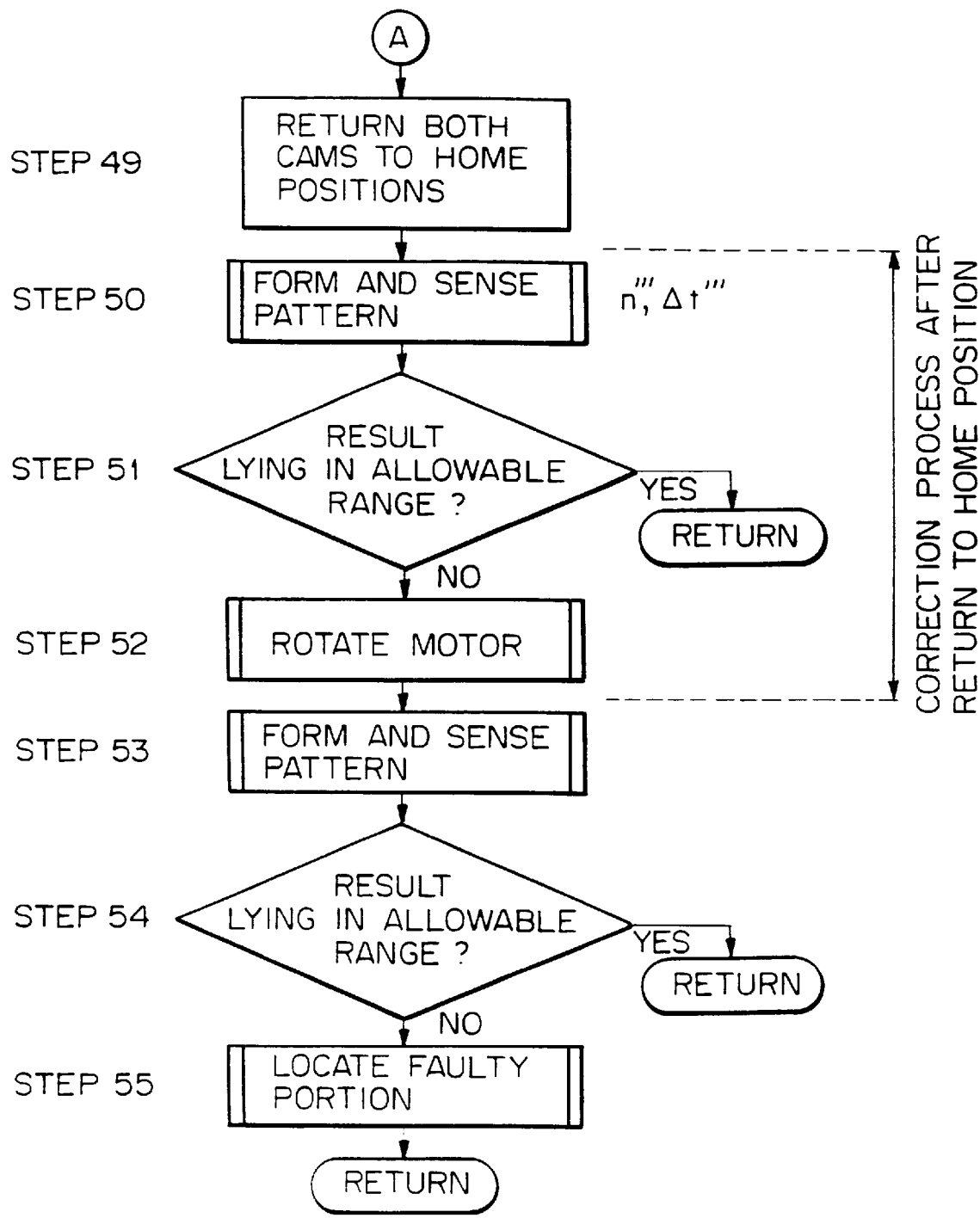
Figure 44:
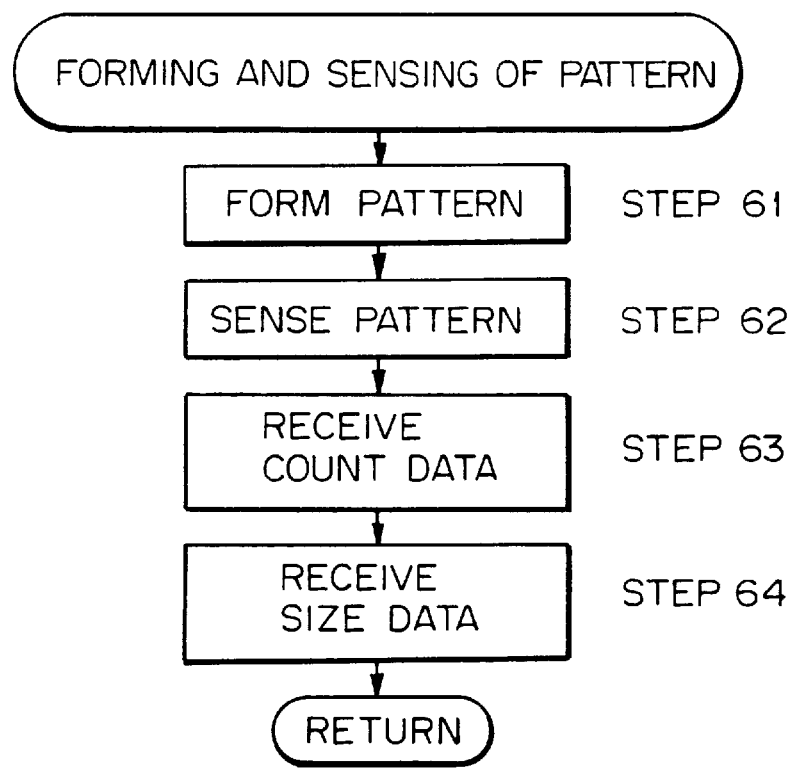
FIG. 44 is a flowchart showing a specific pattern form and sense routine available with the third embodiment.

FIGS. 43A and 43B demonstrate a routine for correcting the dislocation of, e.g., a Y toner image ascribable to skew. As shown, the CPU 113 executes Steps 41–43 as the first correction process. First, as shown in FIG. 44, the CPU 113 executes the Step 41 for causing the image forming section 4Y to form a preselected pattern, as shown in FIG. 44.

The exposing device 3 includes a section for generating image data representative of the preselected pattern. In response to a command output from the CPU 113, the above section sends Y image data representative of the preselected pattern to the Y laser driver. The Y laser driver drives the Y laser in accordance with the Y image data. As shown in FIG. 1, the laser beam issuing from the Y laser is deflected by the polygonal scanner 17 and then incident to the drum 2Y via the f-θ lens 18Y, deflecting mirror 19Y, and mirrors 20Y and 21Y. While the polygonal scanner 17 is driven by the motor 22, the laser beam repeatedly scans the drum 2Y in the axial direction of the drum 2Y, i.e., in the main scanning direction.

While the main charger 5Y charges the surface of the drum 2Y uniformly, the exposing device 3 exposes the charged surface of the drum 2Y so as to form an electrostatic latent image. The developing device 4Y develops the latent image and thereby forms a Y toner image. The transfer charger 13Y transfers the Y toner image to the transfer belt 9 at the image transfer position. The pattern sensors 73a and 73b sense the Y toner image formed on the belt 9 as the Y patterns 79. The output signals of the sensors 73a and 73b are sent to the counters 110 and 111, respectively. The CPU 113 receives the output signal of the subtracter and comparator circuit 112 via the I/F 117 and writes it in the RAM 116.

As shown in FIG. 40B, assume that the counts output from the counters 110 and 111 during the first correction process have a difference n as determined by the subtracter and comparator circuit 112. Then, a time lag corresponding to the difference n, i.e., a difference $\Delta t$ between the time when the output signal of the sensor 73a goes high and the time when the output signal of the sensor 73b goes high (indicative of the leading edges of the pair of Y patterns 79 spaced in the main scanning direction) is produced by:

$$\Delta t = n*T (\text{sec}) \qquad \text{Eq. (10)}$$

Also, a positional deviation δ between the two patterns, or Y toner images, is expressed as:

$$\delta = V \times \Delta t = V*n*T (mm) \qquad \text{Eq. (11)}$$

The illustrative embodiment corrects the above positional deviation with the following procedure. While the cam 34 adjoining the sensor 73a is held stationary, the cam 34 adjoining the sensor 73b is rotated to move the mirror 19Y. As shown in FIG. 30, because the Y laser beam from the polygonal scanner 17 is incident to the mirror 19Y at an angle α (rad), a displacement Δy required of the mirror 19Y for the correction is produced by:

$$\Delta y = \delta * \cos \alpha / \cos(2\alpha - \pi/2) \qquad \text{Eq. (12)}$$

To move the mirror 19Y by Δy, the cam 34 is rotated by the angle Δθ which is determined by the Eq. (4). Assuming that the current position of the cam 34 is θ=β (rad), then the above angle Δθ is expressed as:

$$\Delta\theta = \sin^{-1}(\Delta y/e + \sin \beta) - \beta \text{(rad)} \qquad \text{Eq. (13)}$$

By rotating the motor 36 to implement the angle Δθ, it is possible to move the mirror 19 to the target position for the correction of skew.

Assume that the pattern sensing portion of the illustrative embodiment has an accuracy of ±A (mm). Then, when the sensors 73a and 73b respectively sense the right and left patterns 79, the above accuracy corresponds to 2A/V in terms of time lag or 2A/(V*T) in terms of the number of pulses. After the correction of the deviation, the deviation is expected to be confined in such a range. FIG. 40C shows the output signals of the sensor 73a and 73b to appear if the deviation is confined in the above range; the deviation satisfies an allowable error.

Figure 45:
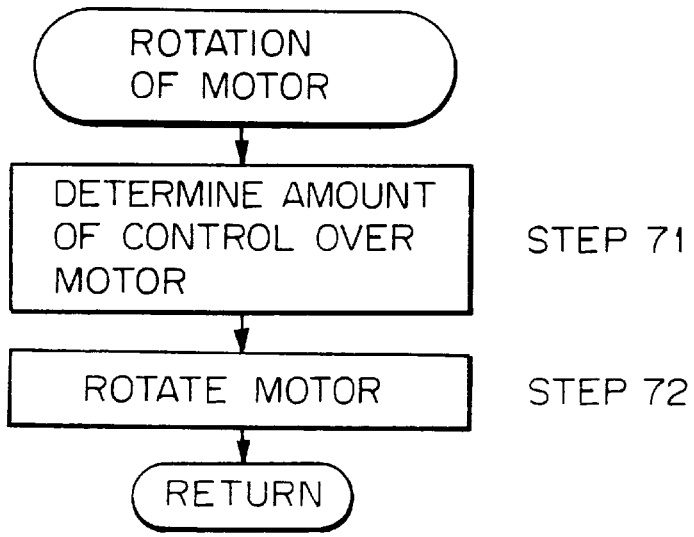
FIG. 45 is a flowchart demonstrating a specific motor drive routine available with the third embodiment.

After the Step 41, the CPU executes the Step 42 for determining, based on the output signal of the subtracter and comparator circuit 112 written to the RAM 116, whether or not the positional deviation is confined in the above allowable range. If the answer of the Step 42 is positive (Y), the program returns, determining that the deviation has been sufficiently corrected. If the answer of the step 42 is negative (N), the CPU 113 produces Δθ from the output signal written to the RAM 116 by using the Eqs. (11)–(13), and then rotates the motor 37 by Δθ via the motor driver 114, as shown in FIG. 45.

Subsequently, the CPU 113 executes the second correction process (Steps 44–46). The Steps 44 and 45 are identical with the steps 41 and 42 and will not be described in order to avoid redundancy. In this case, as shown in FIG. 40D, the difference between the outputs of the sensors 73a and 73b is n' in terms of the difference between the counts of the counters 110 and 111 or Δt' in terms of time lag by way of example.

If the positional deviation is confined in the allowable range, the CPU 113 returns, determining that the deviation has been sufficiently corrected. If the deviation is not confined in the above range, the CPU 113 executes the Step 46 similar to the step 43. In the Step 46, the CPU 113 produces from the latest output signal of the subtracter and comparator circuit 112 stored in the RAM 116, a positional deviation δ' of the Y toner image, a displacement Δy' of the mirror 19Y necessary for the correction of the dislocation δ', and a rotation angle Δθ' of the cam 34 for moving the mirror 19Y by Δy' by using the Eqs. (11)–(13). Then, the CPU 113 rotates the motor 36 by Δθ' via the motor driver 114 in order to correct the deviation of the Y toner image again.

After the second correction process, the CPU 113 executes a step 47 similar to the step 41 for determining whether or not the deviation has been successfully confined in the allowable range. The resulting output signal of the subtracter and comparator circuit 112 is written to the RAM 116 via the I/F and CPU 113. The CPU 113 determines, based on the signal written to the RAM 116, whether or not the deviation has been corrected. In this case, as shown in FIG. 40E, the difference between the outputs of the sensors 73a and 73b is n" in terms of the difference between the counts of the counters 110 and 111 or Δt" in terms of time lag by way of example. If the deviation is confined in the allowable range, the CPU 113 returns, determining that the deviation has been sufficiently corrected.

If the deviation is not confined in the allowable range, it may be said that it has not been fully corrected even by the second correction process. While the embodiment is designed such that a single correction suffices, the correction may fail due to, e.g., the loss of synchronism of the stepping motor 36 or unexpected vibration. Particularly, when the failure is ascribable to the loss of synchronism of the motor 36, errors in the displacement of the cam 34 accumulate because the relation between the displacement of the cam 34 and that of the motor 36 is not linear, as shown in FIGS. 16A and 16B.

Figure 46A:
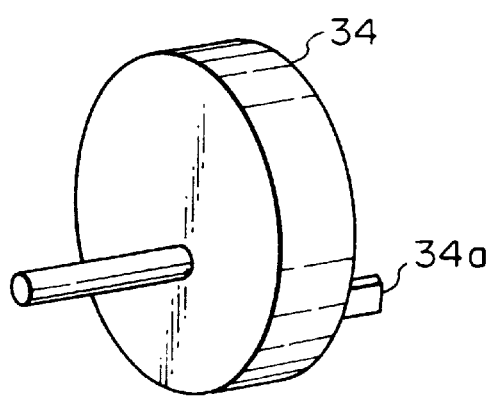
FIGS. 46A and 46B are perspective views of means for detecting the return of an eccentric cam included in the third embodiment to its home position.

To solve the above problem, the embodiment once returns the two cams 34 to their home positions in order to clear the error in displacement between the cams 34. FIG. 46A shows specific means for detecting the return of each cam 34 to the home position. As shown, a lug 34a is provided on a part of each cam 34. After the lug 34a has abutted against a lug, not shown, provided on the associated side wall 32, the motor 36 is rotated by a predetermined number of pulses in the direction in which the cam 34 returns to the home position. The resulting position of the cam 34 is determined to be the home position.

Figure 46B:
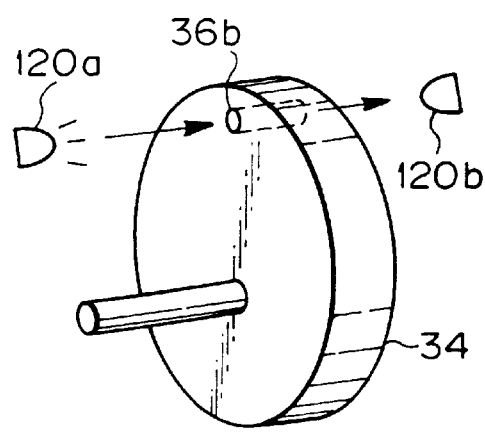

FIG. 46B shows another specific means for detecting the return of each cam 34 to the home position. As shown, a pin hole 36b is formed in a part of each cam 34. A light emitting element 120a and a light receiving element 120b are positioned at both sides of the cam 34 and capable of facing the pin hole 36b. The position of the cam 34 to occur when light issuing from the light emitting element 120a is incident to the light receiving element 120b via the pin hole 36b is determined to be the home position.

If the deviation is not confined in the allowable range, as determined in the Step 48, the CPU 113 returns each motor 36 to the respective home positions via the I/F 117 and motor driver 114 by using any one of the above cam returning means. As a result, the error in displacement between the cams 34 is cleared. Then, the CPU 113 executes Steps 50–52 for repeating the correction process.

As a result of the Step 50 similar to the Step 41, the CPU 113 updates the output of the subtracter and comparator circuit 112 stored in the RAM 116. In the Step 51 similar to the Step 42, the RAM 116 determines, based on the latest signal stored in the RAM 116, whether or not the positional deviation has been corrected. If the deviation lies in the allowable range, the CPU 113 returns, determining that the deviation has been fully corrected. If otherwise, the CPU 113 executes a Step 52 similar to the Step 43. In the Step 52, the CPU 113 produces from the latest output of the subtracter and comparator circuit 112 stored in the RAM 116, a positional deviation of the Y toner image, a displacement of the mirror 19Y necessary for the correction of the dislocation δ', and a rotation angle of the cam 34 for moving the mirror 19Y by the above displacement by using the Eqs. (11)–(13). Then, the CPU 113 rotates the motor 36 by the computed rotation angle of the cam 34 via the motor driver 114 in order to correct the deviation of the Y toner image again.

Subsequently, the CPU 113 executes a Step 53 similar to the Step 41 and writes the resulting latest output of the subtracter and comparator circuit 112 in the RAM 116. The Step S53 is followed by a Step 54 for determining, based on the updated signal stored in the RAM 116, whether or not the deviation is confined in the allowable range. In this case, as shown in FIG. 40F, the difference between the outputs of the sensors 73a and 73b is n''' in terms of the difference between the counts of the counters 110 and 111 or Δt''' in terms of time lag by way of example. If the deviation is confined in the allowable range, the CPU 113 returns, determining that the deviation has been sufficiently corrected.

If the deviation does not lie in the allowable range, as determined in the Step 54, it may be said that even the correction effected after the return of the cams 34 to their home positions has failed. Such a failure may be ascribable to troubles occurred in the portions joining in the correction. Among them, the following roubles are critical in the image formation aspect:

(1) errors occurred in the sensors 73a and 73b (2) loss of synchronism of the motor 36 due to an unexpected excessive load acting on the motor 36

(3) deterioration of the worm gear or that of the helical gear included in the section for driving the cam 34

(4) variation in the angle of the mirror 19 due to some fault occurred in the side walls 32.

Figure 47:
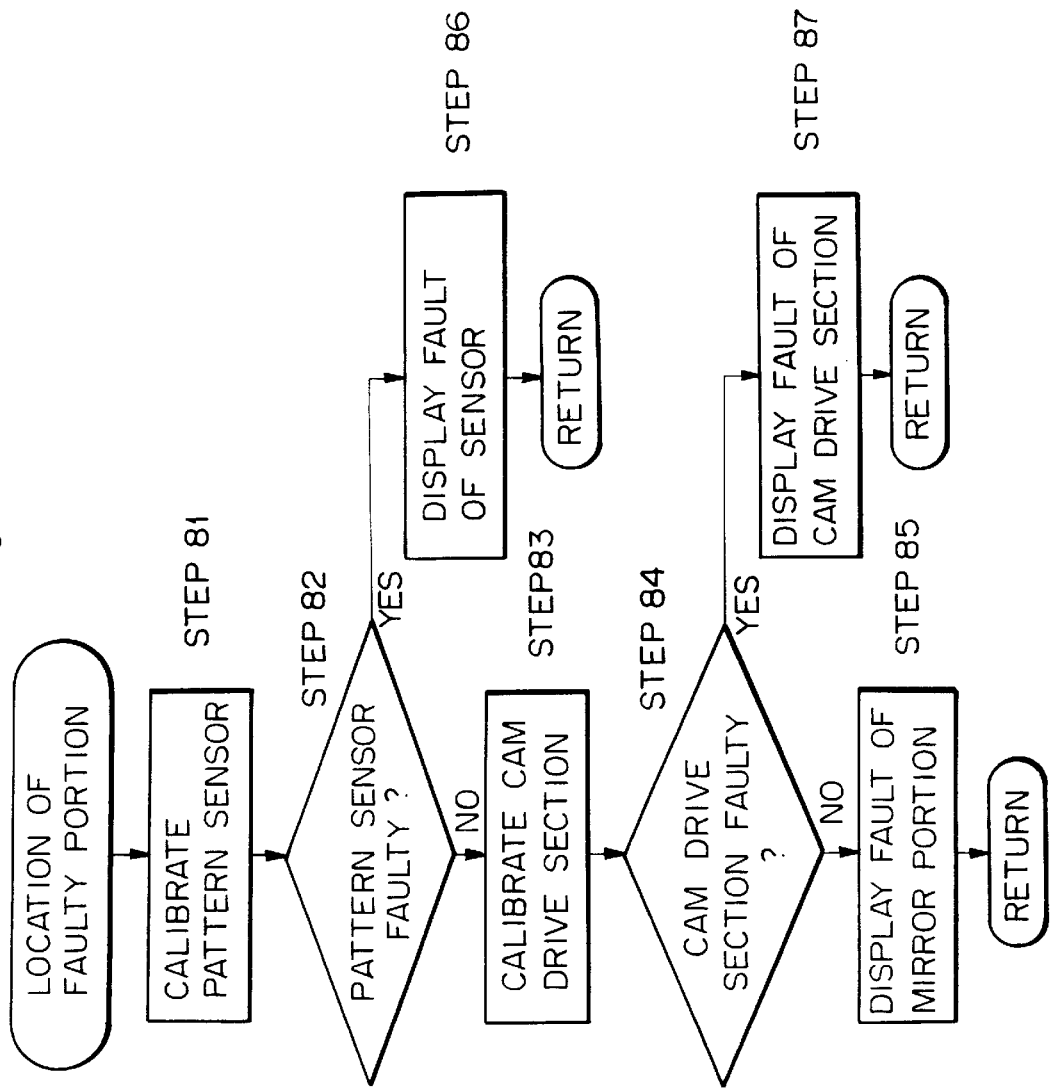
FIG. 47 is a flowchart showing a specific routine for locating a faulty portion.

If the answer of the step 54 is N, the CPU 113 executes a step 55, i.e., locates a faulty portion in an error detection mode shown in FIG. 47. In FIG. 47, the CPU 113 determines whether or not an error has occurred in the sensors 73a and 73b first (trouble (1)). For this purpose, as shown in FIG. 27, two marks 79a and 79b for calibration and spaced in the subscanning direction are provided at each of two portions of the transfer belt 9 to be sensed by the sensors 73a and 73b. The marks 79a and 79b are not images formed by toner, but are fixed marks. The marks 79 and 79b are positioned in the portions of the belt 9 outside of an image forming portion, so that the patterns 79 are not formed on the marks 79a and 79b.

Figure 48:
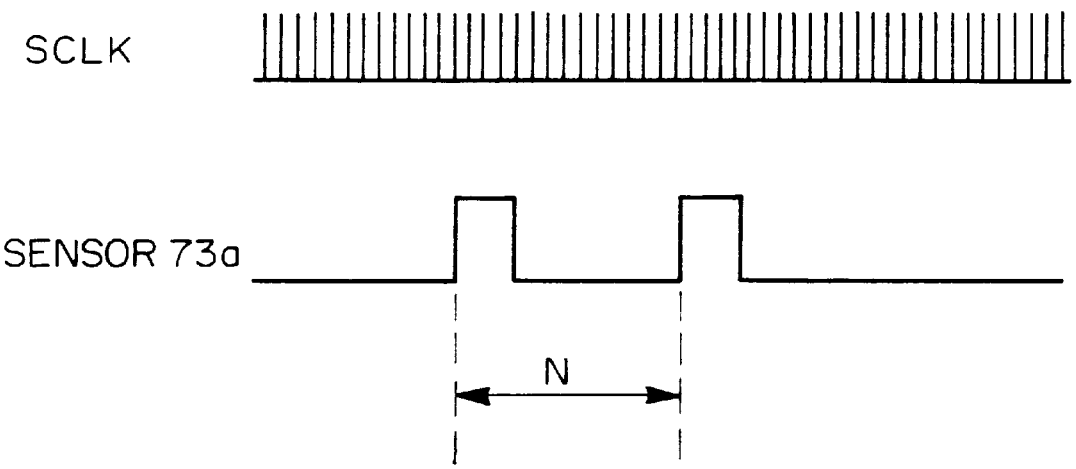
FIG. 48 shows the output signal of the pattern sensor included in the third embodiment and a system clock.

Assume that the patterns 79 are formed on the belt 9, and then the sensor 73a senses the marks 79a for calibration. Then, as shown in FIG. 48, the sensor 73a outputs a signal twice and sends them to the CPU 113 via the I/F 117. The CPU 113 therefore counts the system clock SCLK between the two positive-going edges of the output signal of the sensor 73a which appear for one rotation of the belt 9. The CPU 113 repeats this ten consecutive times. When the resulting counts N vary by more than preselected ±B %, the CPU 113 determines that the sensor 73a is faulty. Then, the CPU 113 displays an error message on a display, not shown, informing the user of the need for repair.

Likewise, the CPU 113 counts the system clock SCLK between the two positive-going edges of the output signal of the sensor 73b which also appear for one rotation of the belt 9. This is followed by the same procedure as described above in relation to the sensor 73a.

Figure 49:
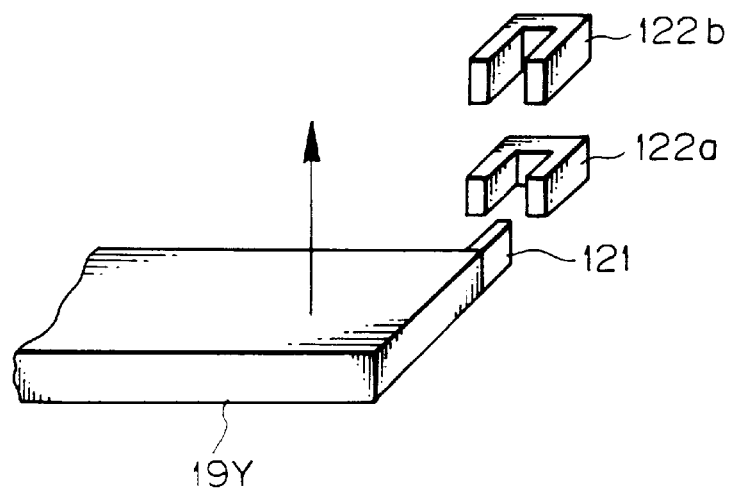
FIG. 49 is a perspective view showing one end portion of a deflecting mirror included in the third embodiment.

Next, the CPU 113 determines whether or not the section for driving the cam 34 is faulty (troubles (2) and (3)). As shown in FIG. 49, a screen member 121 is affixed to one end of the mirror 19Y. When the mirror 19Y is moved, the screen member 121 sequentially interrupts the optical paths of two sensors 122a and 122b. This allows the position of the mirror 19Y to be detected.

Figure 50:
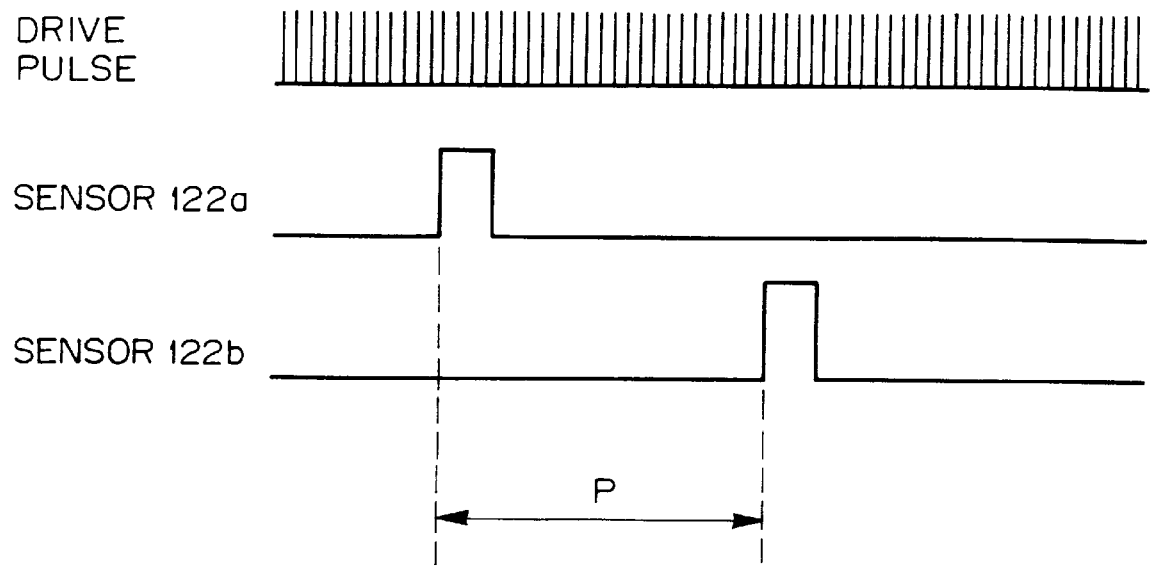
FIG. 50 shows the output signals of sensors included in the third embodiment and the system clock.

Specifically, FIG. 50 shows the outputs of the sensors 122a and 122b to appear when the mirror 19Y is moved in a direction indicated by an arrow. Assume that during the interval between the time when the screen member 121 moves away from the sensor 122a and the time when it moves away from the sensor 122b, a train of P drive pulses are necessary for the stepping motor 36 to move the end of the mirror 19Y where the screen member 121 is mounted. Then, while causing the motor driver 114 to drive the motor 36 via the I/F 117, the CPU 113 counts the drive pulses during the above interval in response to the outputs of the sensors 122a and 122b fed via the I/F 177. The CPU 133 repeats this ten consecutive times. If any one of the resulting counts P varies, then the CPU 113 determines that the motor 36 has lost synchronism or that the worm gear 50 or the helical gear 46 has deteriorated. Then, the CPU 133 displays an error message on the display, informing the user of the need for repair.

While FIG. 49 shows only one end of the mirror 19Y with the screen member 121, another screen member is mounted on the other end of the mirror 19Y. This screen member interrupts the optical path of other two sensors when the mirror 19Y is moved, although not shown specifically. The CPU 133 executes the above processing in response to the outputs of such sensors and then makes the above decision.

If the troubles (1)–(3) are not detected, then the variation in the angle of the mirror 19Y is ascribable to the trouble (4). In this case, the CPU 113 informs the user of the fact that the fault of the portions joining in the correction is ascribable to the trouble (4) via the display.

A pair of adjusting devices having the above configuration are also associated with each of the mirrors 19BK, 19M and 19C. In the illustrative embodiment, the mirror, cams, stepping motors of each adjusting device pair are constructed into a unit and can be bodily replaced when a fault occurs therein. If desired, an arrangement may be made such that the CPU 113 writes the outputs of sensing means, not shown, responsive to the irregular drive of the image carriers 2BK–2C in the RAM 116, and executes, based on the outputs of the sensing means, control at one or both sides of each of the mirrors 19BK–19C as in the above correction processes.

Figure 51:
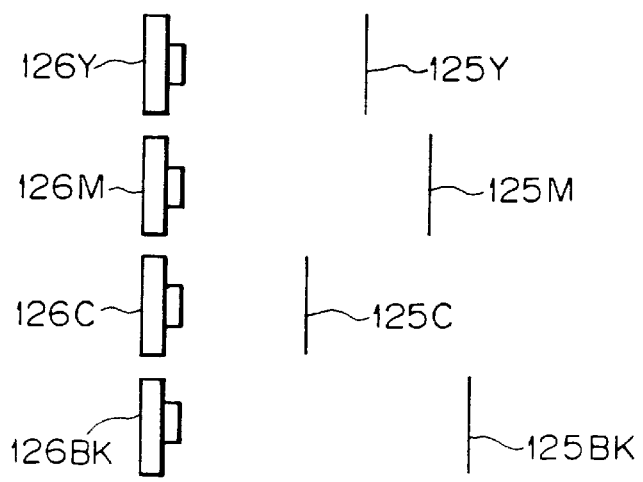
FIG. 51 shows a pattern and sensor included in the third embodiment for correcting dislocation ascribable to skew.

In this embodiment, not only dislocation ascribable to skew but also dislocation ascribable to shift in the subscanning direction are corrected by a correction process. As shown in FIG. 51, to correct dislocation ascribable to shift, the CPU 113 causes the image forming sections 1BK–1C to form line images 125BK–125C of different colors, respectively. The line images 125BK–125C are implemented by a part of the main scanning line located at the leading edge, in the subscanning direction, of the image forming surface and so configured as not to overlap each other.

The exposing device 3, FIG. 1, includes a section for generating image data representative of a pattern consisting of the line images 125BK–125C. In response to a command output from the CPU 113, the pattern generating section sends the above image data of different colors to the laser drivers each being assigned to a particular color. The laser drivers each drives the respective laser in accordance with the image data of particular color. The laser beam issuing from each laser is deflected by the polygonal scanner 17 and then incident to associated one of the drums 2BK–2C via one of the f-θ lenses 18BK–18C, one of the deflecting mirrors 19BK–19C, one of the mirrors 20BK–20C, and one of the mirrors 21BK–21C. While the polygonal scanner 17 is driven by the motor 22, the laser beam repeatedly scans the drum 2BK, 2M, 2Y or 2C in the main scanning direction.

Figure 52:
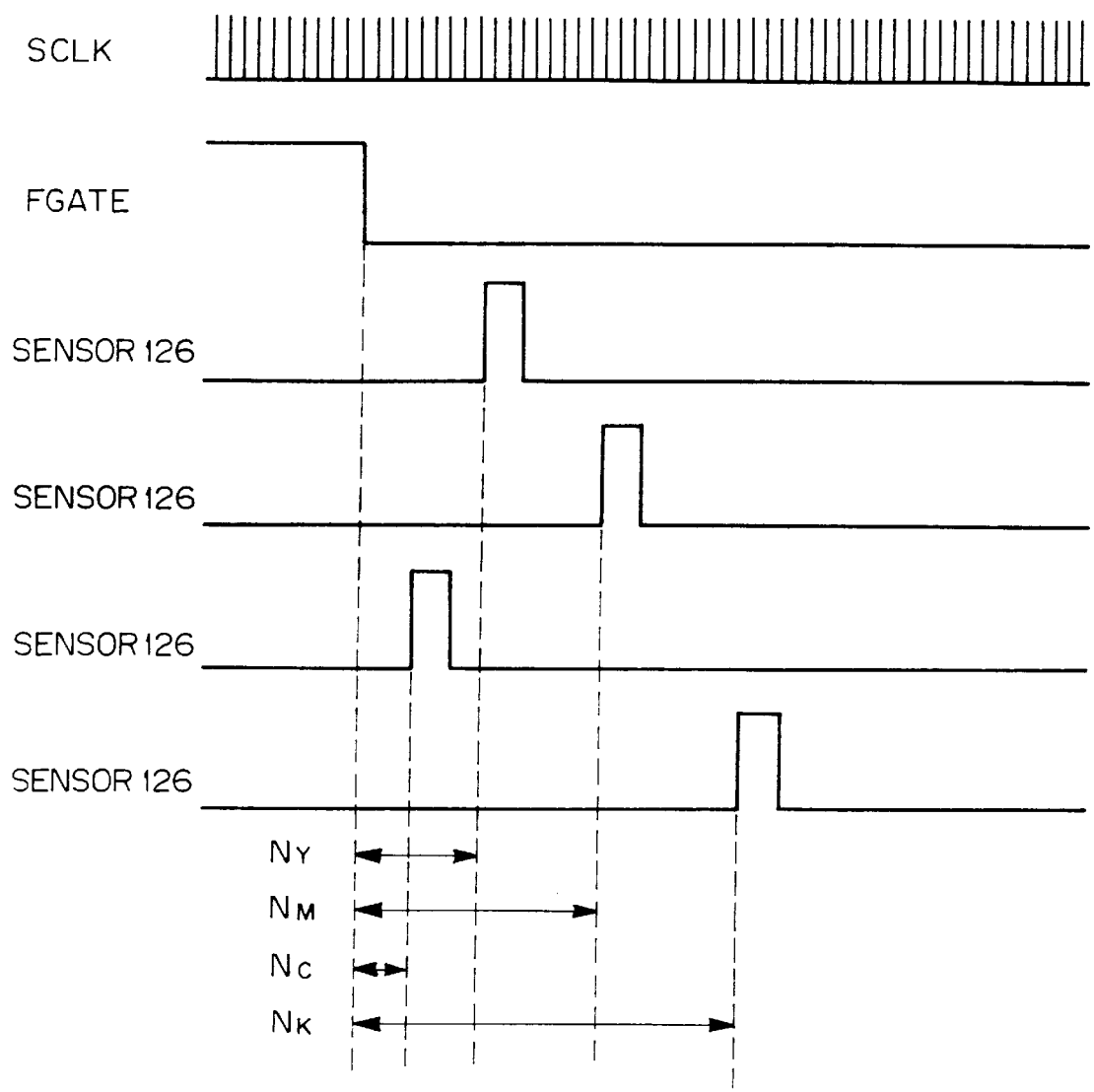
FIG. 52 shows the output signals of the sensors shown in FIG. 51, a signal FGATE, and the system clock.

While each of the drums 2BK–2C has its surface uniformly charged by the respective main charger 5BK, 5M, 5Y or 5C, the exposing device 3 exposes the charged surface in order to form a latent image. The latent image is developed by the associated developing device 4BK, 4M, 4Y or 4C to turn out a corresponding toner image. Such toner images are sequentially transferred to the belt 9 by the transfer chargers 12BK–12C, respectively. As a result, the line images 125BK–125C are formed on the belt 9, as shown in FIG. 51. Sensors 126BK, 126M, 126Y and 126C sense the line images 125BK–125C, respectively. FIG. 52 shows specific outputs of the sensors 126BK–126C.

Figure 53:
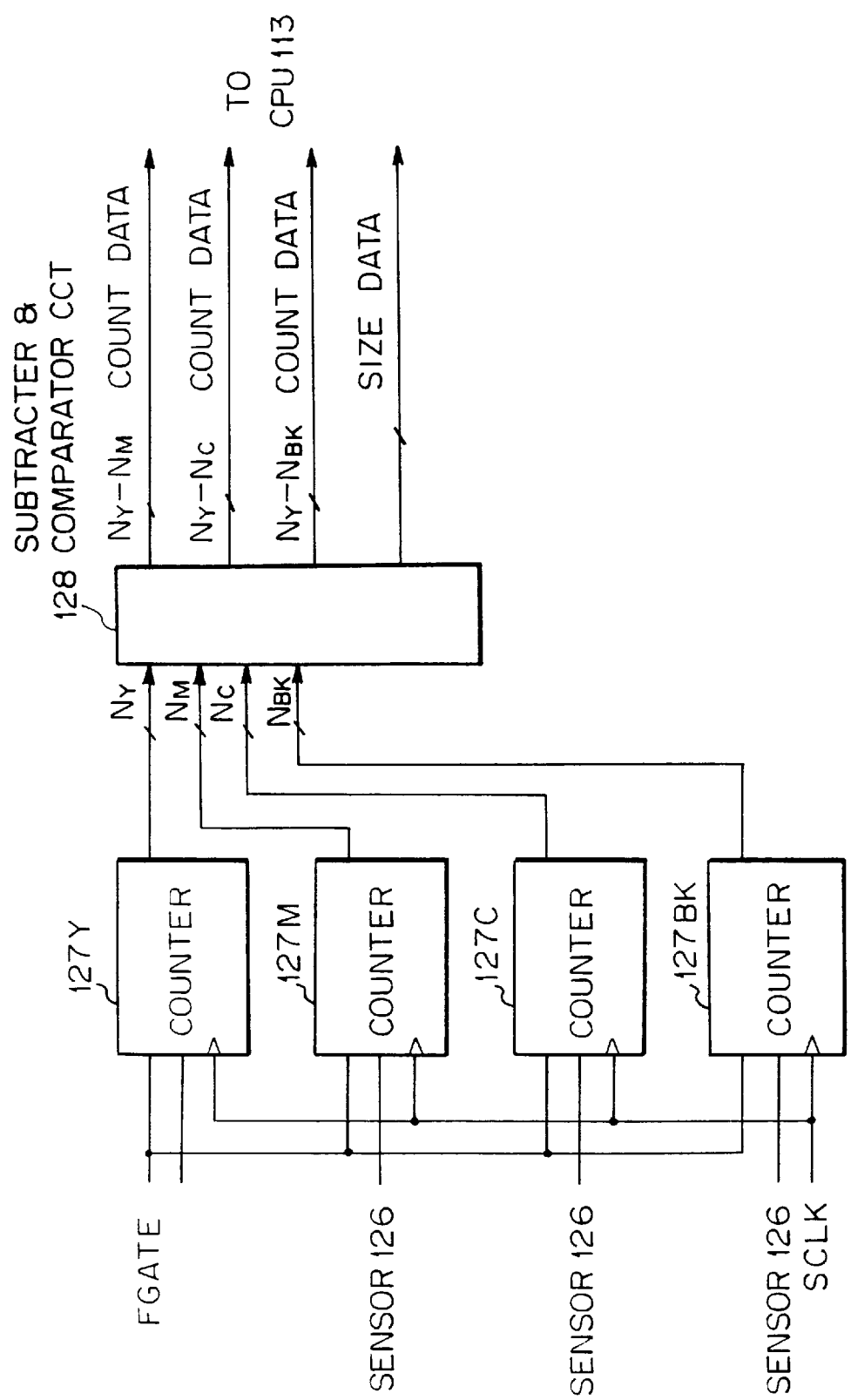
FIG. 53 is a block diagram schematically showing control means associated with the sensors shown in FIG. 50.

As shown in FIG. 53, counters 127BK, 127M, 127Y and 127C each counts the system clock SCLK during the interval between the positive-going edge of a signal FGATE indicative of a range in the subscanning direction and the positive-going edge of the output of associated one of the sensors 126BK–126C. The counters 127BK–127C output counts $N_{BK}$, $N_M$, $N_Y$ and $N_C$, respectively.

In the illustrative embodiment, the Y line 125Y is used as a reference in correcting the positional deviations of the images of different colors by way of example. A subtracter and comparator circuit 128 produces differences between the counts $N_{BK}$, $N_M$, $N_Y$ and $N_C$, i.e., $(N_M-N_Y)$, $(N_C-N_Y)$ and $(N_{BK}-N_Y)$ together with their sizes. The circuit 128 sends data representative of such differences and sizes to the CPU 113 via the I/F 117.

The CPU 113 writes the data received from the subtracter and comparator circuit 128 in the RAM 116. Then, the CPU 113 determines, based on the data, whether or not the positional deviations the lines 125M, 125C and 125BK from the line image 125Y are confined in an allowable range. If any one of the deviations does not lie in the allowable range, the CPU 113 drives the associated motor 36 via the motor driver 114 such that the cams positioned at both sides of the mirror 19BK, 19M or 19C perform the same displacement, causing the mirror to move in the parallel direction.

The above correction process is expected to correct the dislocation if executed only once. However, when the correction fails, the CPU 113 executes a sequence similar to the skew correction sequence stated earlier. Specifically, when the dislocation cannot be corrected by a single correction process, the CPU 113 executes the second correction process, as in the sequence shown in FIG. 43. If even the second correction process fails, the CPU 113 returns the cams to their home positions, and then repeats the correction process. If even the third correction process fails, the CPU 113 locates a faulty portion as in the Step 55, and displays it on the display.

While the embodiment has concentrated on the static dislocation of the images of different colors, an irregular pitch in the subscanning direction and ascribable mainly to the variation in the rotation speed of the drum is critical. In light of this, in the illustrative embodiment, a pattern to be sensed is formed every ten lines in the image forming area of the transfer belt 9 in the same manner as the line images 125BK–125C. The sensors 126BK–126C senses the above pattern and sends their outputs to an irregular pitch detecting section. In response, the irregular pitch detecting section counts the system clock SCLK, color by color, while the patter is sensed. Irregularity in pitch is determined on the basis of a difference between each count and an ideal value. As a result, data representative of a positional deviation over the entire width of the image forming region is produced color by color.

Figure 54:
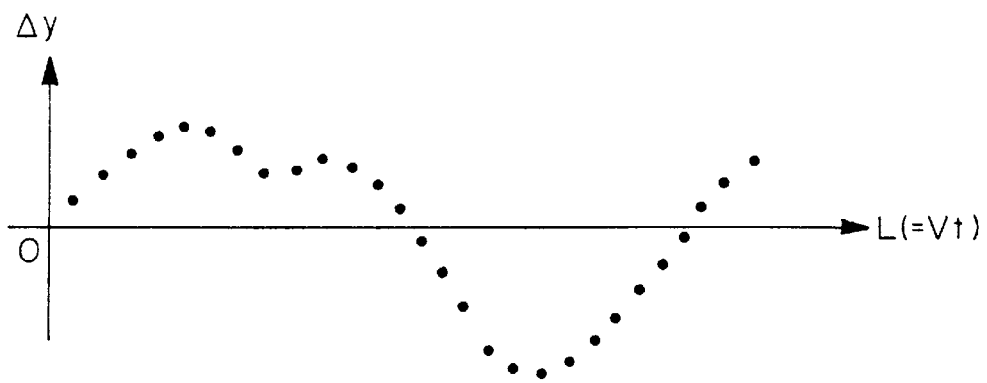
FIG. 54 shows a result of detection effected by an irregular pitch detecting section included in the third embodiment.

FIG. 54 plots a specific result of detection as to the irregular pitch. In FIG. 54, the ordinate and abscissa respectively indicate the distance from the leading edge of the image in the subscanning direction and the irregularity in pitch detected by the detecting section. The CPU 113 determines, based on the result of detection, the rotation angle of each cam 34 color by color with the Eq. (4), and writes it in the RAM 116.

Figure 55:
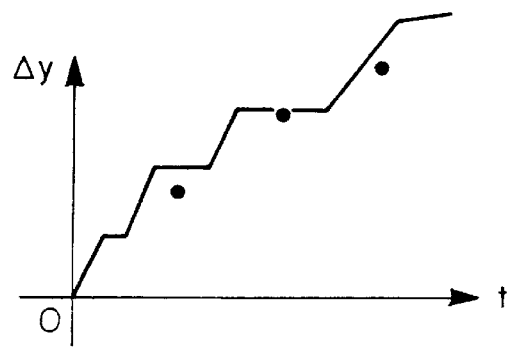
FIG. 55 demonstrates how irregular pitch in the subscanning direction is corrected.
Figure 56:
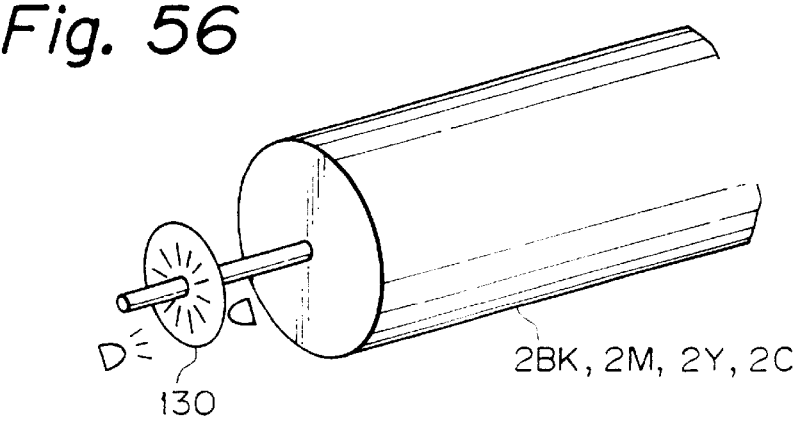
FIG. 56 is a perspective view showing a specific configuration of irregular pitch detecting means.

On the start of image formation, the CPU 113 reads the above data out of the RAM 116 every ten lines and causes the motor driver 114 to rotate the motors 36 such that irregularities in pitch disappear. As a result, irregular pitches in the subscanning direction are corrected. As shown in FIG. 55, the correction of irregular pitch occurs accurately, following the result of detection. As shown in FIG. 56, an encoder 130 may be mounted on the shaft of each drum 2BK, 2M, 2Y or 2C in order to detect an irregular pitch.

In summary, with the third embodiment, it is possible to correct the dislocation of toner images of different colors with accuracy. This insures high quality images suffering from a minimum of misregister. Further, means is provided for informing the user of a faulty portion, so that the apparatus can be repaired before image quality is lowered due to noticeable dislocation.

Various modifications will become possible for those skilled in the art after receiving the teachings of the present disclosure without departing from the scope thereof.

What is claimed is:

1. A device for adjusting a position of a deflecting mirror included in an exposing system of an image forming apparatus, said device comprising:

a support member supporting said deflecting mirror;

an adjusting member contacting said deflecting mirror for varying an inclination of said deflecting mirror in a main scanning direction, said adjusting member comprising an eccentric cam;

a drive source for driving said adjusting member; and control means for controlling said drive source such that the deflecting mirror is adjusted on the basis of an equation:

$$\Delta\theta=\sin^{-1}(\sin\theta+\Delta y/e)-\theta, e\neq 0$$

where $\Delta y$ denotes an amount by which said deflecting mirror is to be moved, $\Delta\theta$ denotes an angle of movement of said eccentric cam, $\theta$ denotes an angle of rotation of said eccentric cam from a home position, and e denotes an eccentricity of said eccentric cam.

2. A device as claimed in claim 1, wherein said support member, said eccentric cam, and said drive source are arranged at a first end of said deflecting mirror, and said deflecting mirror further comprises;

another support member, another eccentric cam, and another drive source which are arranged at a second end of said deflecting mirror opposite said first end.

3. A device as claimed in claim 2, further comprising:

an inclination holding mechanism arranged at the first end of said deflecting mirror, said inclination holding member including a presser member in linear contact with said deflecting mirror and facing said eccentric cam, and biasing means for constantly biasing said presser member such that said presser member contacts said deflecting mirror.

4. A device for adjusting a position of a deflecting mirror included in an exposing system of an image forming apparatus, said device comprising:

a support member supporting said deflecting mirror;

an adjusting member contacting said deflecting mirror for varying an inclination of said deflecting mirror in a main scanning direction, said adjusting member comprising an eccentric cam; and a drive source for driving said adjusting member;

wherein a surface of said eccentric cam contacting said deflecting mirror is tapered.

5. A device for adjusting a position of a deflecting mirror included in an exposing system of an image forming apparatus, said device comprising:

a support member supporting said deflecting mirror;

an adjusting member contacting said deflecting mirror for varying an inclination of said deflecting mirror in a main scanning direction, said adjusting member comprising an eccentric cam;

plural drive sources at opposite ends of the deflecting mirror, respectively, for driving said adjusting member;

image forming means for forming patterns for measurement of a positional deviation between different colors on both edge portions in the main scanning direction;

a plurality of pattern sensing means respectively assigned to said patterns different in color, for determining a positional deviation at least in a subscanning direction color by color; and control means for controlling said drive sources such that the deflecting mirror is adjusted on the basis of an equation:

$$\Delta\theta = \sin^{-1}(\sin\theta + \Delta y/e) - \theta, e \neq 0$$

where $\Delta\theta$ denotes an angle of movement of said eccentric cam to occur in a preselected time interval, $\Delta y$ denotes a displacement of said deflecting mirror to occur in the preselected time interval $\Delta t$, $e$ denotes an eccentricity of said eccentric cam, and $\Delta t$ denotes a unit time interval in which the displacement $\Delta y$ is to end, such that an approximation is determined with an output of said plurality of pattern sensing means, and such that the displacement $\Delta y$ of said equation is determined on the basis of the approximation.

6. A device as claimed in claim 5, wherein when said eccentric cam is to rotate in a direction opposite to a direction in which said eccentric cam has rotated last time over the time interval $\Delta t$, said eccentric cam is returned by a preselected angle $\Delta d$ corresponding to backlash.

7. A device for adjusting a position of a deflecting mirror included in an exposing system of an image forming apparatus, said device comprising:

a support member supporting said deflecting mirror;

an adjusting member contacting said deflecting mirror for varying an inclination of said deflecting mirror in a main scanning direction, said adjusting member comprising an eccentric cam;

plural drive sources at opposite ends of the deflecting mirror, respectively, for driving said adjusting member;

image forming means for forming patterns for measurement of a positional deviation between different colors on both end portions in the main scanning direction;

a plurality of pattern sensing means respectively assigned to said patterns different in color, for determining a positional deviation at least in a subscanning direction color by color; and control means for controlling said drive sources such that the deflecting mirror is adjusted on the basis of an equation:

$$\Delta\theta = \sin^{-1}(\sin\theta + \Delta y/e) - \theta, e \neq 0$$

where $\Delta\theta$ denotes an angle of movement of said eccentric cam to occur in a preselected time interval, $\Delta y$ denotes a displacement of said deflecting mirror to occur in the preselected time interval $\Delta t$, $e$ denotes an eccentricity of said eccentric cam, and $\Delta t$ denotes a unit time interval in which the displacement $\Delta y$ is to end, and such that when information representative of a position of rotation of said eccentric cam is processed as a number of consecutive pulses generated by a clock on the basis of said equation, a number of pulses corresponding to the displacement $\Delta y$ is determined every preselected time interval $\Delta t$ with a fragment below a decimal point rounded to determine the angle of movement of said eccentric cam.

8. A device as claimed in claim 7, wherein the angle of movement $\Delta\theta$ is determined also on the basis of information representative of a last position of rotation and information representative of an absolute position of rotation derived from a position of an angle $\theta$ (movement start position).

9. A device as claimed in claim 8, further comprising: a timer loaded with the time interval $\Delta t$, for computing information representative of the angle of movement $\Delta\theta$ beforehand for every time interval $\Delta t$, and a memory for storing said information, wherein said information is read out in the event of movement of said deflecting mirror, as needed.

10. A device as claimed in claim 9, wherein a movement of said eccentric cam ends within a period of time equal to a difference between a delay time including a period of time for reading out said information and a period of time for setting a drive signal and the time interval $\Delta t$.

11. A device as claimed in claim 7, further comprising: a timer loaded with the time interval $\Delta t$, for computing information representative of the angle of movement $\Delta\theta$ beforehand for every time interval $\Delta t$, and a memory for storing said information, wherein said information is read out in the event of movement of said deflecting mirror, as needed.

12. A device as claimed in claim 11, wherein a movement of said eccentric cam ends within a period of time equal to a difference between a delay time including a period of time for reading out said information and a period of time for setting a drive signal and the time interval $\Delta t$.

13. A device for adjusting a position of a deflecting mirror of an exposing system included in an image forming apparatus in order to correct a deviation of an image on an image carrier included in said image forming apparatus, said device comprising:

a pair of first supporting means respectively supporting opposite ends of a surface of said deflecting mirror in a main scanning direction, and for moving said deflecting mirror;

second supporting means resiliently contacting a rear of said deflecting mirror at one end of said deflecting mirror, and retaining said deflecting mirror in cooperation with one of said pair of first supporting means; and third supporting means resiliently contacting a rear of said deflecting mirror at the other end of said deflecting mirror, and retaining said deflecting mirror in cooperation with the other of said pair of first supporting means;

said second and third supporting means each comprising a presser member supported by a stationary member and rotatable about a fulcrum defined by a shaft which extends parallel to a subscanning direction as viewed on said deflecting mirror.

14. A device as claimed in claim 13, wherein a distance between a point of action where said presser member acts on said deflecting mirror and a fulcrum of said presser member is greater than 5 mm inclusive.

15. A device as claimed in claim 14, wherein said presser member constituting one of said second and third supporting means comprises a first elastic H-shaped block appearing as if two plates were connected together by a rotatable shaft at facing surfaces thereof, an arm, and a first elastic presser member, wherein one of said two plates is affixed to the stationary member while the other of said two plates is affixed to one end of said arm, and wherein said first elastic presser member adjoins a free end of said arm and contacts a rear of said deflecting mirror;

wherein the other of said second and third supporting means comprises the free end of said arm, a second elastic H-shaped block identical with said first elastic block, and a second elastic presser member, wherein said second elastic block includes a rotatable shaft extending in the subscanning direction, and a pair of plates one of which is affixed to the free end of said arm while the other of which is affixed to the rear of said deflecting mirror; and wherein said second elastic presser member presses the free end of said arm and thereby retains said deflecting mirror in cooperation with said pair of first supporting means.

16. A device as claimed in claim 13, wherein said pair of first supporting means each comprises an eccentric cam mechanism.

17. A device for adjusting a deflecting mirror of a color image forming apparatus including writing means for deflecting a light beam with said deflecting mirror to thereby form a latent image on an image carrier with a deflected light beam, and a first drive source for moving said image carrier, and causing said writing means to write a plurality of images of different colors on said image carrier for forming a plurality of latent images, developing said plurality of latent images to thereby form a plurality of images of different colors, and superposing said plurality of images to thereby form a color image, said device comprising:

pattern forming means for forming a plurality of patterns for measuring a positional deviation between the images of a same color or of different colors, said writing means including said pattern forming means;

first sensing means corresponding to said plurality of patterns, for detecting a positional deviation at least in a subscanning direction;

first storing means for storing results of detection output from said first sensing means;

second sensing means for detecting an irregularity in the movement of said image carrier;

second storing means for storing results of detection output from said second sensing means;

support members supporting said deflecting mirror;

two eccentric cams for varying an inclination of said deflecting mirror in a main scanning direction in contact with opposite ends of said deflecting mirror;

a second drive source for driving said eccentric cams, wherein after said pattern forming means has formed said plurality of patterns, and said first sensing means has detected a positional deviation, said second drive source is controlled, as a correction process, at one or both sides of said deflecting mirror on the basis of an output of at least one of said first and second sensing means; and control means for executing, if a positional deviation represented by an output of said first sensing means and resulting from a first correction process does not lie in an allowable range, and when said eccentric cams are driven to displace said deflecting mirror, a second correction process, and for repeating, if a positional deviation represented by the output of said first sensing means and resulting from said second correction process does not lie in the allowable range, said correction process a preselected number of times.

18. A device as claimed in claim 17, wherein said control means further comprises:

means for causing the second drive source to return, if a positional deviation represented by the output of said first sensing means does not lie in the allowable range even after said correction process repeated the preselected number of times, each of said eccentric cams to a respective home position, and then executing said correction process again.

19. A device as claimed in claim 18, wherein said control means further comprises:

means for executing, if a positional deviation represented by the output of said first sensing means does not lie in the allowable range even after said correction process following a return of said eccentric cams, a preselected error detection mode for locating a faulty portion, and then informing a user of the faulty portion located.

20. A device as claimed in claim 19, wherein said control means further comprises:

means for, after said color image forming apparatus has formed patterns on both end portions of a single main scanning line of a same color, sensing said patterns and causing at least one of said two eccentric cams to be driven on the basis of a result of sensing color by color.

21. A device as claimed in claim 19, wherein said control means further comprises:

means for, after said color image forming apparatus has formed patterns on both end portions of main scanning lines at leading edges of image areas of different colors, sensing a positional deviation between the different colors and causing said two eccentric cams to be driven on the basis of a result of sensing color by color.

22. A device as claimed in claim 21, wherein said correction process is executed beforehand at the time of image formation.

23. A device as claimed in claim 22, further comprising:

third storing means for storing information representative of a positional deviation in the subscanning direction over an entire width of an image area and determined beforehand on the basis of said patterns or the output of said second sensing means; and means for reading, after dislocation ascribable to screw and dislocation ascribable to a shift in the subscanning direction have been corrected while an image is not formed, said information out of said third storing means at every predetermined time interval at the time of image formation, and driving said eccentric cams by using said information on a real-time basis.

24. A device as claimed in claim 17, wherein said control means comprises:

means for executing, if a positional deviation represented by the output of said first sensing means does not lie in the allowable range even after said correction process following a return of said eccentric cams, a preselected error detection mode for locating a faulty portion, and then informing a user of the faulty portion located.

25. A device as claimed in claim 17, wherein said control means comprises:

means for, after said color image forming apparatus has formed patterns on both end portions of a single main scanning line of a same color, sensing said patterns and causing at least one of said two eccentric cams to be driven on the basis of a result of sensing color by color.

26. A device as claimed in claim 17, wherein said control means comprises:

means for driving, after said color image forming apparatus has formed patterns on both end portions of main scanning lines at leading edges of image areas of different colors, sensing a positional deviation between the different colors and causing said two eccentric cams to be driven on the basis of a result of sensing color by color.

27. A device as claimed in claim 17, wherein said first correction process is executed beforehand at the time of image formation.

28. A device as claimed in claim 17, further comprising:

third storing means for storing information representative of a positional deviation in the subscanning direction over an entire width of an image area and determined beforehand on the basis of said patterns or the output of said second sensing means; and means for reading, after dislocation ascribable to screw and dislocation ascribable to a shift in the subscanning direction have been corrected while an image is not formed, said information out of said third storing means at every predetermined time interval at the time of image formation, and driving said eccentric cams by using said information on a real-time basis.

* * * * *